(12) United States Patent
Kruepke et al.

(10) Patent No.: US 11,904,394 B2
(45) Date of Patent: Feb. 20, 2024

(54) INTERFACE FOR POWERED PIPE-WORKING TOOLS

(71) Applicant: Ridge Tool Company, Elyria, OH (US)

(72) Inventors: Scott Kruepke, Valley City, OH (US); Seth B. Bullock, Cleveland, OH (US); Glen R. Chartier, Avon Lake, OH (US); Katherine Hall, North Ridgeville, OH (US); Robert Skrjanc, Lorain, OH (US)

(73) Assignee: Ridge Tool Company, Elyria, OH (US)

( * ) Notice: Subject to any disclaimer, the term of this patent is extended or adjusted under 35 U.S.C. 154(b) by 402 days.

(21) Appl. No.: 17/316,802

(22) Filed: May 11, 2021

(65) Prior Publication Data

US 2021/0260673 A1 Aug. 26, 2021

Related U.S. Application Data

(63) Continuation-in-part of application No. 16/661,629, filed on Oct. 23, 2019, now Pat. No. 11,691,208.

(30) Foreign Application Priority Data

Oct. 27, 2018 (IN) .............................. 201821040602

(51) Int. Cl.
*B23D 47/04* (2006.01)
*B23D 47/02* (2006.01)
*B23D 45/12* (2006.01)

(52) U.S. Cl.
CPC ......... *B23D 47/045* (2013.01); *B23D 45/126* (2013.01); *B23D 47/02* (2013.01)

(58) Field of Classification Search
CPC ..... B23D 47/045; B23D 47/02; B23D 45/126
USPC ............................................................ 83/743
See application file for complete search history.

(56) References Cited

U.S. PATENT DOCUMENTS

| 4,777,723 | A | | 10/1988 | Southoff | |
|---|---|---|---|---|---|
| 5,461,956 | A | * | 10/1995 | Petersen | ................. B26D 1/16 83/241 |
| 7,257,895 | B2 | | 8/2007 | Makkonen et al. | |
| 7,752,699 | B1 | | 7/2010 | Fruzzetti, Jr. et al. | |

(Continued)

FOREIGN PATENT DOCUMENTS

| CH | 630550 A5 | 6/1982 |
|---|---|---|
| DE | 2951394 A1 | 7/1981 |

(Continued)

OTHER PUBLICATIONS

Magura Bike Parts GmbH & Co. KG: Owner's Manual HS 11-HS 33. Bad Urach, 2013. 1-23.—Firmenschrift; 24 pages.

(Continued)

*Primary Examiner* — Omar Flores Sanchez
(74) *Attorney, Agent, or Firm* — Mark Bandy; Rankin Hill & Clark, LLP

(57) ABSTRACT

Power tools such as cutting saws with rotary powered blades are described. Also described are various accessories for tools used with cylindrical workpieces such as pipes are described. The accessories include a clamp and saw joint assembly, various quick connection assemblies between a saw and a clamping system, a plunge guide assembly, a latch plate assembly, an interlock switch, a blade guard system, and a chip management system or chip deflector. Also described are related methods of use.

14 Claims, 87 Drawing Sheets

(56) References Cited

U.S. PATENT DOCUMENTS

| | | | |
|---|---|---|---|
| 8,357,872 B2 | 1/2013 | Lier | |
| 8,418,589 B1 | 4/2013 | Kaehr et al. | |
| 11,691,208 B2 * | 7/2023 | Chartier | B23D 45/126 83/109 |
| 2003/0093904 A1 | 5/2003 | Makkonen | |
| 2013/0269500 A1 | 10/2013 | Makkonen et al. | |
| 2014/0150266 A1 | 6/2014 | Priha et al. | |
| 2015/0202699 A1 | 7/2015 | Makkonen et al. | |
| 2018/0221971 A1 * | 8/2018 | Barrett | B26B 29/06 |

FOREIGN PATENT DOCUMENTS

| | | | |
|---|---|---|---|
| DE | 10224837 A1 | 1/2004 | |
| EP | 1301311 | 9/2005 | |
| EP | 1628797 | 7/2010 | |
| EP | 2907609 | 8/2015 | |
| EP | 2729272 | 12/2015 | |
| FI | 118076 | 6/2007 | |
| JP | 61209816 A * | 11/1986 | B23D 45/126 |
| WO | WO2002002271 | 1/2002 | |
| WO | WO2004103623 | 12/2004 | |
| WO | WO 2012045912 | 4/2012 | |
| WO | WO2013004918 | 1/2013 | |

OTHER PUBLICATIONS

Examination Report dated Mar. 4, 2022; Application No. 102019216572.9; 14 pages.

* cited by examiner

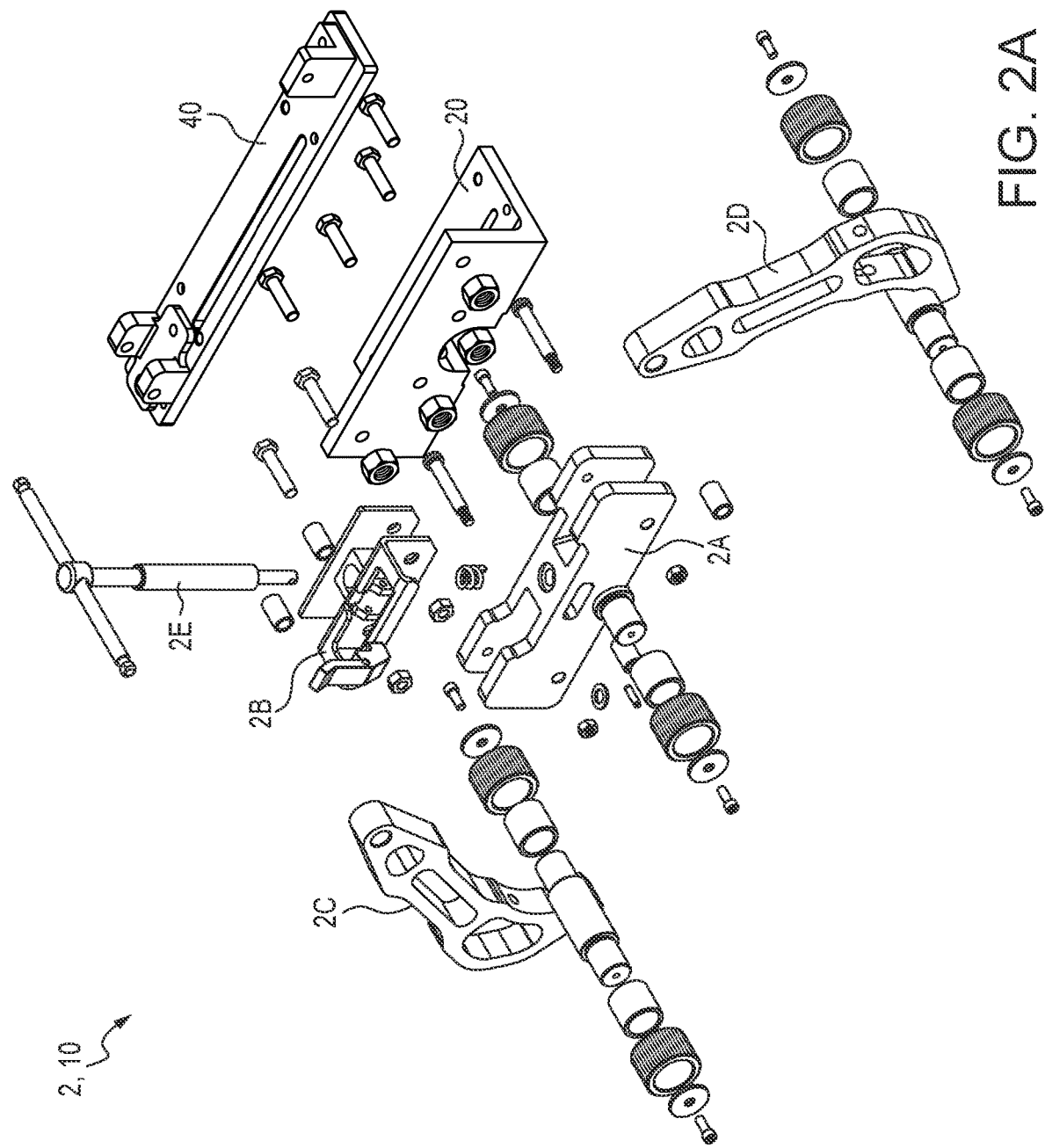

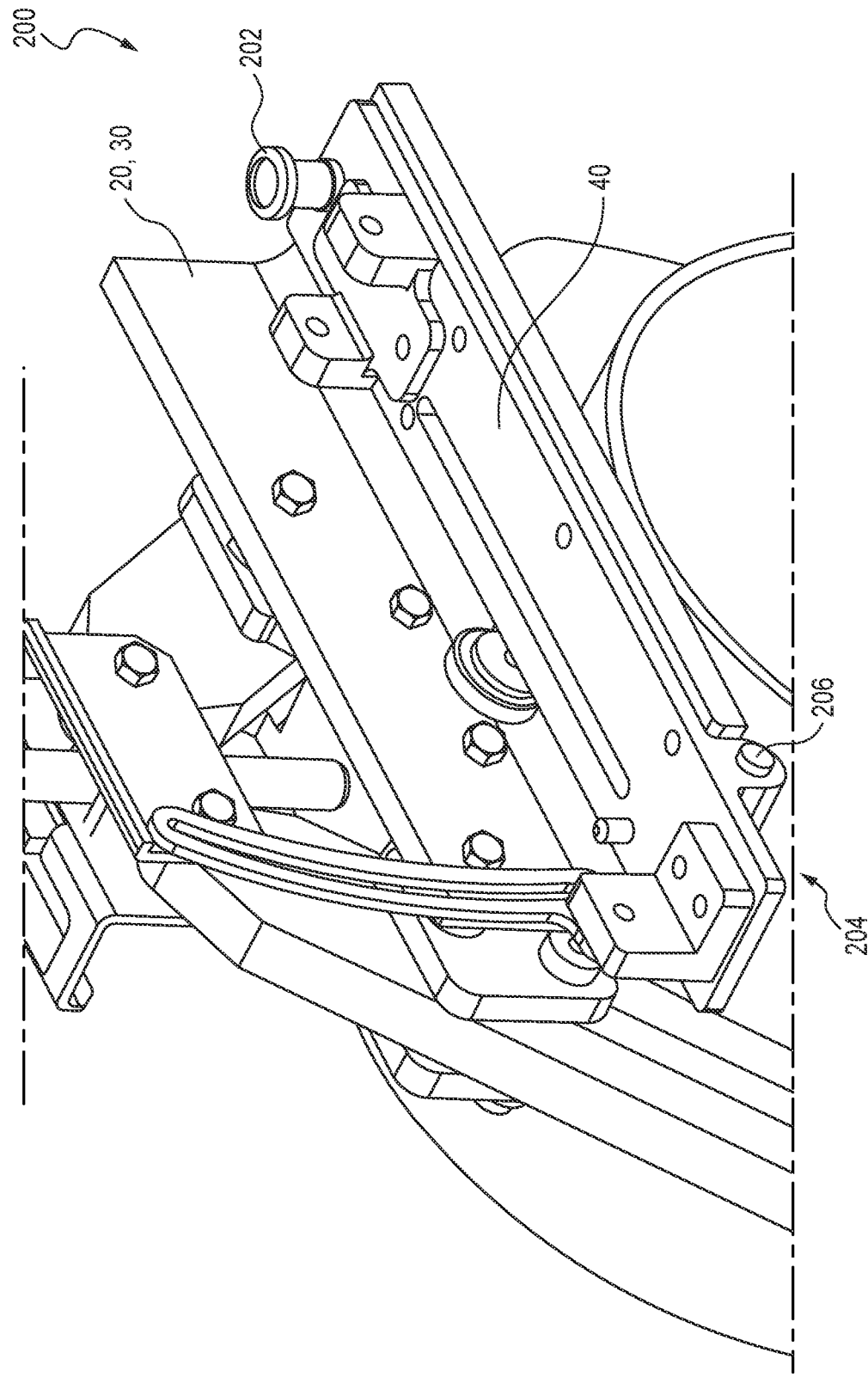

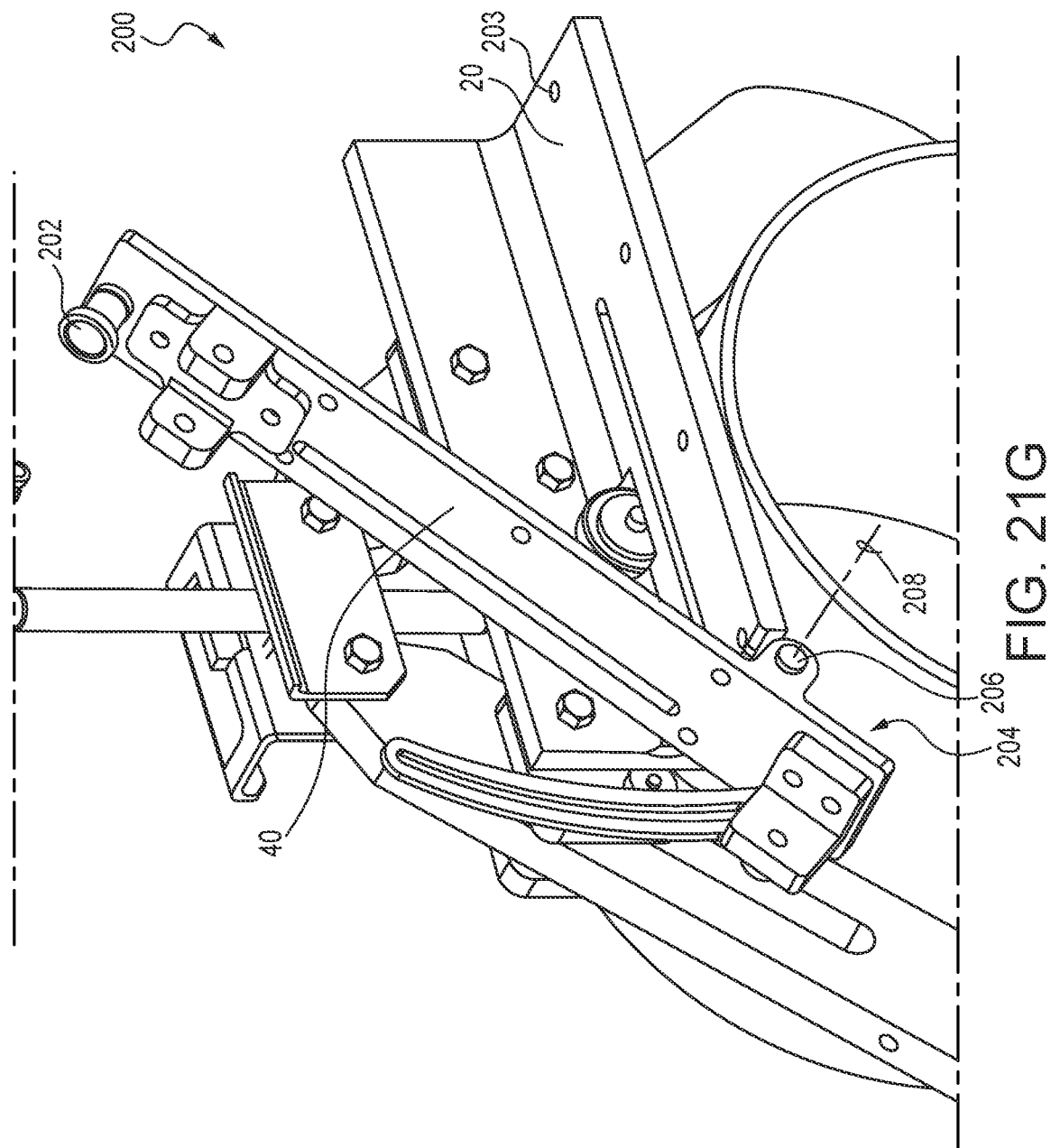

INTERFACE FOR POWERED PIPE-WORKING TOOLS

CROSS REFERENCES TO RELATED APPLICATIONS

This application is a Continuation-in-Part (CIP) application of U.S. Ser. No. 16/661,629 filed Oct. 23, 2019, which claims priority from India provisional application No. 201821040602 filed on Oct. 27, 2018. In addition, this application is generally related by its subject matter to U.S. Ser. No. 16/591,753 filed Oct. 3, 2019, the disclosure of which is hereby incorporated by reference in its entirety.

FIELD

The present subject matter relates, in general, to tools for precisely cutting larger-diameter pipe to predetermined length(s), and more particularly relates to mechanisms and accessories for such tools.

BACKGROUND

A need exists for a very efficient, accurate, and easier means of attaching a powered cutting saw or other powered pipe-working tool to a clamping assembly for common-sized and larger-diameter cylindrical pipe or such workpiece fabrication. To optimize a cutting saw system for "on the ground cutting" and "in-place cutting," separating the clamping pieces and the cutting saw components is beneficial to reduce the mass of associated tools otherwise required for the user to attach to the pipe. This is particularly important when cutting in-place where the position of the pipe or workpiece may be difficult to reach and manipulating smaller parts is much simpler.

In addition, a need exists for an ability to accurately cut steel pipe of various sizes on a job site. Commonly used methods such as plasma cutting or torch cutting require significant setup time and result in a cutting surface that requires additional operations, for example, grinding. Improved accurateness of the cut allows secondary fabrication processes such as beveling, to be applied directly following the cut, thereby eliminating the need to refine the cut end prior to those processes being applied to the workpiece.

Furthermore, a clean method of controlling the metal debris produced during the cutting process, is needed to thereby simplify clean-up and reduce the effects of projectile chips that are distributed from the blade during the cut process.

Accordingly, a need exists for assemblies and/or strategies to promote operator ease when performing operations on cylindrical workpieces such as pipes.

SUMMARY

The difficulties and drawbacks associated with previous approaches are addressed in the present subject matter as follows.

In one aspect, the present subject matter provides an interlock system for a saw defining a receiving aperture. The interlock system comprises a positionable plunger positionable between an extended state in which the plunger extends into the receiving aperture, and a retracted state in which the plunger does not extend into the receiving aperture. The interlock system also comprises an interlock switch including electrical contacts. A state of the electrical contacts varies depending upon the position of the plunger.

In another aspect, the present subject matter provides a method for operation of an interlock system in a cutting device. The method comprises actuating a power switch associated with a device. The method also comprises delivering electrical power to a controller of the device. The controller assesses a signal from at least one interlock switch or sensor whereby if a state of the signal corresponds to an activated state, the controller allows electrical power to be delivered to a motor of the device, and if a state of the signal corresponds to a normal inactive state, the controller prevents device operation.

In still another aspect, the present subject matter provides a method for operation of an interlock system in a cutting device. The method comprises actuating a power switch associated with a device, and delivering electrical power to a controller of the device. The controller compares a signal from at least one interlock sensor, whereby if the controller determines that the device is in an activated state, the controller allows electrical power to be delivered to a motor of the device, and if the controller determines that the device is in a normal inactive state, the controller prevents device operation.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

FIG. 2A is an exploded assembly view of the clamp and saw joint assembly of FIG. 1 in association with a typical clamping system.

FIGS. 21A-21G illustrate an embodiment of a selectively positionable spring pin assembly in association with a clamp and saw joint assembly in accordance with the present subject matter.

DETAILED DESCRIPTION OF THE EMBODIMENTS

The present subject matter provides powered cut-off tools, more particularly powered rotary tools and in particular powered pipe fabrication tools or rotary saws. The present subject matter also provides various accessories for tools used with cylindrical workpieces such as pipes. In particular, the present subject matter provides accessories for clamping systems and pipe cutting saws. These accessories include a clamp and saw joint assembly between the saw and a clamping system, quick connection assemblies between the saw and a clamping system, a plunge guide assembly, an interlock switch assembly, a blade guard system, and a chip management system and/or chip deflector. Each of these accessories can be used independently or solely, or in various combinations. Details of these and other aspects are set forth herein. Although the term "saw" is used herein, it will be understood that the term includes other tools and/or operations for severing workpieces such as grinders for grinding and cut-off wheels for severing or removing workpiece material.

To more easily attach a saw to a clamp or clamping assembly for a pipe or workpiece, the present subject matter provides a detachable saw joint assembly between the clamping system and the saw portion of the assembly. In this manner, a user can position the clamp or clamping assembly onto the pipe or workpiece without the additional weight and components of the cutting saw and tighten the clamp onto the pipe. The user can then attach the saw portion of the tool to the clamp portion and complete the cut as desired. This saw joint assembly can utilize common fasteners, for example, hex head cap screws, that require tools to remove and install or can be configured using tool-free methods of removal or installation. One such method of a tool-free quick connection between the clamp and saw portions of the tool features alignment pins on either the saw base or the clamp base, and alignment holes on the opposite component positioned such that the alignment pins are coaxial to the alignment holes when the saw is properly placed relative the clamp. To use, the operator would install the clamp onto the pipe workpiece, align a cut indicator with the desired line of cut, and then lower the saw base onto the clamp base with the alignment pins engaging the alignment holes. The operator would then tighten one or more threaded knobs to complete the alignment of the saw base to the clamp base and adequately fix the saw to the clamp. The threaded knobs could be configured such that they are retained to the saw base via the use of a counterbored opening.

Figure 1:
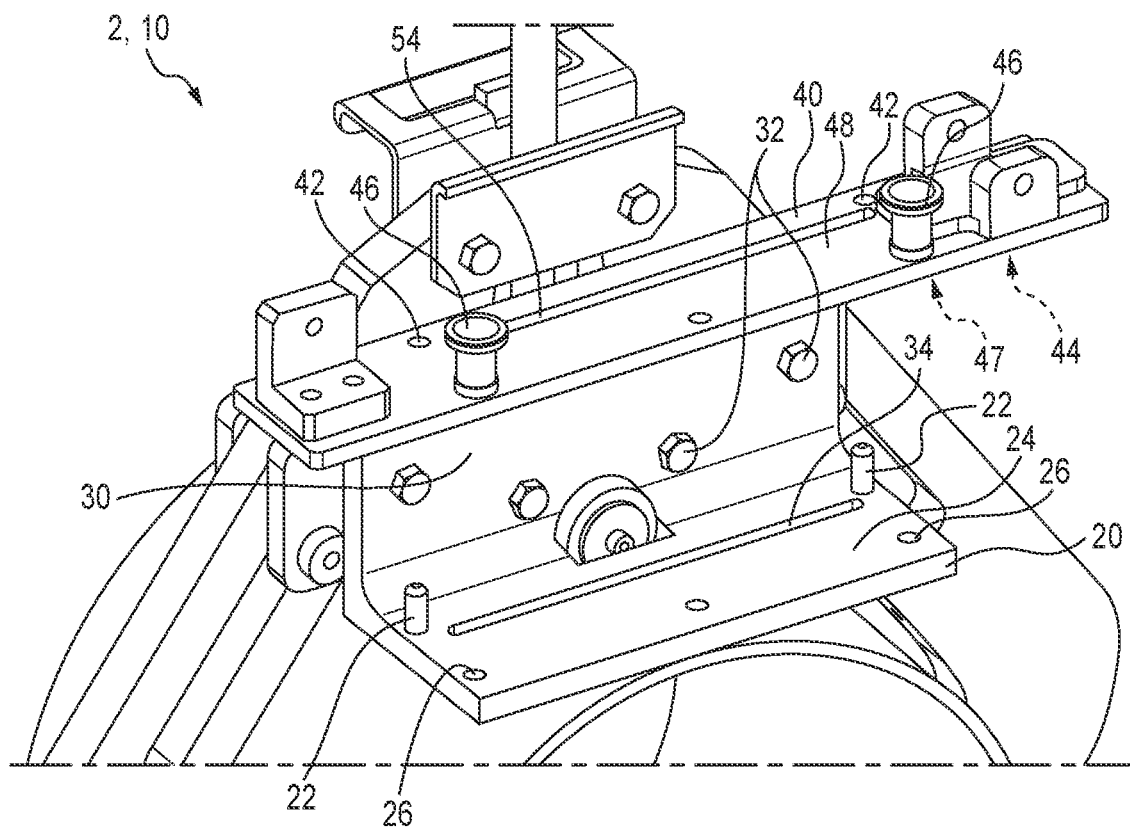
FIG. 1 is a perspective schematic illustration of an embodiment of a clamp and saw joint assembly in accordance with the present subject matter.
Figure 2:
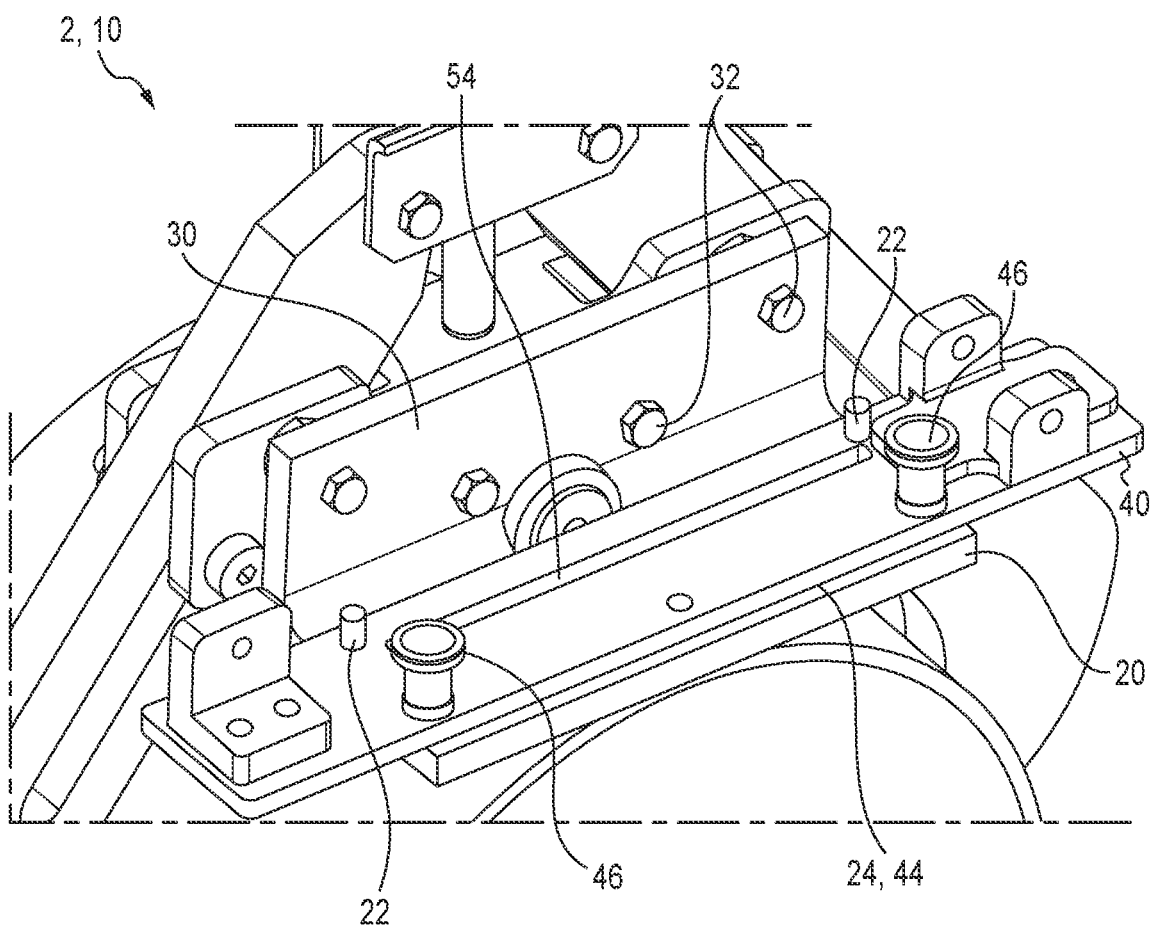
FIG. 2 illustrates the clamp and saw joint assembly of FIG. 1 in a joined configuration.

FIGS. 1, 2, and 2A illustrate an embodiment of a clamp and saw joint assembly 10 in accordance with the present subject matter. The clamp and saw joint assembly (or "saw joint assembly" as periodically referred to herein) is illustrated in use with a clamping system such as described in U.S. application Ser. No. 16/591,753 filed Oct. 3, 2019. FIG. 2A is an exploded assembly view of the saw joint assembly of FIGS. 1 and 2 in conjunction with the noted clamping system generally denoted as 2. The clamping system 2 comprises a base 2B having a threaded member or region. Typically, the threaded region is in the form of a female bore or aperture having helical thread(s). The clamping system 2 also comprises a pair of arms including a first arm 2C defining a proximal end and an opposite distal end. The first arm 2C also defines a guide slot extending at least partially between the ends. The pair of arms also includes a second arm 2D defining a proximal end and an opposite distal end. The second arm 2D also defines a guide slot extending at least partially between the ends. In many versions, one or more rollers are provided at or near the distal ends of the arms. For example, a first roller is provided at the distal end of the first arm, and a second roller is provided at the distal end of the second arm. Each arm can utilize a plurality of rollers. The first and second arms 2C, 2D are pivotally supported and secured to the base 2B. The clamping system 2 also comprises a shaft 2E defining a proximal end and an opposite distal end. The shaft 2E also defines a threaded region. The shaft 2E is threadedly engaged with the base 2B via the threaded region of the base. The clamping system 2 also comprises a slideable central carriage 2A. The central carriage 2A includes a central roller or plurality of rollers rotatably secured thereto. The central carriage 2A is rotatably affixed to the distal end of the shaft 2E such that the shaft can undergo rotation without transfer of such rotation to the central carriage 2A. The central carriage 2A is movably retained to the pair of arms, i.e., the first arm and the second arm as described herein. Additional details and aspects of the clamping system 2 are provided in the noted application.

Referring further to FIGS. 1, 2, and 2A, the saw joint assembly 10 comprises a clamp base 20 which is secured to the clamping system 2, and a separable or selectively removable saw base 40. In the particular depicted version of the saw joint assembly 10, the clamp base 20 includes one or more outwardly extending alignment pins 22 projecting from an engagement face 24 of the clamp base 20. The clamp base 20 also includes one or more tapped or threaded aperture(s) 26 accessible along the engagement face 24 of the clamp base 20. Typically, the alignment pin(s) 22 and the threaded aperture(s) 26 extend transversely to the plane of the engagement face 24. However, the present subject matter includes variations and alternate configurations. The saw base 40 defines at least one alignment aperture(s) 42 in an engagement face 44. The engagement face 44 of the saw base 40 is directed toward the engagement face 24 of the clamp base 20 and upon joining the bases 20, 40 together, the engagement face 44 of the saw base 40 contacts the engagement face 24 of the clamp base 20. The alignment aperture(s) 42 of the saw base 40 are located and positioned in the saw base 40 such that upon joining the bases 20, 40 together, the alignment pin(s) 22 of the clamp base 20 extend within the alignment aperture(s) 42 of the saw base 40. Thus, the alignment aperture(s) 42 are also sized and shaped to fittingly receive and engage the corresponding alignment pin(s) 22 of the clamp base 20. Typically, the alignment apertures 42 extend transversely to the engagement face 44 of the saw base 40. However, the present subject matter includes variations and alternate configurations.

Upon joining the saw base 40 to the clamp base 20 by contacting their respective engagement faces 44 and 24, and inserting the alignment pin(s) 22 into the alignment aperture(s) 42, the saw base 40 can be selectively retained or affixed to the clamp base 20 by one or more fasteners such as threaded knob(s) 46 with projecting threaded member(s) 47. In certain versions, the threaded knobs 46 and members 47 are rotatably retained with the saw base 40. The threaded knobs 46 are positioned and located on the saw base 40 such that upon joining the saw base 40 to the clamp base 20, the threaded member(s) 47 are threadedly received by the tapped or threaded apertures 26 of the clamp base 20. Thus, as will be understood, the threaded member(s) 47 of the threaded knob(s) 46 extend from the engagement face 44 of the saw base 40. Typically, the threaded member(s) 47 extend transversely from the face 44. However, the present subject matter includes variations and alternate configurations. The knob(s) 46 are typically accessible along a proximal face 48 of the saw base 40 which is oppositely directed from the engagement face 44 of the saw base 40.

The saw joint assembly 10 is positionable between an unjoined configuration as shown in FIG. 1, and a joined configuration such as depicted in FIG. 2 in which the engagement face 24 of the clamp base 20 contacts the engagement face 44 of the saw base 40, the at least one alignment pin 22 of the clamp base 20 is disposed in the at least one alignment aperture 42 of the saw base 40, and the at least one threaded member 47 of the saw base 40 is threadedly engaged with the at least one threaded aperture of the clamp base 20.

The knob(s) 46 of the saw base 40, accessible along the proximal face 48 of the saw base 40, can be rotated to thereby further engage and tighten their corresponding threaded member(s) 47 with the tapped aperture(s) 26 of the clamp base 20. This serves to selectively retain and affix the saw base 40 to the clamp base 20.

The clamp base 20 typically includes a mounting region 30 for affixing or securing to a clamping system such as clamping system 2. The mounting region 30 can be integrally formed with the clamp base 20 or affixed thereto. As will be understood, the clamp base 20 and/or the mounting region 30 is typically affixed or secured to a clamping system by one or more threaded fasteners 32. The clamp base 20 also defines a longitudinal slot 34 extending through the clamp base and accessible along the engagement face 24.

The longitudinal slot 34 is sized and shaped to receive a saw blade (not shown) inserted or positioned therein. The saw base 40 also defines a longitudinal slot 54 extending through the saw base 40. The longitudinal slot 54 is sized and shaped to receive a saw blade (not shown) inserted or positioned therein. The longitudinal slot 34 of the clamp base 20 is positioned and located in the clamp base 20 and/or the longitudinal slot 54 of the saw base 40 is positioned and located in the saw base 40 such that upon joining the bases 20, 40 together, the longitudinal slots 34, 54 are aligned with each other. Thus, the orientation of the slots 34, 54 is such that a saw blade can extend through both slots 34, 54.

In certain versions, the present subject matter also provides a chip deflector that collects and deflects metal chips that have been removed from the pipe during the cutting process and prevents the chips from hitting the operator or bystanders. As the cutting blade passes through the pipe, small metal chips, typically equivalent to the width of the cutting blade, are removed and pushed out and away from the pipe or workpiece in the direction of the cutting blade rotation at relatively high velocity. A deflector is provided such that these chips are slowed and redirected towards the workpiece and tool, where secondary redirections further reduce velocity and position the chips to fall close to the workpiece being cut, rather than projecting far away from the workpiece. This deflector can be configured to work with all pipe sizes within the range of application for the clamp/saw.

In many embodiments, the chip deflector can also be pivoting and biased towards the pipe to minimize the gap through which chips can be ejected. Alternatively, a flexible chip deflector (not shown) can be configured to always contact the circumference of the pipe to be cut. However, the present subject matter includes variations and alternate configurations.

Figure 3:
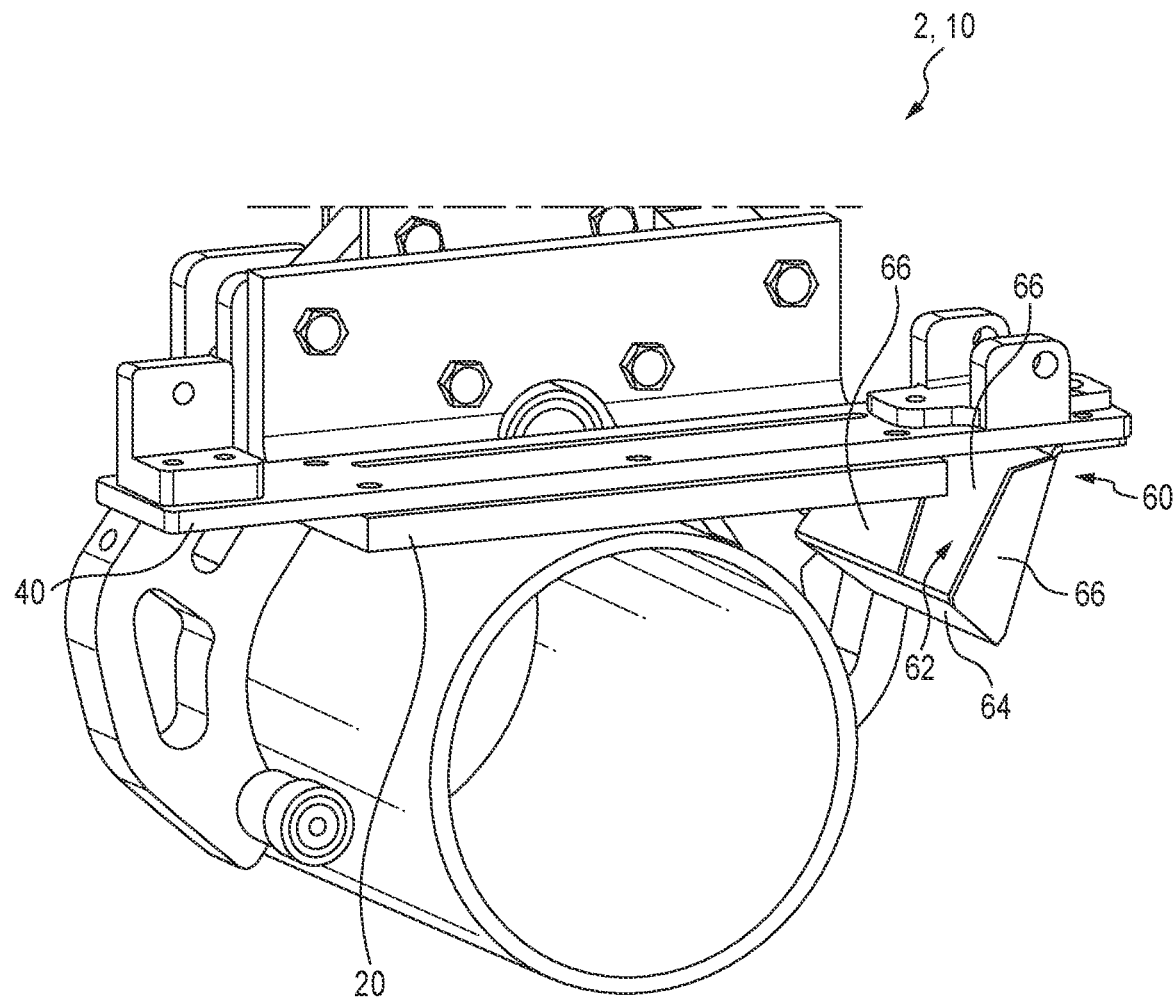
FIG. 3 illustrates an embodiment of a chip deflector in accordance with the present subject matter.

FIG. 3 illustrates an embodiment of a chip deflector 60 in accordance with the present subject matter. FIG. 3 depicts the chip deflector 60 in association with the previously described saw joint assembly 10 used in conjunction with the noted clamping assembly 2. The chip deflector 60 includes one or more walls 66 for deflecting and redirecting metal chips. The chip deflector 60 defines an entrance 62 for providing access to an interior region defined by the walls 66. The deflector 60 also defines an exit 64. The chip deflector 60 is releasably secured to the saw joint assembly 10 and particularly to either the clamp base 20 or the saw base 40. The deflector 60 is positioned relative to the saw joint assembly 10 such that metal chips generated and dispelled during a cutting or processing operation, enter the deflector 60 such as through entrance 62, contact the wall(s) 66, and exit the deflector 60 through exit 64.

Figure 4:
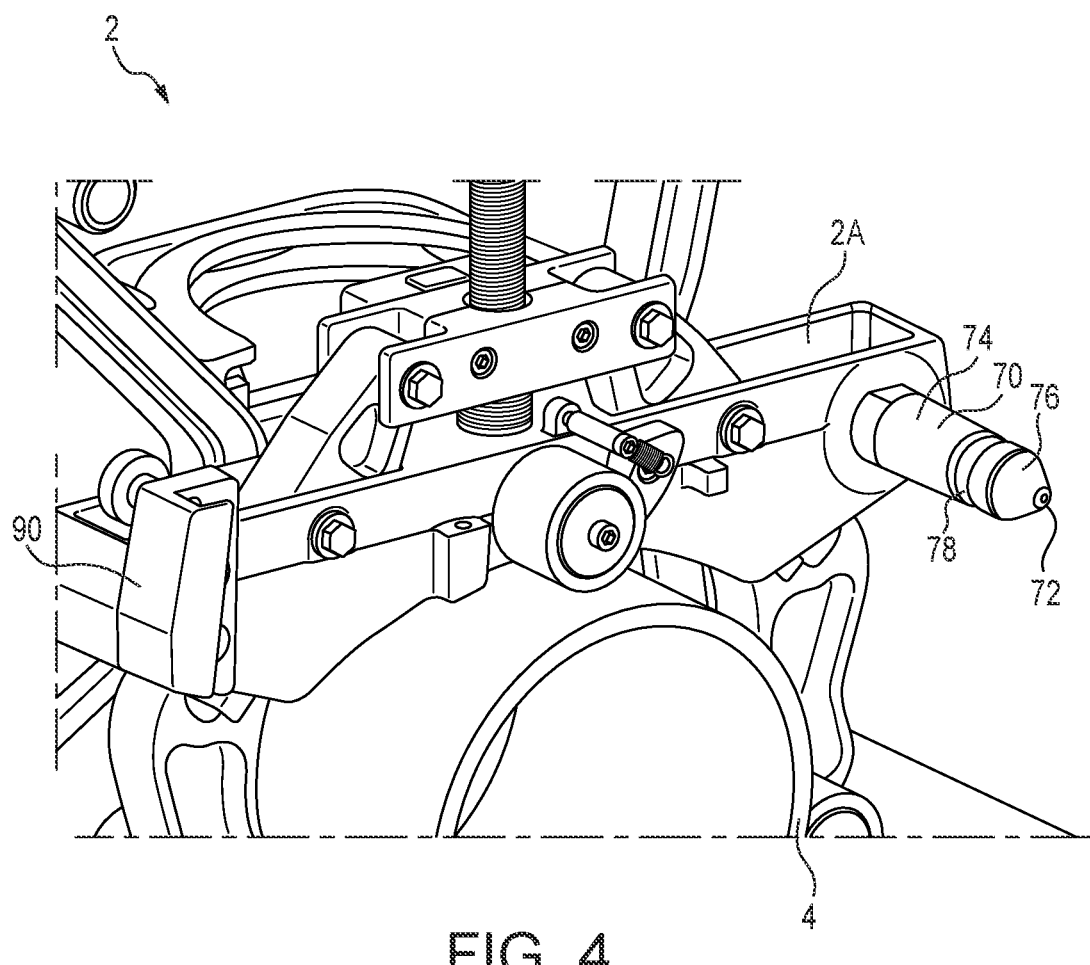
FIG. 4 illustrates an embodiment of a quick connect pin assembly in accordance with the present subject matter.

In addition to the aspects and features described herein, a quick connection assembly can be used conveniently and quickly engaging the saw portion of the assembly to the clamp portion. A preferred embodiment of the quick connect assembly is shown in FIG. 4. This embodiment features a large pin with a conical region and tip and circumferential groove that performs two functions: locking the saw portion of the assembly to the clamp portion and providing a pivoting axis around which the saw portion rotates to provide blade penetration to completely cut through the wall of the pipe or workpiece. In certain embodiments, the present subject matter further includes a grooved guide opposite the pin. These aspects are described in greater detail herein.

Specifically, FIG. 4 illustrates a quick connect pin 70 mounted to a central carriage 2A or like component of the clamping system 2. The quick connect pin 70 defines a distal tip 72, a cylindrical base 74, and a conical transition region 76 between the tip 72 and the base 74. The pin 70 further defines a circumferential groove 78 extending about the outer periphery of the pin 70. Typically, the groove 78 is located within the base 74 or between the base 74 and the conical region 76. Typically, the pin 70 extends from the central carriage 2A in a direction parallel to a longitudinal axis of a workpiece 4 to which the clamping system 2 is engaged.

FIG. 4 also illustrates an optional grooved guide 90 provided in association with the clamping system 2 and particularly the central carriage 2A. The grooved guide is described in greater detail herein in association with a plunge guide assembly having an alignment plate illustrated in FIG. 8.

Figure 5:
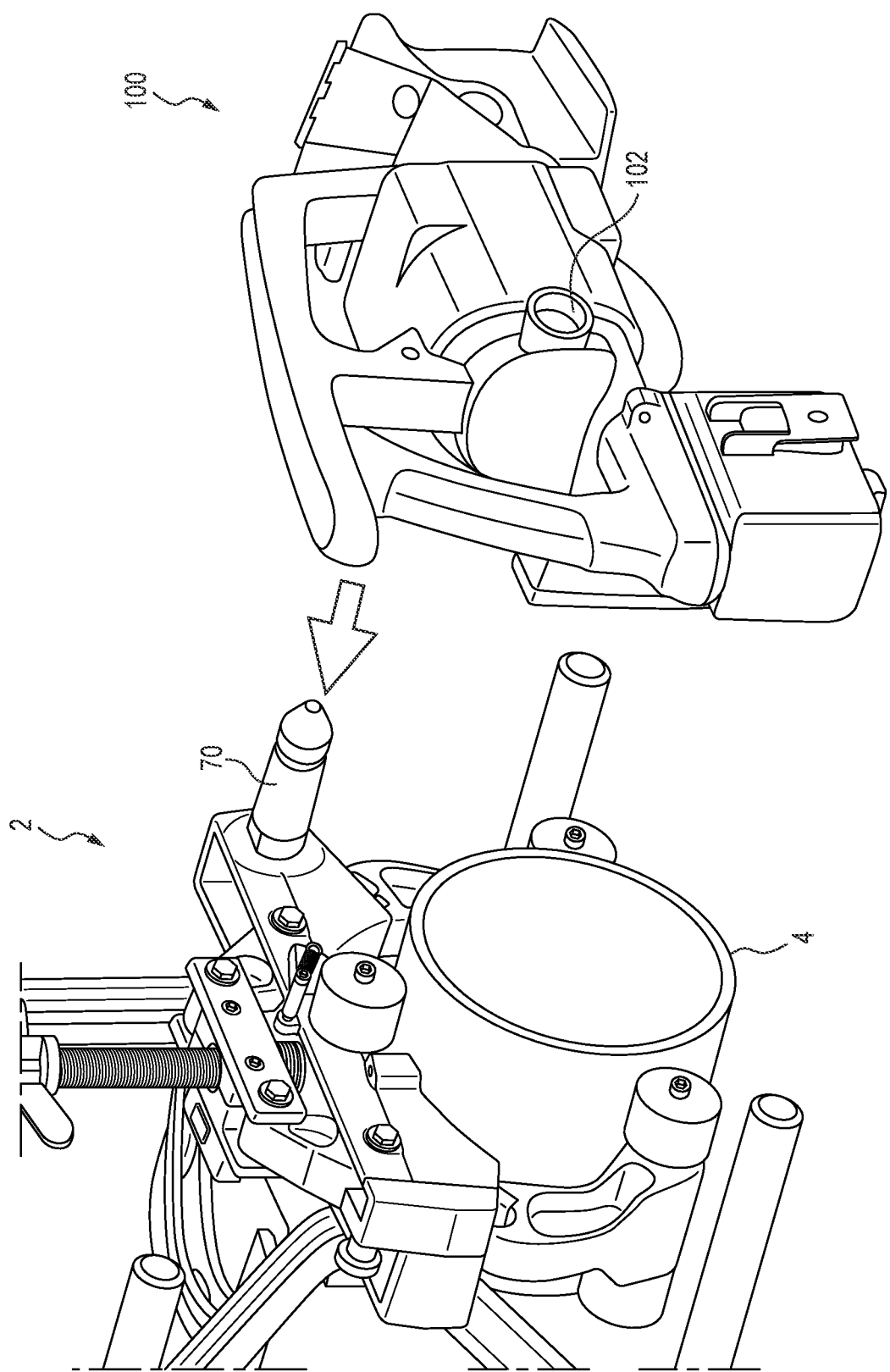
FIG. 5 illustrates engaging a saw to a clamping assembly using the quick connect pin assembly of FIG. 4.

To attach the saw unit to the clamp, the user would align a main pivot bore of the saw unit to the axis of the quick connect pin of the clamp, then slideably install the saw unit onto the pin, as depicted in FIG. 5. Specifically, FIG. 5 illustrates a clamping system 2 having the quick connect pin 70 previously described in conjunction with FIG. 4, and a saw assembly 100.

The conical region and tip of the quick connect pin act to open a latch plate integral to the saw unit. The latch plate is spring-biased to an engaged position, but a generous lead-in chamfer of the conical tip of the quick connect pin acts to compress the biasing spring and allow the latch pin to rotate about a fixed pivot point. In this manner, there is no user input required to latch the saw unit to the clamp unit. The latch plate movement occurs through the sliding installation of the saw unit to the clamp. When installed, a concave cutout in the latch pin engages the circumferential groove in the quick connect pin, locking the saw unit and clamp unit together.

Figure 6:
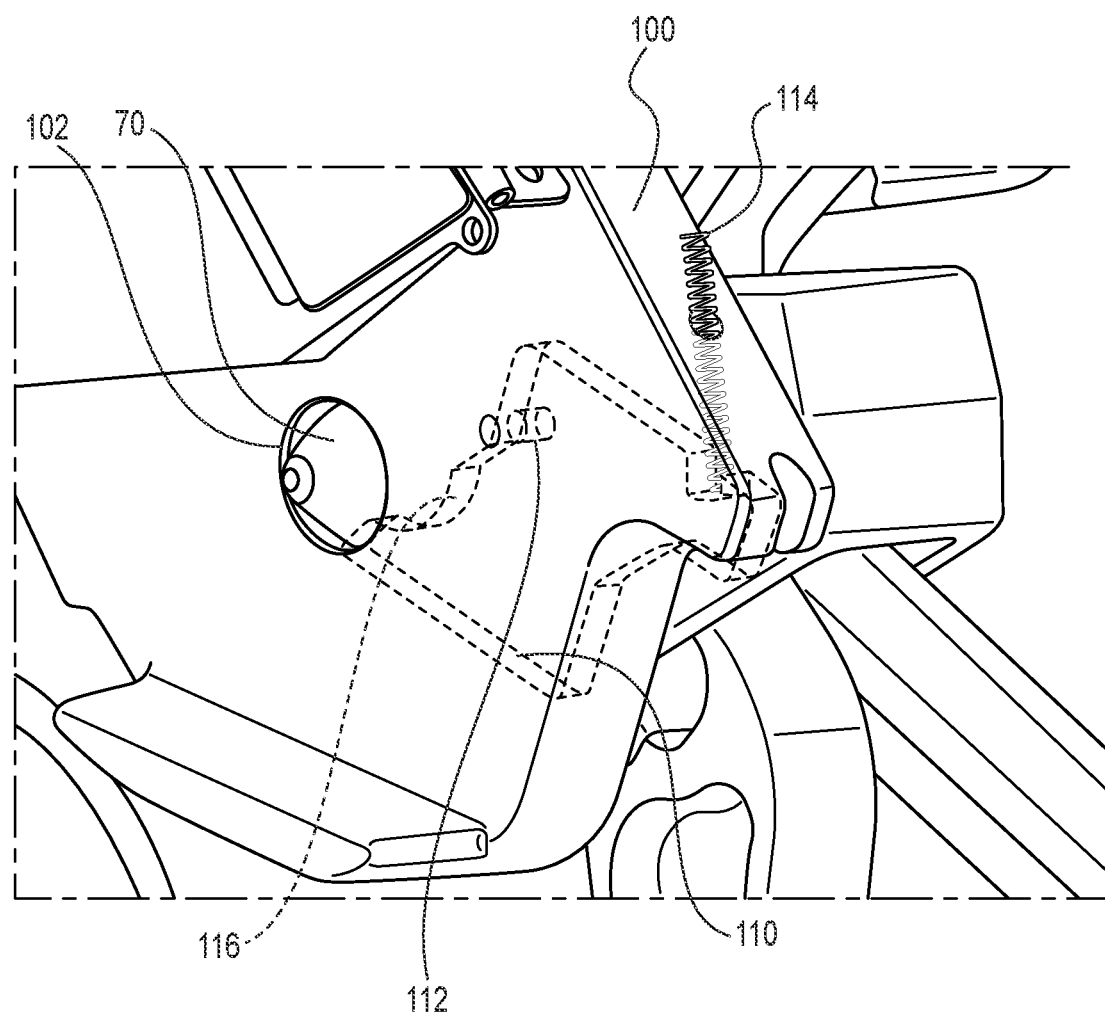
FIG. 6 illustrates an embodiment of a saw connection latch plate assembly in accordance with the present subject matter.

FIG. 6 illustrates an embodiment of a positionable latch plate 110 of a saw assembly 100 engaged with the previously described quick connect pin 70. The latch plate 110 is pivotally positionable about a pivot member 112. A spring or other biasing member 114 is provided to urge the latch toward an engaged position as shown in FIG. 6. The latch plate 110 defines a cutout 116, which is preferably a concave cutout, sized and shaped to fittingly engage and particularly be disposed in, the circumferential groove 78 (see FIG. 4) of the pin 70. The cutout engages the groove to thereby restrict axial movement. The present subject matter also includes assemblies in which the cylindrical bore of the alignment plate is axially positioned with the pin to engage the pin in the bore.

To remove the saw unit from the clamp, the user would depress a latch plate manual release point to pivot the latch plate concave cutout out of engagement with the circumferential groove of the quick connect pin, then slideably translate the saw unit along the axis of the quick connect pin to separate.

The quick connect pin of the clamping system is optimally configured to utilize two different diameters that engage corresponding bored surfaces on the saw unit. These different diameters improve the ease of use installing or disassembling the saw unit from the clamping unit by more quickly separating the tight clearance bore and shaft faces compared to a single diameter interface. The transition between the two different diameters can be achieved in many ways, but in many embodiments, the present subject matter provides a tapered transition. Likewise, the interface between the quick connect pin of the clamp and the pivot bore of the saw unit is optimally configured using bushings or bearings that promote easy axial installation and rotation during use, and preventing galling or other surface wear that is possible in this connection. It will be understood that the quick connect pin could also utilize two different cross sectional shapes such as a first region having a square shaped cross section and a second region having a round or circular cross section. In addition or alternatively, the quick connect pin could use two or more regions having different sizes or cross sectional spans.

Figure 7:
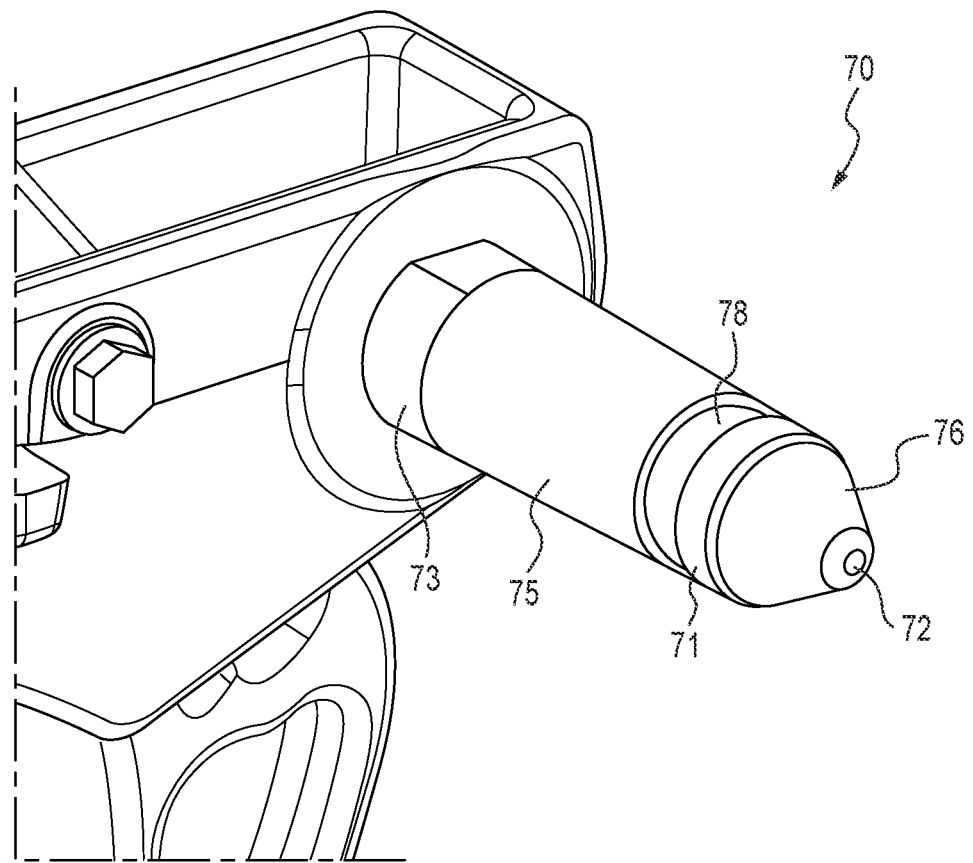
FIG. 7 illustrates details of another embodiment of a quick connect pin in accordance with the present subject matter.

FIG. 7 illustrates another embodiment of a quick connect pin 70 utilizing two different diameters for engaging corresponding bored surfaces or apertures on a saw unit. In this version, the pin 70 defines a first circumferential region 71 having a first diameter $D_1$, a second circumferential region 73 having a second diameter $D_2$ which is greater than $D_1$, and a tapered transition region 75 extending between the regions 71 and 73. Typically, the previously described groove 78 is between the two regions 71, 73 having different diameters. And in certain versions, the groove 78 is also between the first region 71 and the transition region 75.

When the saw unit is properly installed onto the quick connect pin, the saw unit can be rotated on the quick connect pin of the clamping system until an alignment plate on the saw unit engages the grooved guide of the clamp. The tightly toleranced grooved guide accepts the alignment plate and controls the orientation of the saw unit to the clamp to ensure efficient and accurate use of the tool without misalignment when cutting the workpiece.

Figure 8:
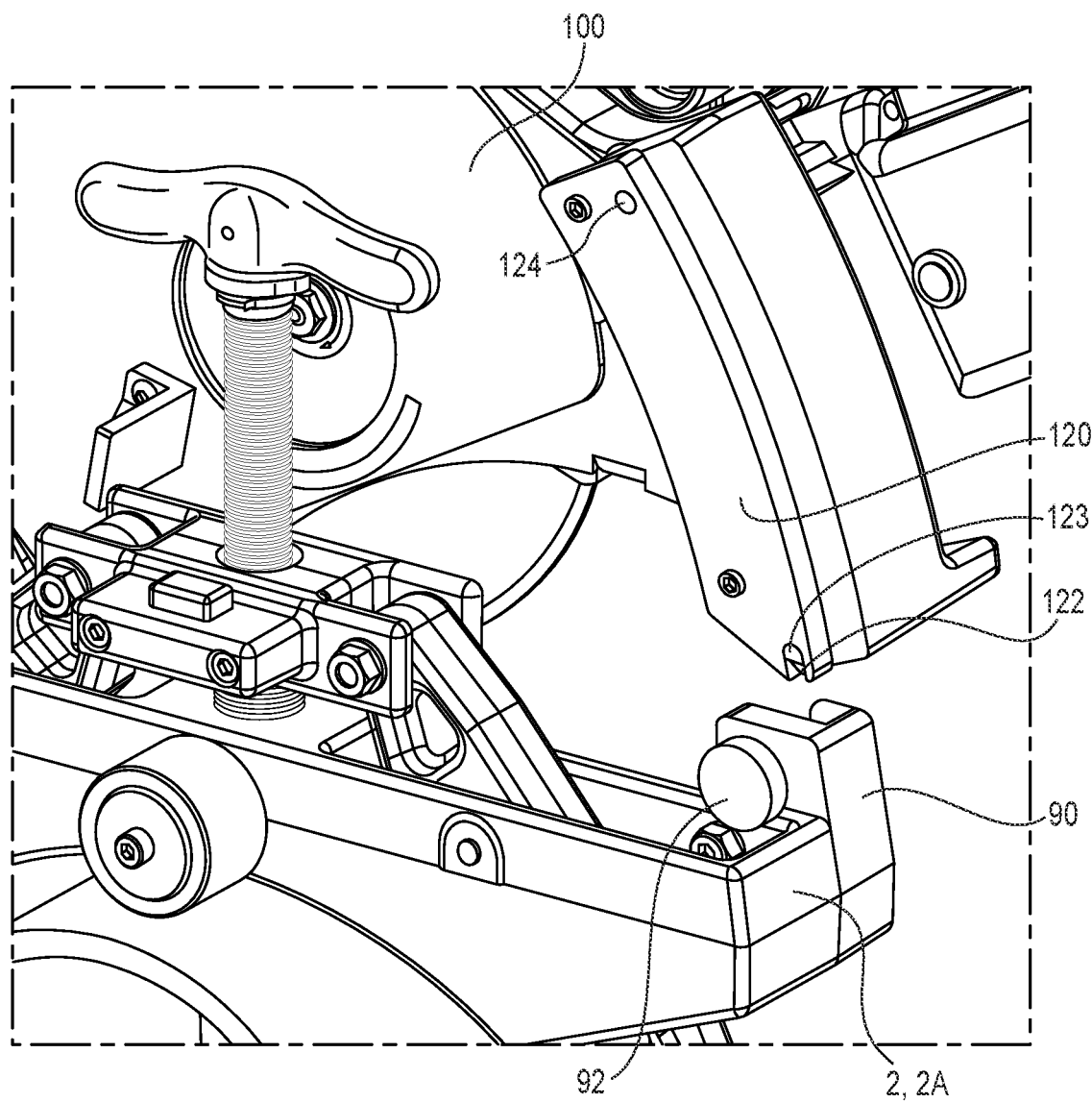
FIG. 8 illustrates details of an embodiment of a plunge guide assembly used in the clamp and saw joint assembly of the present subject matter.

FIG. 8 illustrates an embodiment of a plunge guide assembly including an alignment plate 120 attached to the saw assembly 100. The alignment plate 120 engages the grooved guide 90 noted in association with FIG. 4. The grooved guide 90 is affixed or otherwise secured to the clamping system 2 and particularly the central carriage 2A. The plunge guide assembly comprises the alignment plate 120 and the noted grooved guide 90.

As the saw unit is rotated such as about the quick connect pin, an entry slot on the alignment plate of the saw unit depresses a spring-biased depth lock pin on the clamp until the depth lock pin reaches a cylindrical bore that allows the spring-biased pin to extend and lock the saw in position. In this manner, the saw unit is fully assembled to the clamp without requiring user input to lock it in place, and is positioned in a "ready" position for use.

Figure 9:
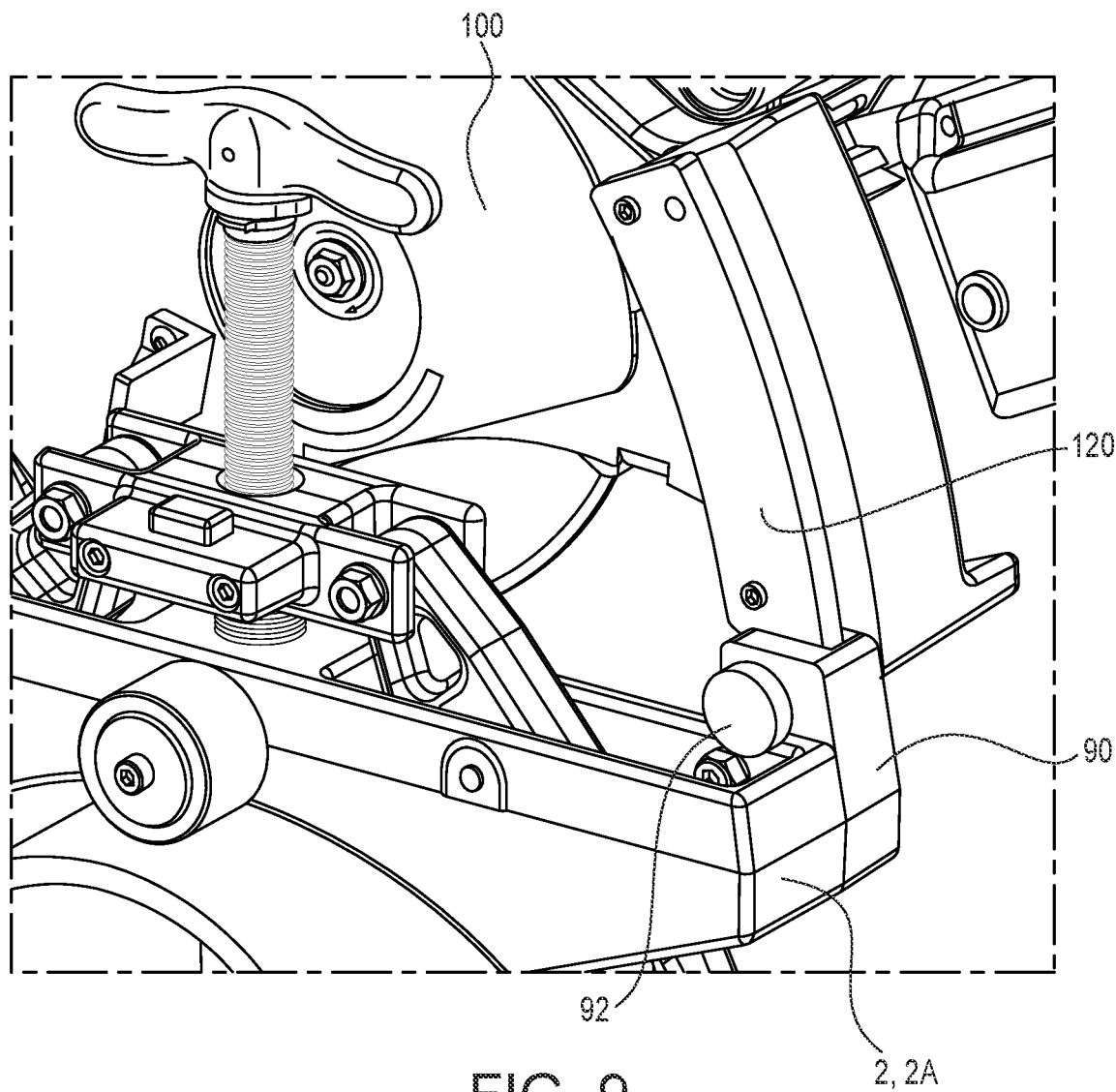
FIG. 9 illustrates the clamp and saw joint assembly of FIG. 8 with the saw in a "ready" position.

FIGS. 8 and 9 illustrate engagement between the alignment plate 120 of the saw 100 and the grooved guide 90 of the clamping system 2. The alignment plate 120 defines an entry slot 122 providing access to a cylindrical bore 123. The guide groove includes an axially positionable depth-lock pin 92. The pin 92 is typically biased to an engaged position. Upon engaging the alignment plate 120 and the guide groove 90, the entry slot 122 depresses or otherwise actuates the pin 92 so the pin 92 engages the cylindrical bore 123 in the alignment plate 120 to thereby lock the saw 100 in a fixed position relative to the clamping system 2.

To cut through the pipe wall, the user actuates the power supply of the tool to begin cutting blade rotation, then retracts the depth lock pin 92 to disengage the pin from a ready-position bore 123 of the saw unit. The user would rotatably guide the saw unit to cut through the pipe wall until the depth lock pin 92 engages a plunged-position bore 124 of the alignment plate 120. When this engagement occurs, the saw unit has reached its maximum plunge rotational travel and is locked in place. The user can then guide the saw unit around the pipe circumferentially to separate the workpiece.

The present subject matter also provides the use of an interlock switch assembly that prevents use of the cutting head when the saw unit is not mechanically attached to the clamping system. While there are many ways of achieving this, a preferred embodiment utilizes a micro switch that electrically interrupts/disconnects the power supply from the saw motor when the quick connect pin is not installed through the main pivot bore of the saw unit. When the quick connect pin is engaged by the saw, an actuating paddle is pivoted to engage the interlock switch, closing the electrical circuit and allowing tool use. Thus, in many versions, with insertion of the saw to the clamping system through a receiving feature, the electrical switch is closed to thereby allow operation of the saw.

Figure 10:
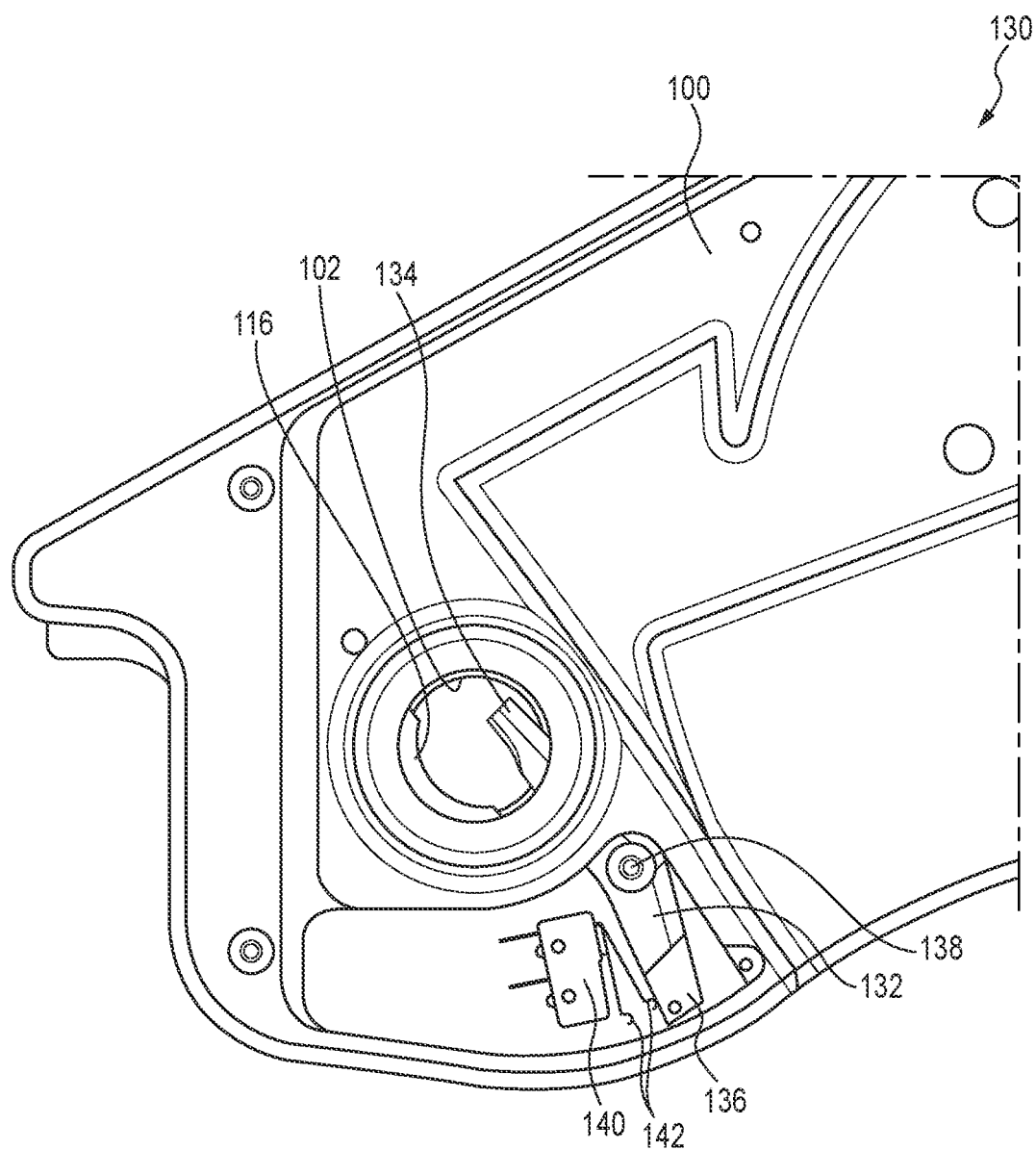
FIG. 10 illustrates details of an embodiment of an interlock system in accordance with the present subject matter.

FIG. 10 illustrates an embodiment of an interlock system 130 in accordance with the present subject matter. The interlock system 130 is incorporated in a saw assembly 100 that includes a receiving aperture 102 or main pivot bore sized and shaped to receive and accept the quick connect pin 70. The interlock system 130 comprises a positionable paddle 132 having an engagement end 134 and a working end 136. The paddle 132 can be pivotally mounted to the saw assembly 100 via a pin 138 or like member. The interlock system 130 also comprises an electrical switch 140 with a lever contact(s) 142 positionable between an open state and a closed state occurring when the quick connect pin 70 is inserted within the receiving aperture 102 thereby moving the paddle 132 to cause closure of the switch contacts 142 and thereby complete the electrical circuit. It will be understood that FIG. 10 illustrates two positions for the lever contact 142, an open position and a closed position.

The present subject matter also provides a blade guard system. The saw unit features a plurality and typically two blade guards that pivot around the same axis as the saw cutting blade. The blade guards are spring-biased to a closed position shown in FIG. 11, with an optional stop controlling the limit of their rotational travel. Optimally, a single spring is used to bias the guards towards each other and prevent user access to the blade. In another embodiment, two separate springs could be used to independently control each blade guard. The stop is ideally comprised of a rubber material to reduce wear on the guards.

Figure 11:
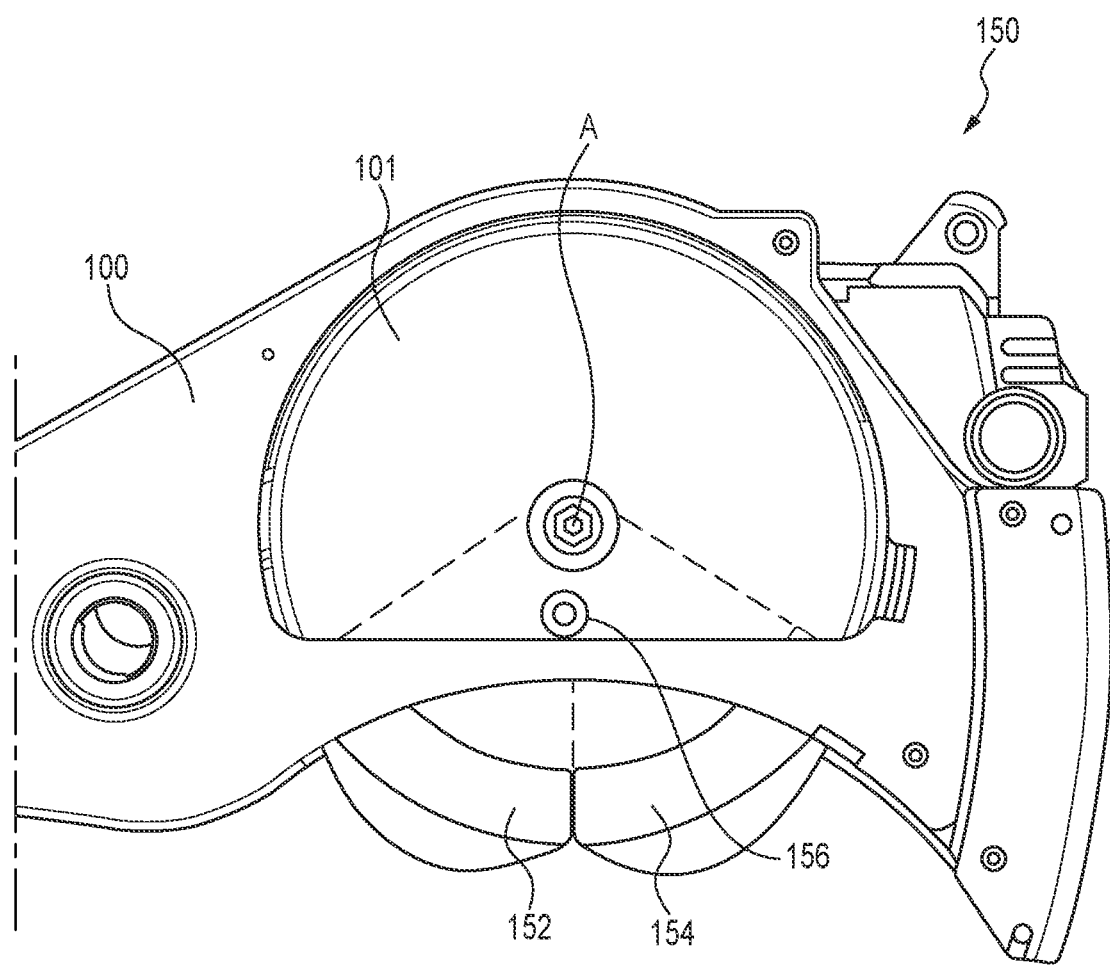
FIG. 11 illustrates an embodiment of a blade guard system in accordance with the present subject matter.
Figure 12:
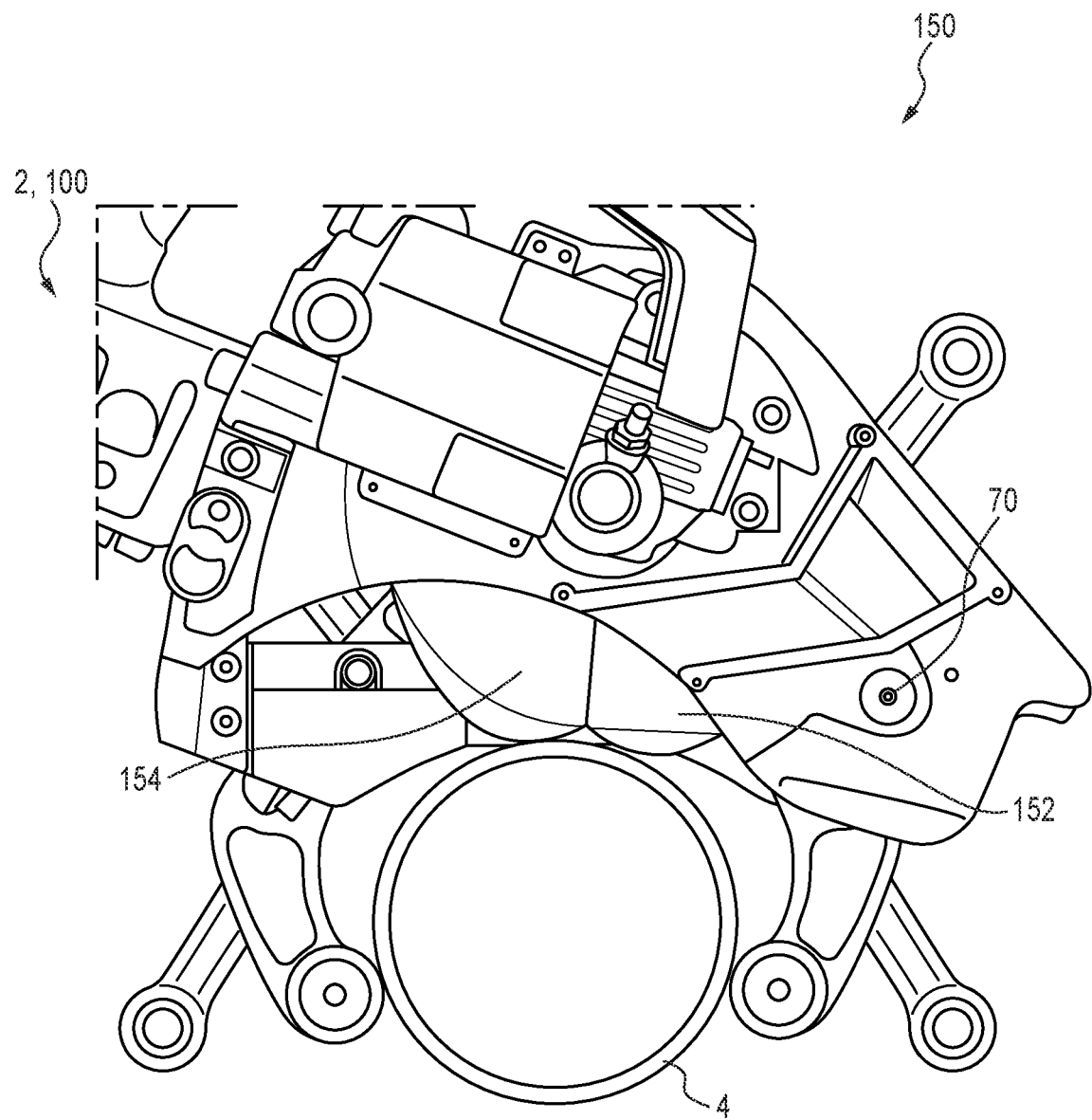
FIG. 12 illustrates the blade guard system of FIG. 11 in a configuration in which a saw blade is completely guarded.

Specifically, FIGS. 11 and 12 illustrate an embodiment of a blade guard system 150 in accordance with the present subject matter. The blade guard system 150 is incorporated in a saw assembly 100 with a rotary blade 101 and comprises a forward blade guard 152 and a rearward blade guard 154. The forward blade guard 152 and the rearward blade guard 154 pivot about the axis of rotation of the saw blade 101, shown as axis A. As previously described, one or more springs or other biasing members are used to bias the guards 152, 154 to their closed position as shown in FIG. 11. Thus, the blade guards when closed reduce access to the saw blade 101. The blade guard system 150 can include a stop 156 that controls or limits the extent of rotational travel of the guards 152, 154 about axis A.

Referring further to FIG. 12, when the saw unit 100 is being installed onto the clamping system 2, the spring-biased forward and rearward blade guards 152, 154 cover the teeth of the blade 101 that would otherwise extend from the saw 100.

Figure 13:
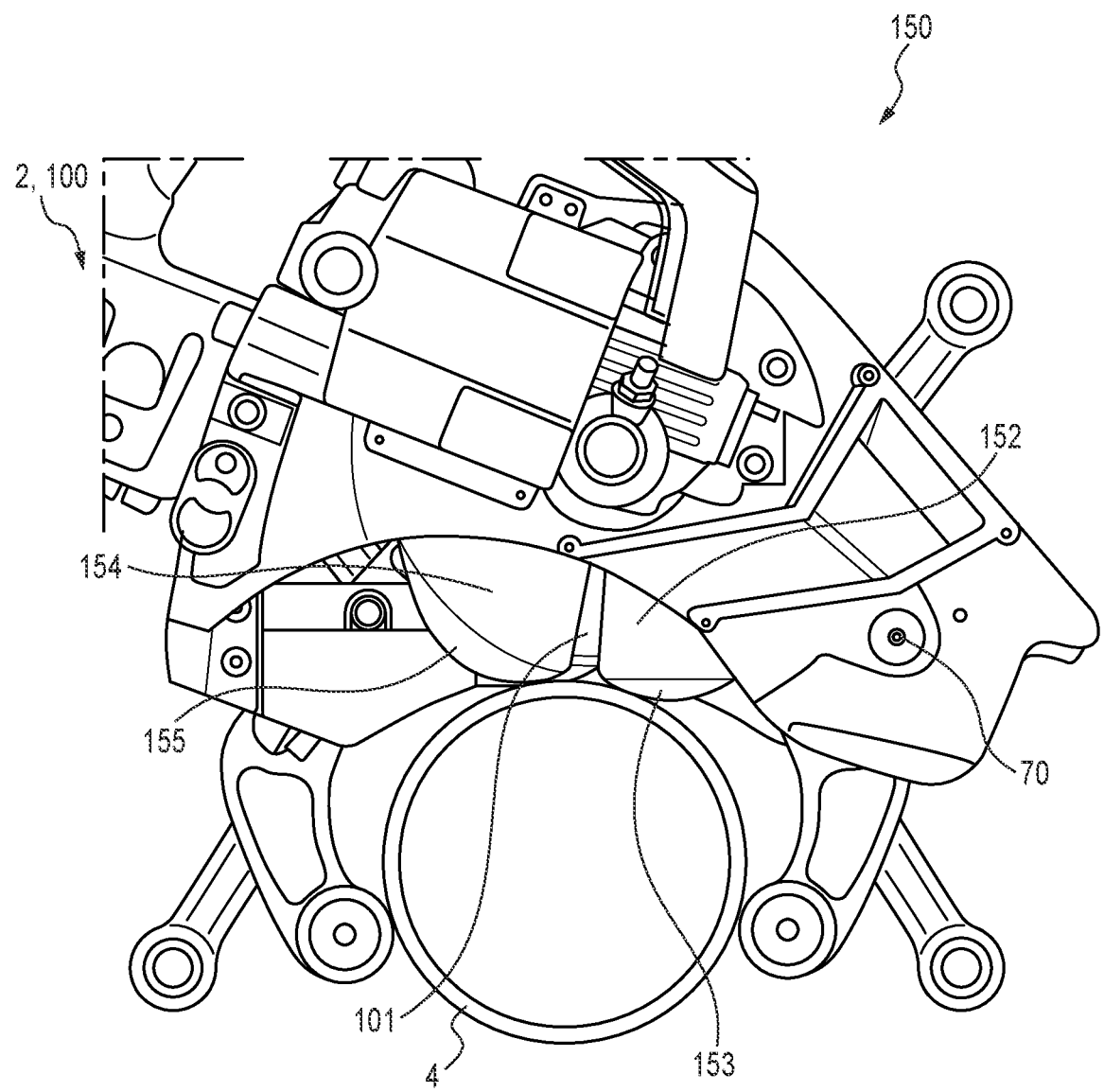
FIG. 13 illustrates the blade guard system of FIG. 11 upon saw rotation and opening of a rearward guard.

Referring to FIG. 13, as the user rotates the saw unit 100 about the quick connect pin 70 to reach the "ready" position of the saw unit, the rearward blade guard 154 makes contact with the outer diameter of the pipe 4 via a raised fin 155 along the outside profile of the guard 154. This fin 155, along with a similar fin 153 on the forward blade guard 152, is configured such that the pivoting motion of the saw 100 urges or otherwise displaces the blade guards 152, 154 to open, against the spring-bias, to allow the blade 101 to contact the pipe 4 surface. FIG. 13 illustrates the initial opening of the rearward blade guard 154 due to this contact with the saw in the "ready" position.

Figure 14:
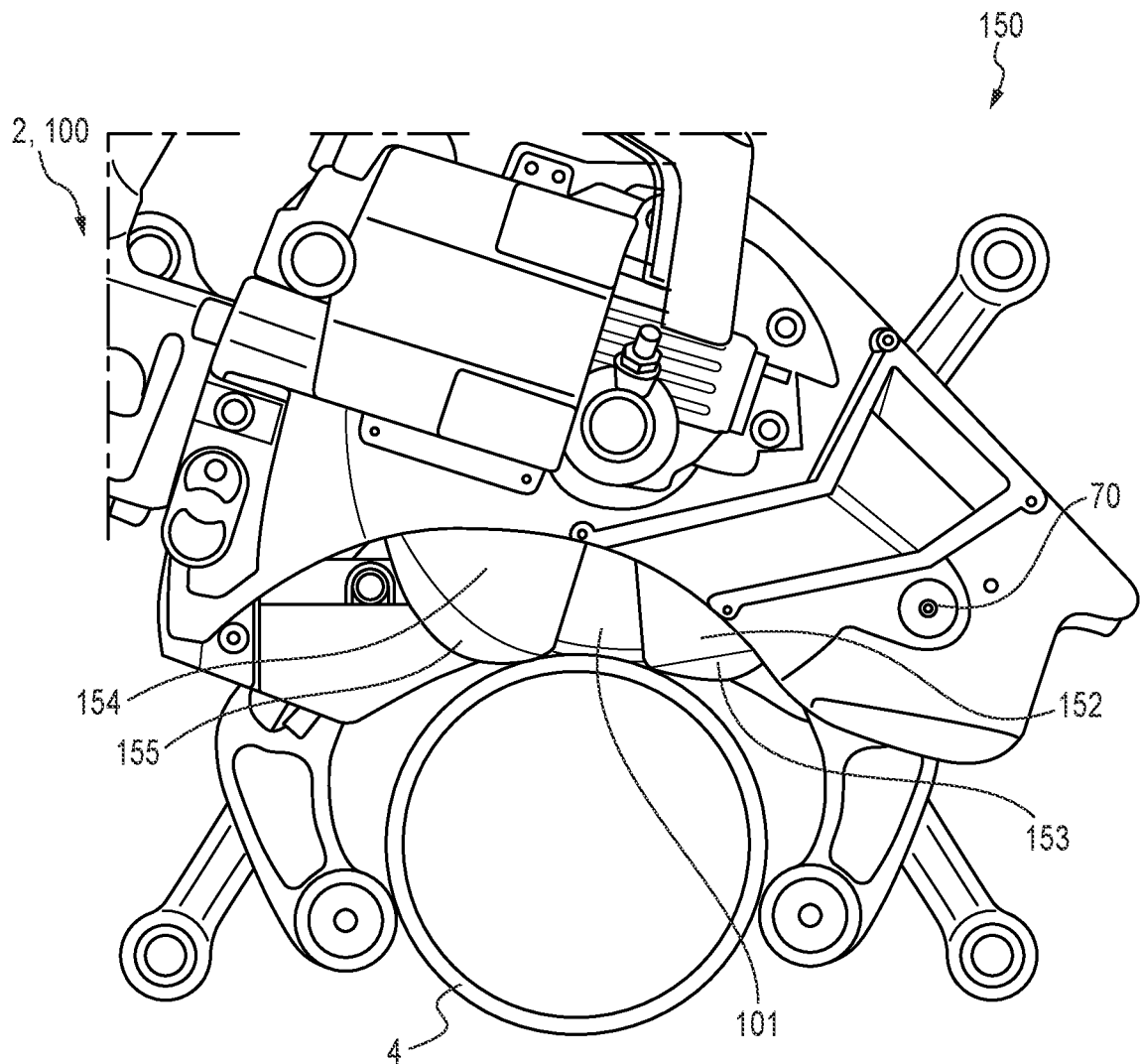
FIG. 14 illustrates the blade guard system of FIG. 11 in a configuration in which a saw blade is depicted cutting a pipe.

Referring to FIG. 14, when the user intends to cut the pipe 4, the saw blade is engaged with the pipe 4 and the user rotatably moves the saw 100 to plunge the blade 101 into the pipe 4 wall. With this additional plunge rotation, the rearward blade guard 154 continues to pivot open further, and the fin 153 on the forward blade guard 152 similarly causes the forward blade guard 152 to rotate about its pivot and further expose the saw blade 101 for adequate contact into the pipe wall.

Figure 15:
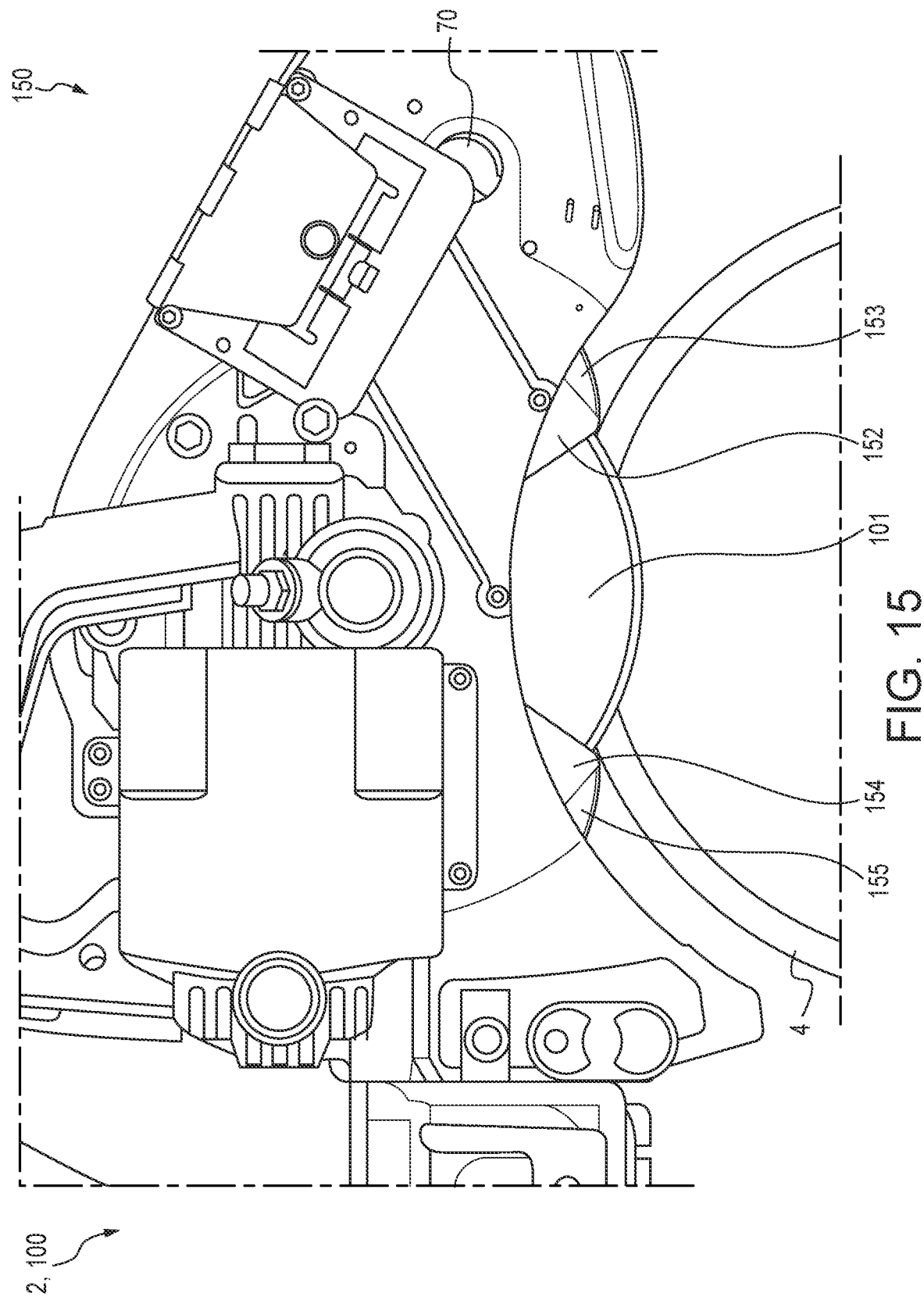
FIG. 15 illustrates the blade guard system of FIG. 11 with a saw at a "plunged" position.

Referring to FIG. 15, the saw blade guard rotation continues until the saw 100 reaches the fully plunged position. At this position, and throughout the positions previously described, the teeth of the blade 101 are covered from direct contact by the end user; the only exposure of cutting blade teeth occur inside the pipe 4. Further, the pivoting motion of the forward and rearward blade guards 152, 154 about the same axis as the cutting blade 101 is ideal as it prevents inadvertent movement of the guard by wedging, or linear movement, between the pipe 4 and the saw 100. Restated, the pivoting motion of the guards 152, 154 prevents access to the blade 101 between the pipe 4 and saw 100. Thus attempting to open the guards in this area will be unsuccessful.

The present subject matter also provides a system for chip management for optimum saw use. In this embodiment, the forward blade guard features a diverging profile opening that allows chips to exit the blade teeth after the chips are created through the pipe wall. Restated, the blade guard profile does not have a circular profile with center position coaxial with the blade, thereby creating more radial distance between the blade and the guard as the chips move from the pipe or workpiece. Further, the housing of the saw is configured with a large chip exit channel that directs chips out of the main saw blade housing quickly, thereby reducing the number of chips recycled around the housing.

Figure 16:
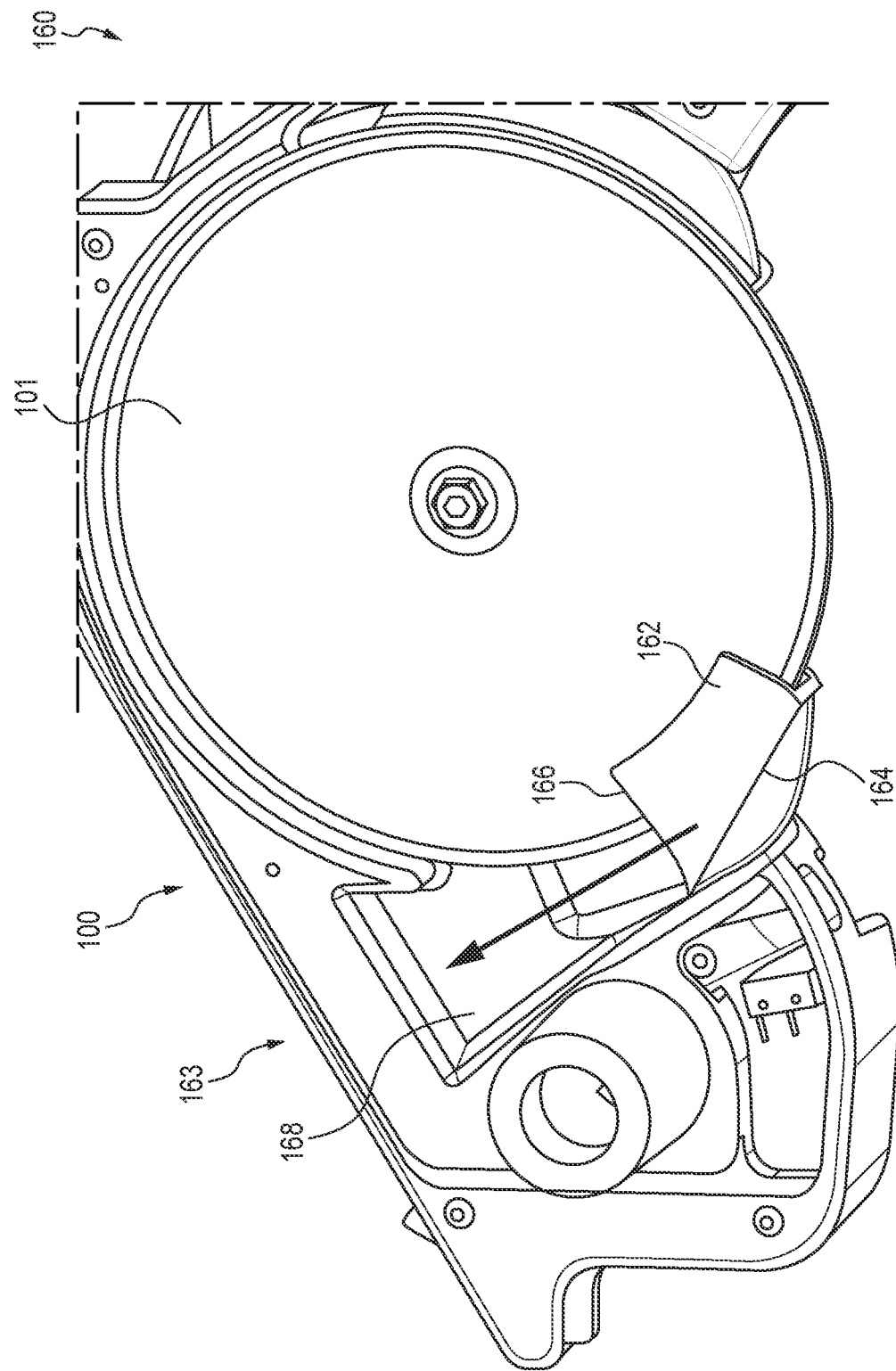
FIG. 16 illustrates details of an embodiment of a chip management system with a chip channel provided in a saw in accordance with the present subject matter.

Referring to FIG. 16, an embodiment of this system 160 incorporated in a saw 100 is shown. The chip management system 160 comprises a blade guard 162. The blade guard 162 is positioned near or alongside the rotary blade 101 of the saw 100. The blade guard 162 differs from the previously described forward blade guard 152 in that the blade guard 162 utilizes an interior region with one or more diverging wall(s) 164 that extend toward an exit 166 directed away from the saw blade 101. The reference to diverging wall(s) refers to a wall orientation that diverges away from the blade circumference. In addition, the chip management system 160 comprises one or more primary channels(s) 168 defined within or by the body or enclosure of the saw 100. These channel(s) 168 are configured, i.e., sized, shaped, and/or oriented, to direct chips out of the saw 100. Specifically, the channel 168 extends between the exit 166 of the blade guard 162 and an opening 163 in the saw 100 for dispelling chips.

Figure 17:
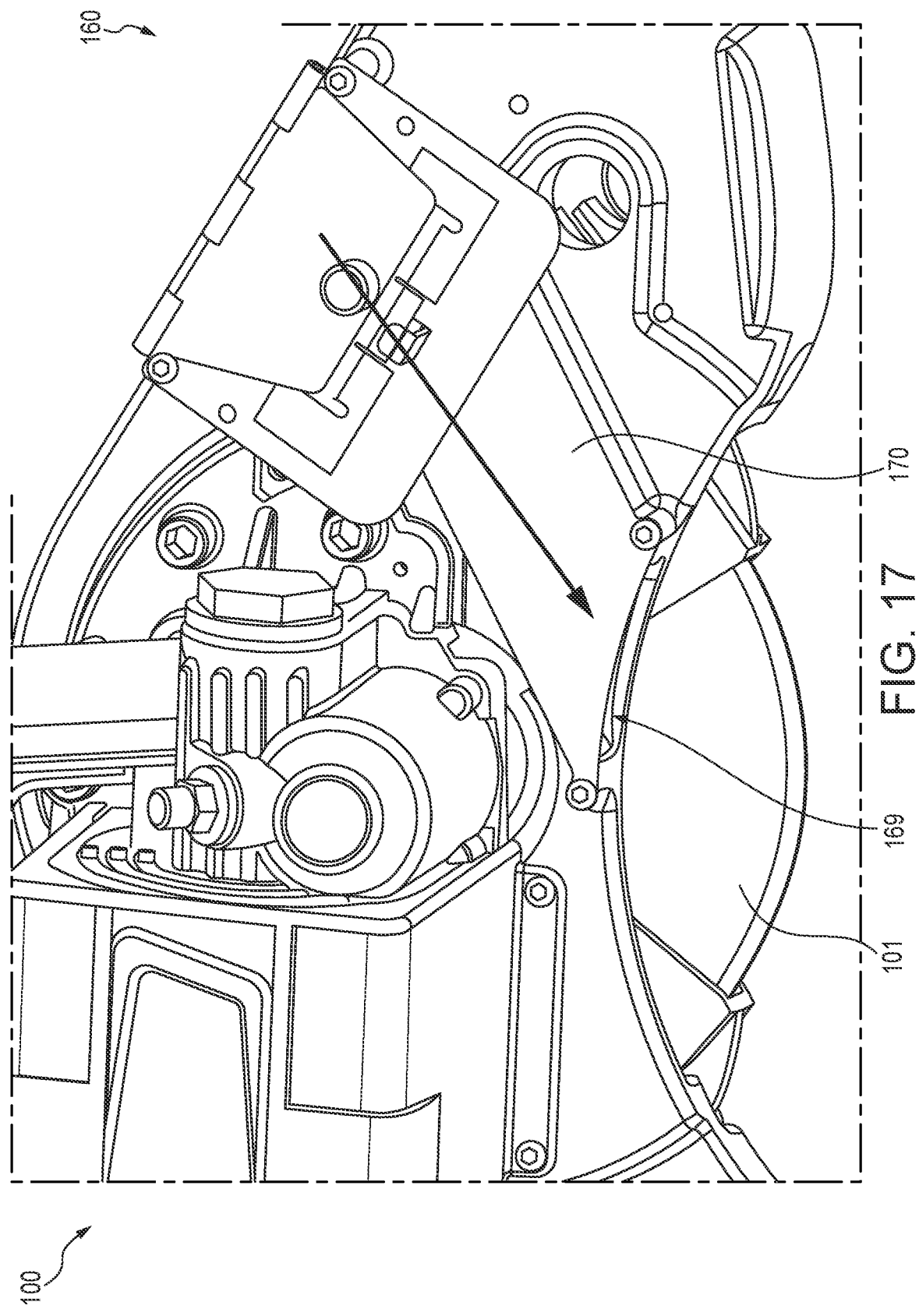
FIG. 17 illustrates an embodiment of a chip management system with a secondary chip channel in a saw with a cover installed, in accordance with the present subject matter.
Figure 18:
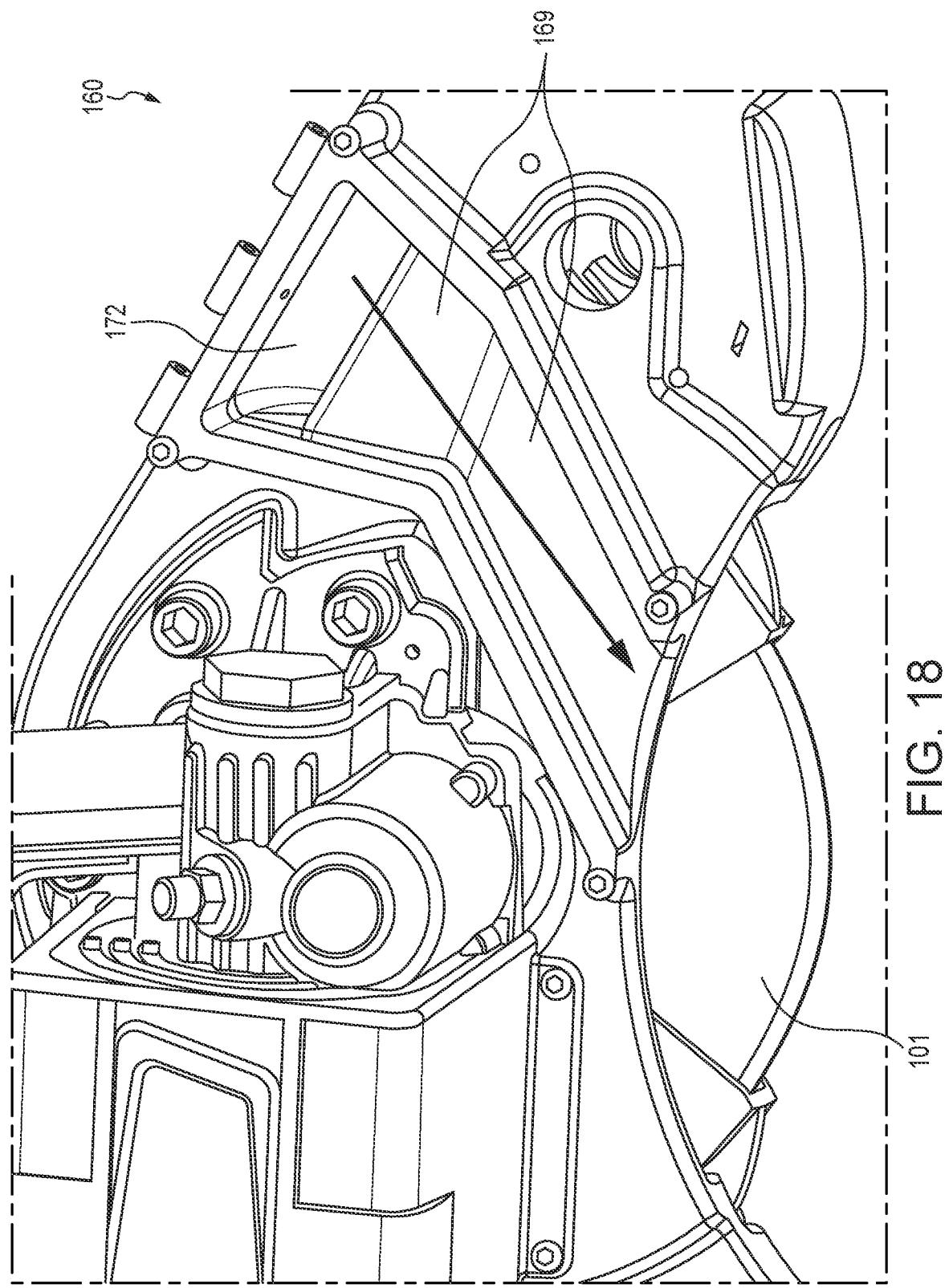
FIG. 18 illustrates the chip channel of FIG. 17 with the cover removed.

In certain embodiments, as chips reach the exit channel, they enter another channel 169 on the opposite side of the saw or similar tool. See FIG. 17 and FIG. 18 which illustrate this channel 169 with and without the protective covers installed, respectively. Specifically, FIGS. 17 and 18 show the saw 100 with a secondary channel 169 within the body or enclosure of the saw 100. A port 172 or other opening provides communication for chip flow from the previously described primary channel 168 to the secondary channel 169. One or more protective cover(s) 170 can be used to enclose the channel 169.

In this manner, high velocity chips are slowed through the change in direction induced by the exit channels. That is, in many embodiments turning or altering chip direction is important to slow chip velocity. Likewise, the chips are directed back towards the pipe or workpiece, thereby reducing their projection towards the operator. This configuration helps control the chip path and improves clean-up effort required by limiting the extent of chip positions after exiting the tool.

For some pipe materials, for example polymeric materials, the separated chip segments tend to group together after exiting the blade and cooling down. For these materials, it is ideal to even more quickly dispel the chips from the saw unit. Therefore, an optional deflection door is configured such that, when open, allows these materials to exit the saw unit system earlier than the entire channel distance. Further, this larger opening reduces the likelihood of these chips conglomerating onto obstructions and clumping.

Figure 19:
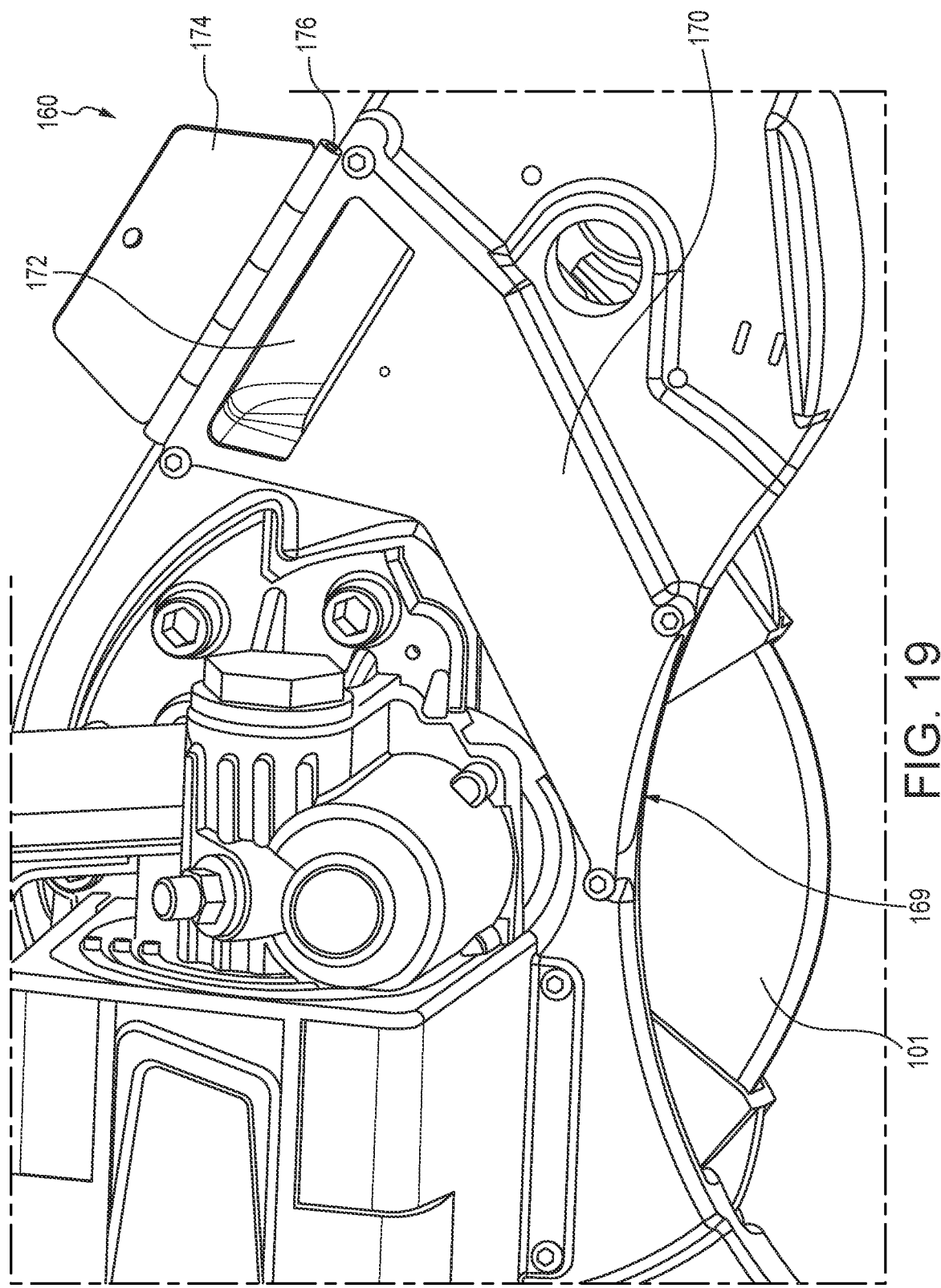
FIG. 19 illustrates additional details of the chip management system with the chip channel of FIG. 17, showing an initial exit open.
Figure 20A:
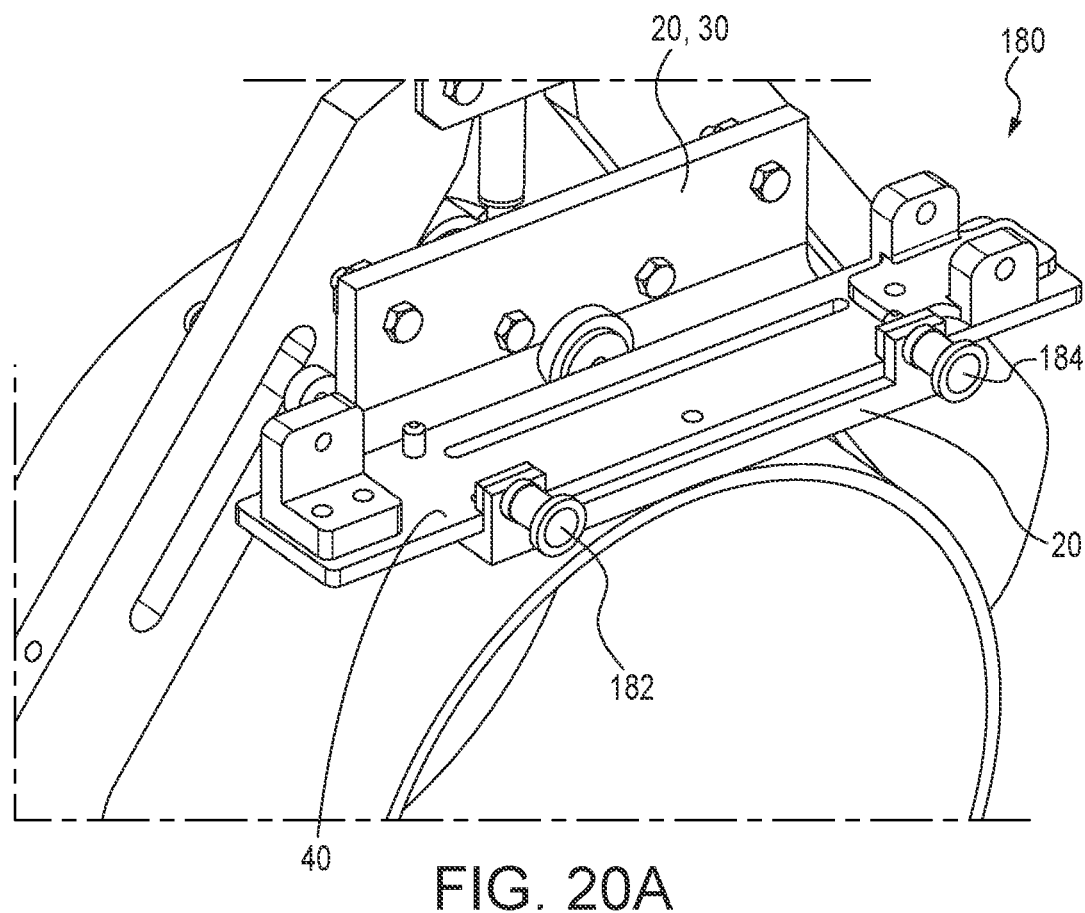
FIGS. 20A-20D illustrate an embodiment of a horizontal spring pin assembly in association with a clamp and saw joint assembly in accordance with the present subject matter.
Figure 20B:
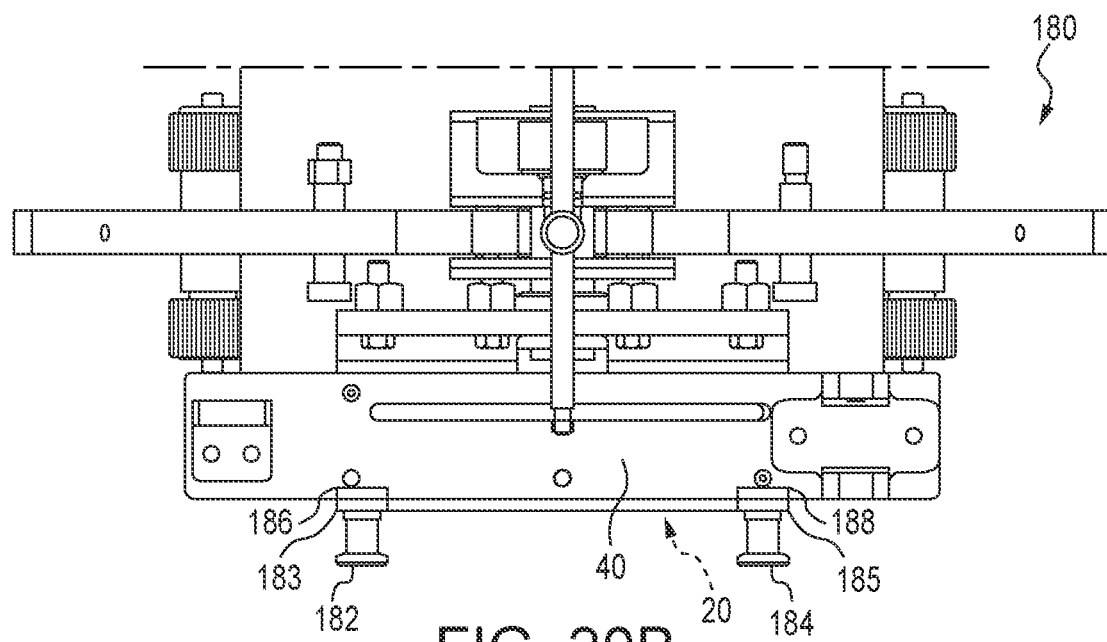
Figure 20C:
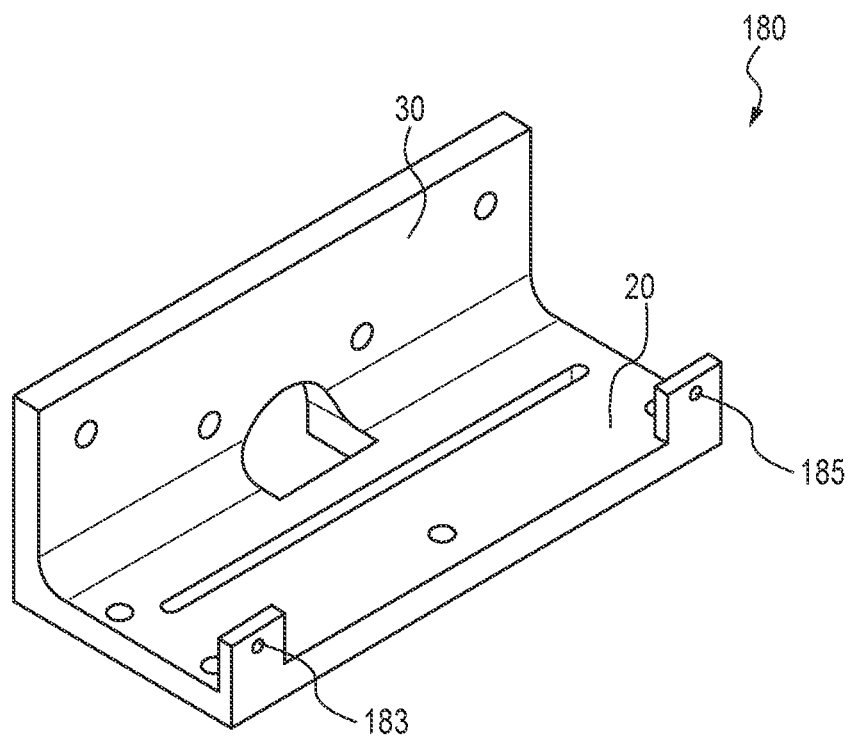
Figure 20D:
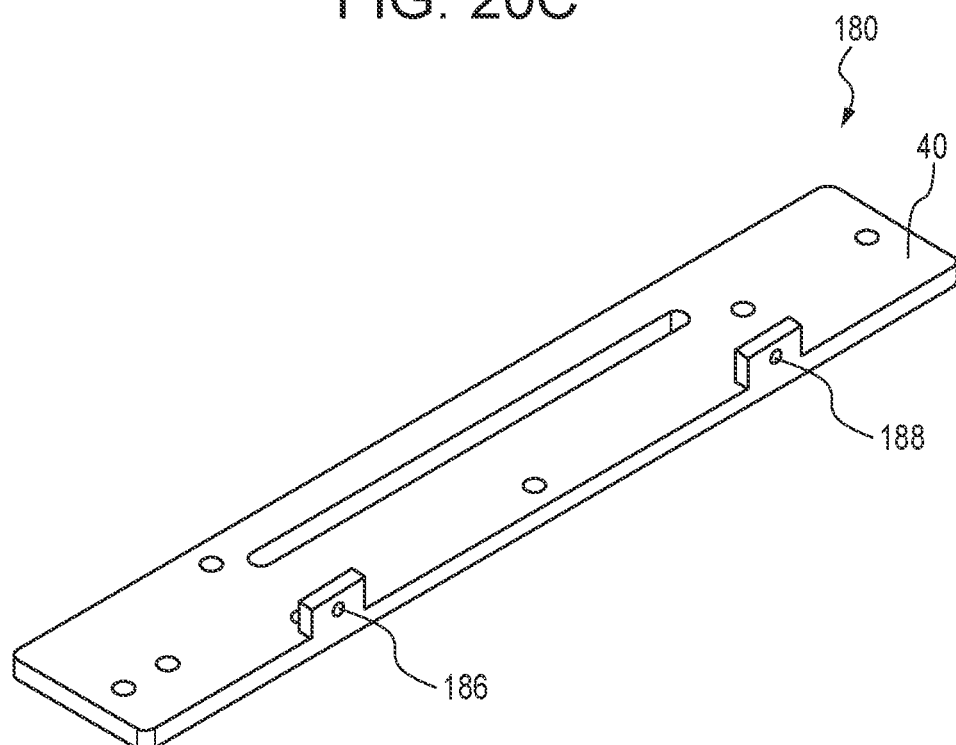
Figure 21A:
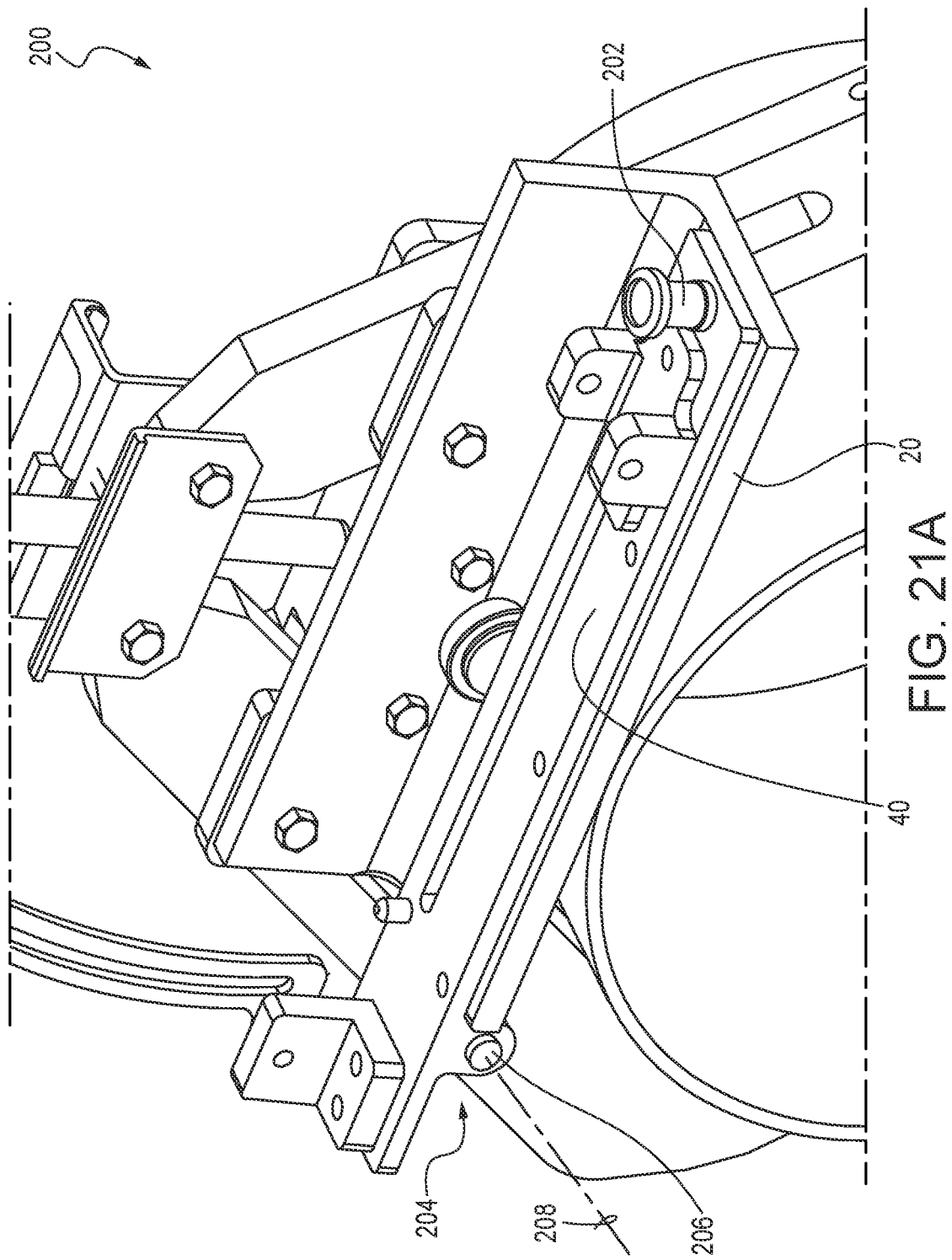
Figure 21C:
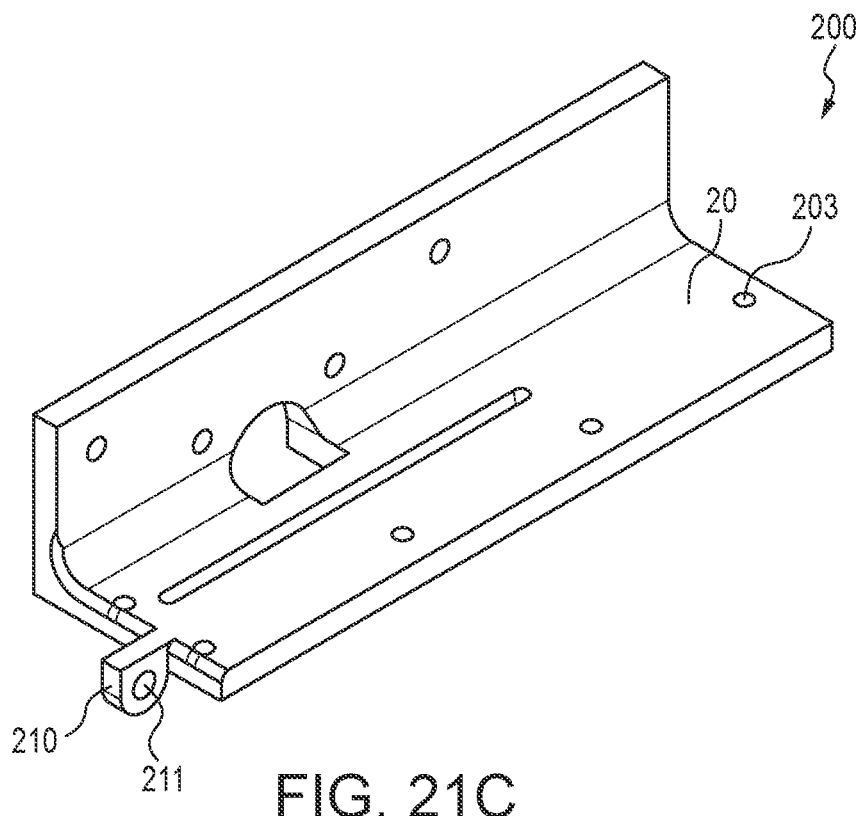
Figure 21D:
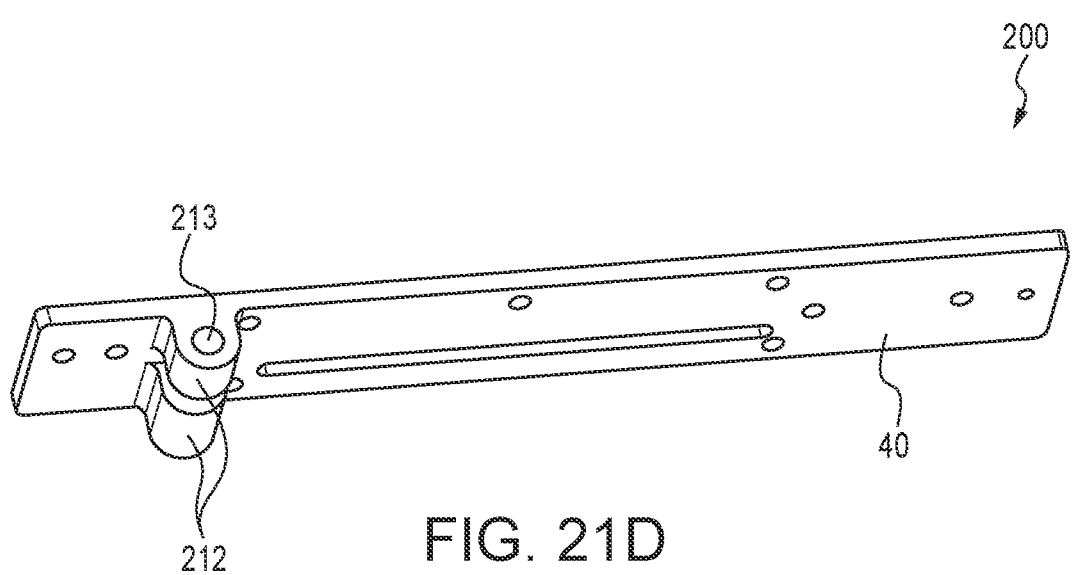
Figure 21E:
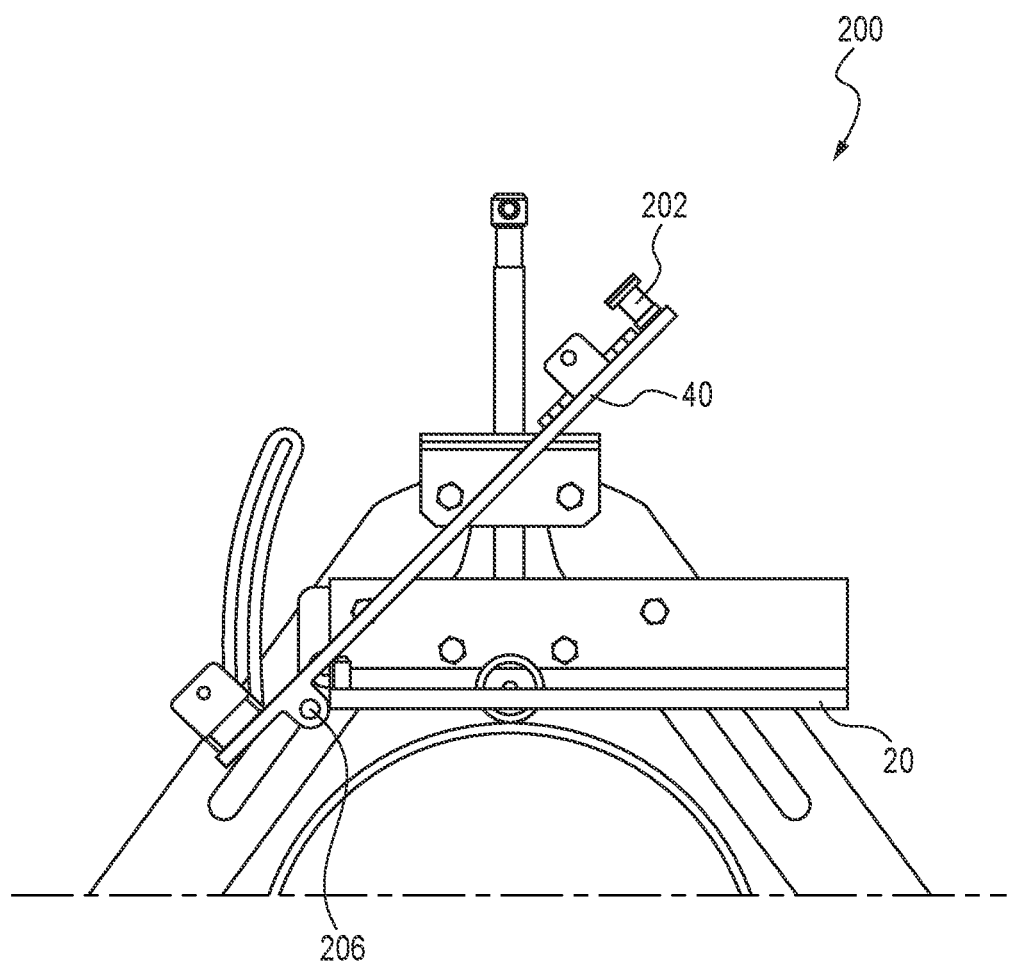
Figure 21F:
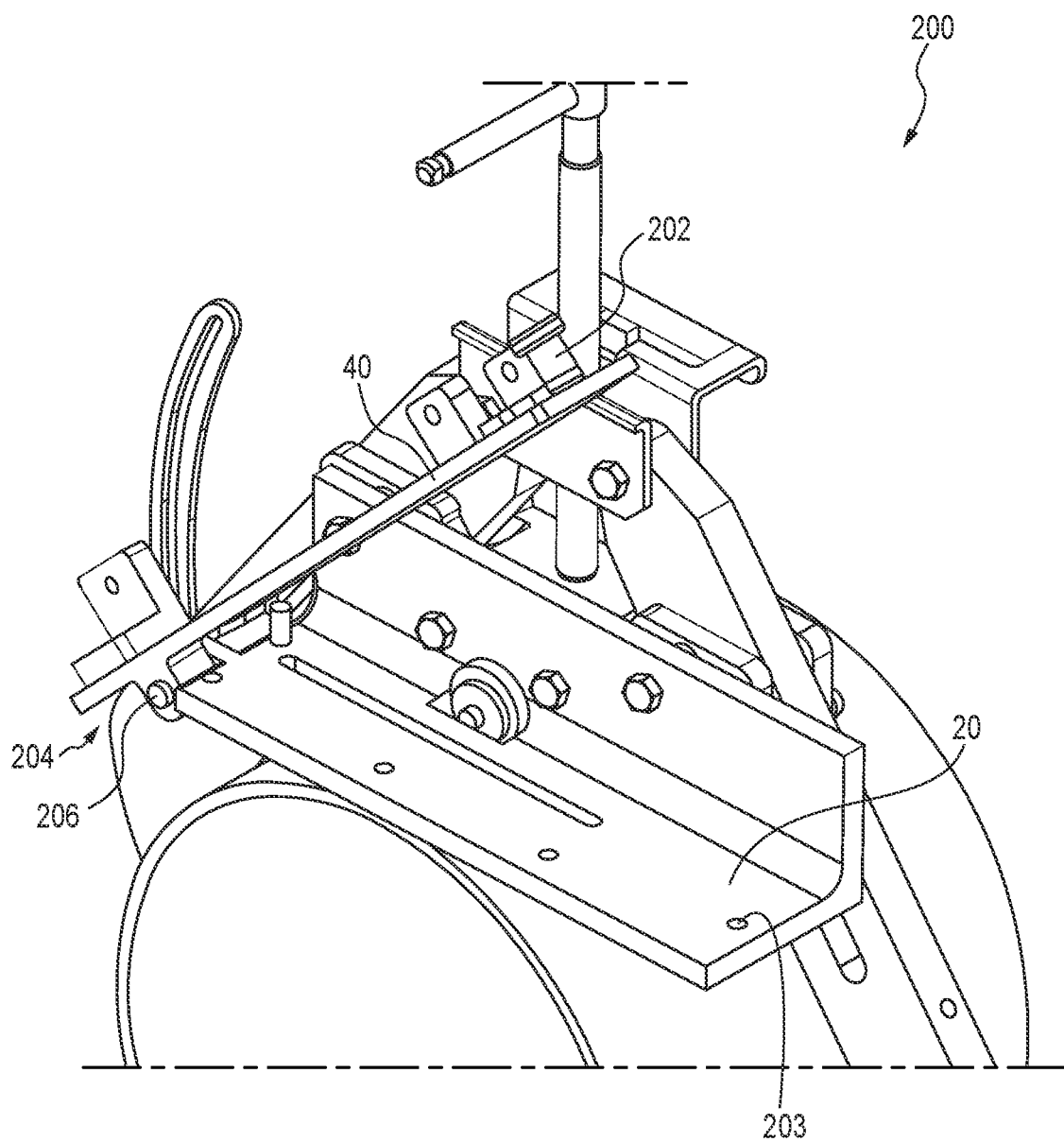

FIG. 19 illustrates an embodiment of a selectively positionable deflection door 174 that provides access to the port 172 and/or the primary and/or secondary channels 168, 169 in the saw 100. As will be understood, upon opening the door 174 such as shown in FIG. 19, access and early exit from the saw 100 for chips is provided. A wide array of assemblies can be used for selective positioning of the door 174, such as a hinge assembly 176. However, the present subject matter includes variations and alternate configurations.

In addition, in certain versions the present subject matter provides a chip deflector as previously described herein as an alternative or in addition to the chip management system.

The present subject matter also provides a method of quickly attaching and detaching the saw to/from the clamping system, which can be achieved through many various assemblies. One such alternative features spring pins mounted to either the saw base or clamp base that guide into holes in the opposite piece (saw base or clamp base) to hold the saw fixed to the clamp. Details of spring pins and other assemblies and particularly assemblies for selectively engaging and/or retaining a clamp base 20 with a saw base 40 are described herein.

Additional Aspects

FIGS. 20A-20D illustrate an embodiment of a spring pin assembly 180. The spring pin assembly 180 is incorporated in the clamp base 20 and the saw base 40 of the saw joint assembly 10. The spring pin assembly 180 comprises at least one axially positionable member biased to extend axially such as a first spring pin 182 and a second spring pin 184. The first spring pin 182 is mounted or otherwise secured to a first mounting aperture region 183 of the clamp base 20. The second spring pin 184 is mounted or otherwise secure to a second mounting aperture region 185 of the clamp base 20. The saw base 40 defines a first receiving aperture 186 and a second receiving aperture 188. The receiving apertures 186, 188 are configured to receive corresponding engagement member(s) of the spring pins 182 and 184. As will be understood, the spring pins 182, 184 include axially positionable members, typically biased to extend axially into an engagement position. Upon engagement and proper alignment of the clamp base 20 and the saw base 40, the members of the spring pins 182, 184 align with and are biased to axially extend into engagement with the receiving apertures 186, 188. As noted, the present subject matter includes embodiments in which one or more of the spring pins are provided on the saw base 40 instead of the clamp base 20. The present subject matter includes orienting the spring pins and receiving apertures at different orientations besides a horizontal orientation as shown in the referenced figures.

Another such assembly utilizes a spring pin that allows the saw base to pivot in position relative to the clamp base, then the two are held securely using a threaded knob at the opposite end. However, the present subject matter includes variations and alternate configurations.

FIGS. 21A-21G illustrate an embodiment of a selectively positionable spring pin assembly 200. The assembly 200 is utilized in association with a clamp base 20 and a saw base 40. The assembly 200 comprises an axially positionable member biased to extend axially such as a spring pin 202. The assembly 200 also includes a receiving aperture 203 in the clamp base 20 configured to receive and engage the member of the spring pin 202. The spring pin 202 is depicted as mounted on the saw base 40 but could be mounted on the clamp base 20 with appropriate relocation of the receiving aperture in the saw base 40. The spring pin assembly 200 also comprises a hinge assembly 204 having a hinge member 206. The hinge assembly 204 moveably retains the saw base 40 to the clamp base 20. The hinge assembly 204 enables the saw base 40 to be selectively positioned about a hinge axis 208 defined by the hinge member 206. Although a wide array of assemblies can be used for the hinge assembly 204, a preferred version is depicted in the referenced figures in which the clamp base 20 includes at least one outwardly projecting hinge finger 210 and the saw base 40 includes at least one outwardly projecting hinge guide 212. As will be understood, each of the hinge finger 210 and the hinge guide 212 define an aperture 211, 213 through which the hinge member 206 extends upon assembly of the saw base 40 to the clamp base 20. A slotted opening on the saw base 40 can allow a threaded connector, integral to or otherwise associated with the clamp base, to engage and hold the two rigidly together when inserted and tightened.

Figure 22A:
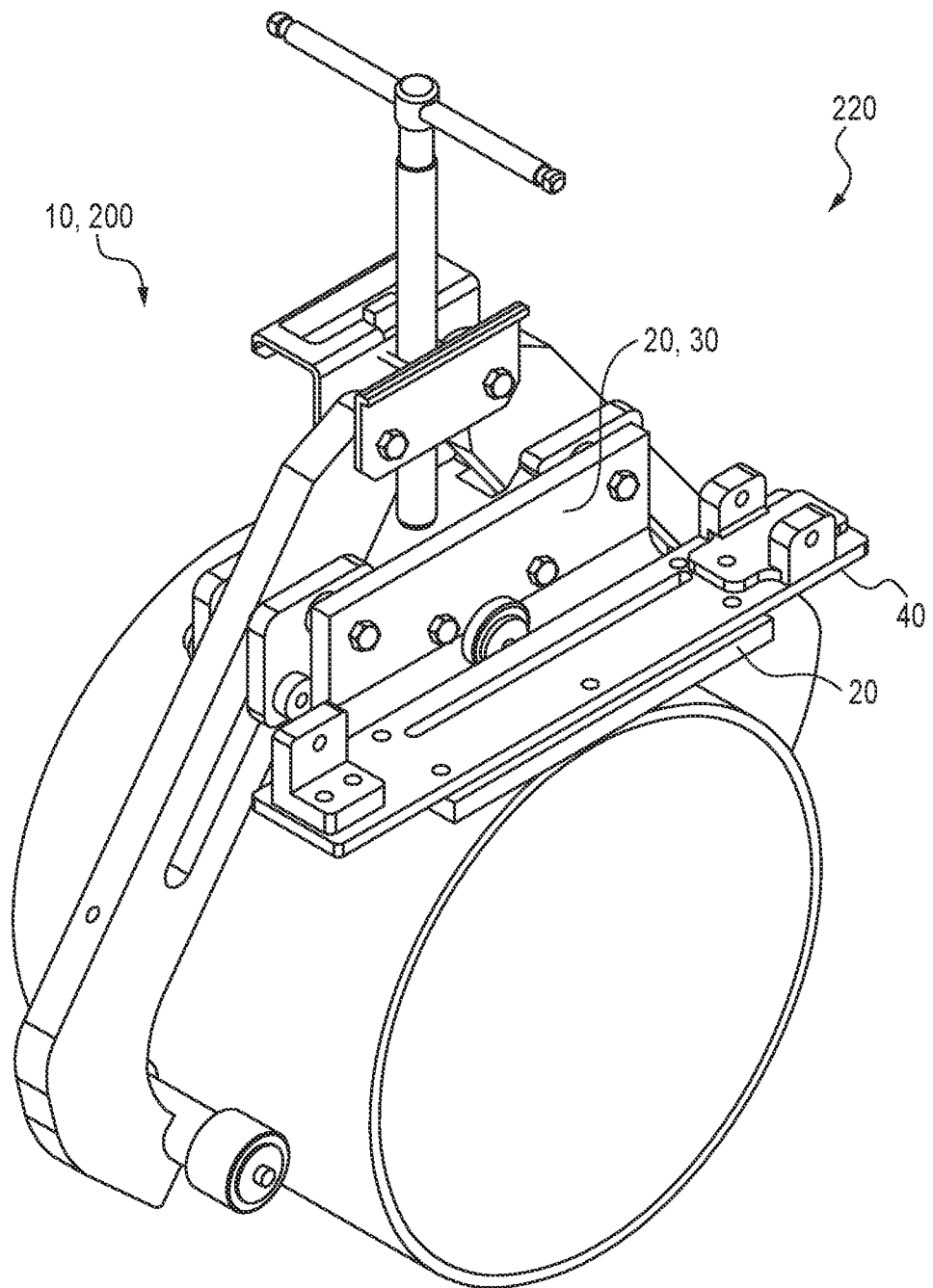
FIGS. 22A-22E illustrate an embodiment of a slotted assembly in association with a clamp and saw joint assembly in accordance with the present subject matter.
Figure 22B:
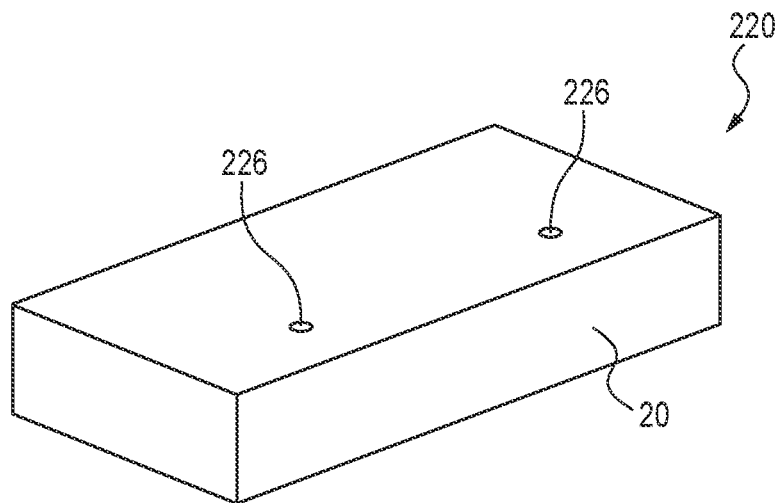
Figure 22C:
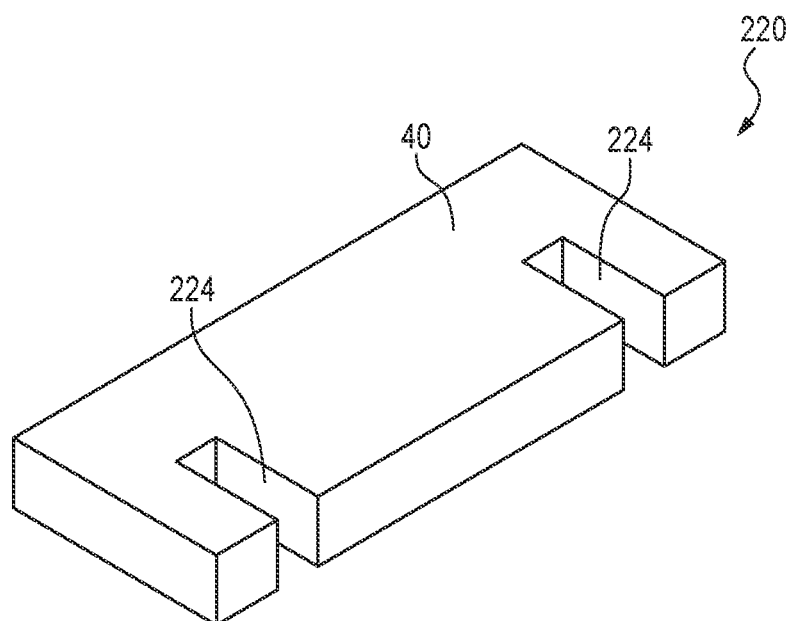
Figure 22D:
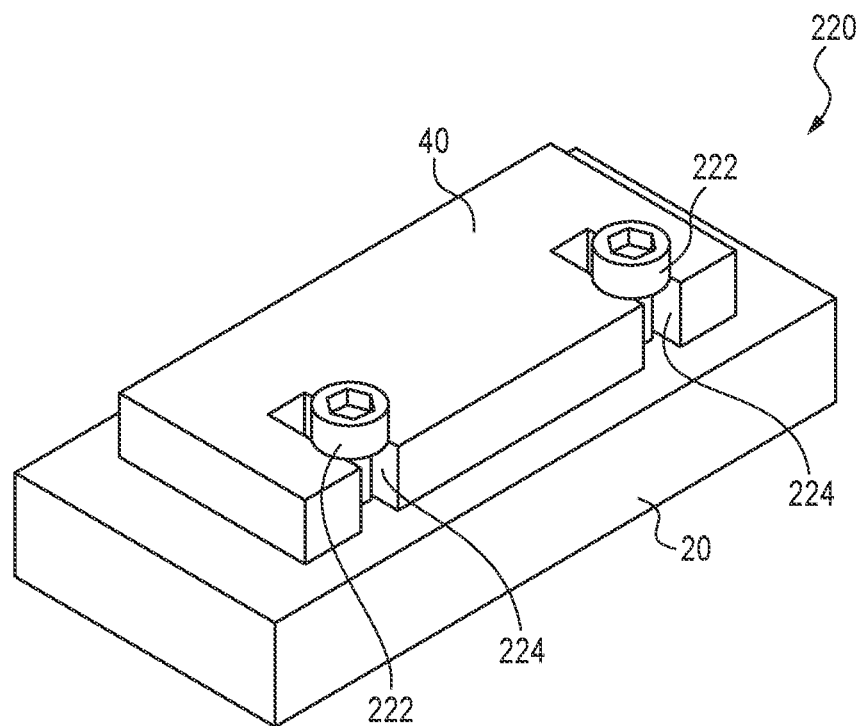
Figure 22E:
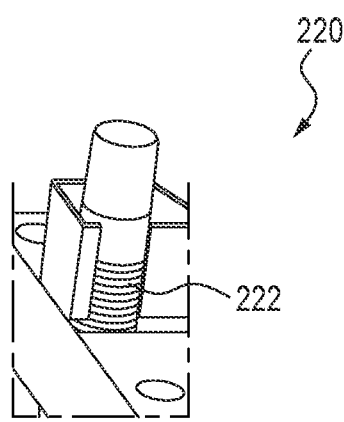
Figure 23A:
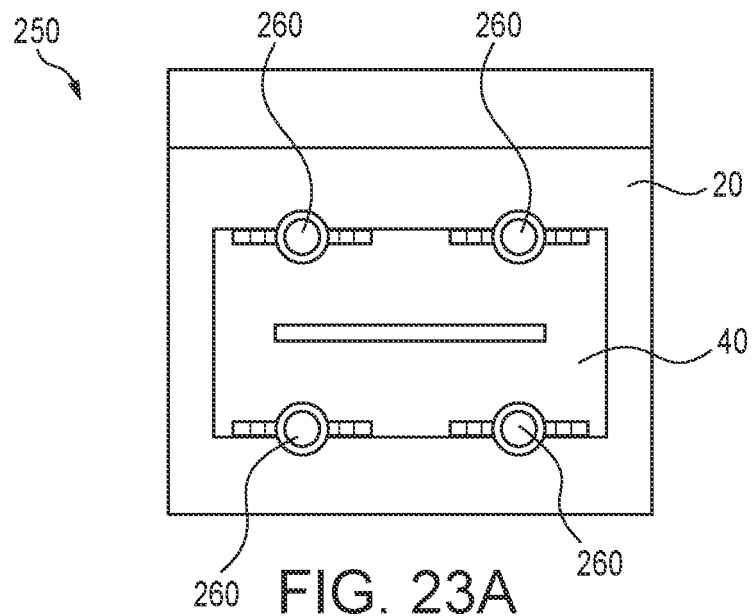
FIGS. 23A-23H illustrate an embodiment of a swivel clamp connection in association with a clamp and saw joint assembly in accordance with the present subject matter.
Figure 23B:
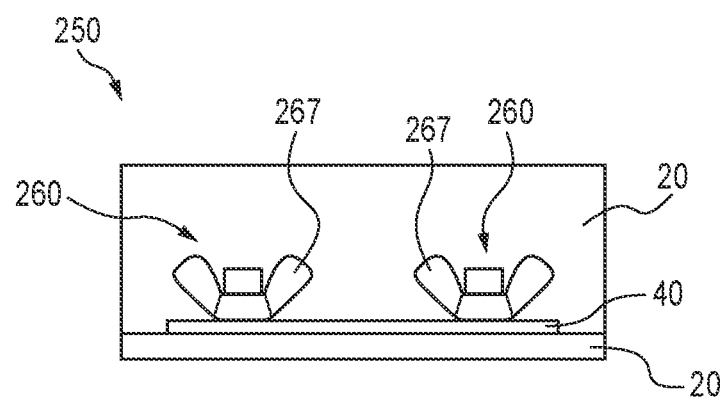
Figure 23C:
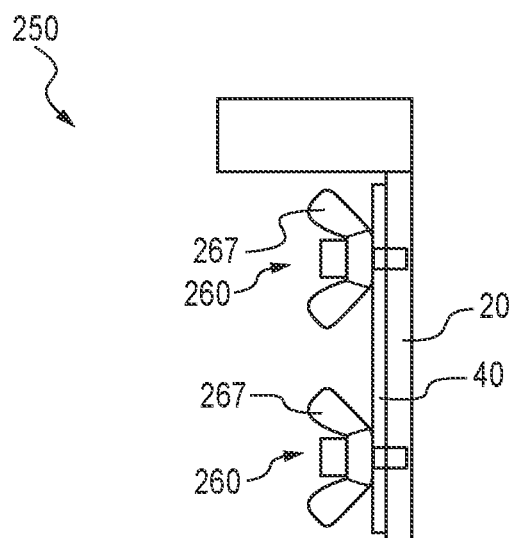
Figure 23D:
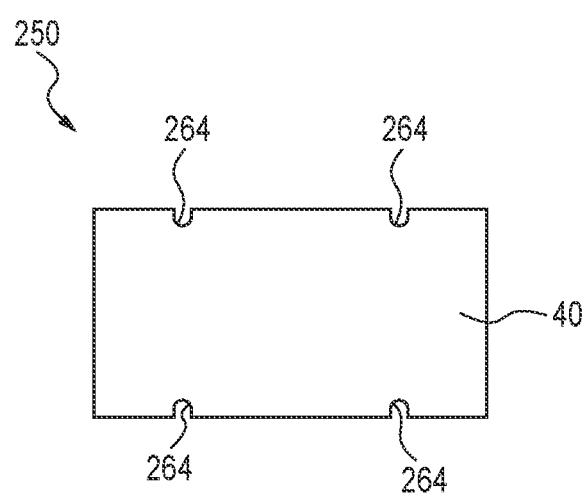
Figure 23E:
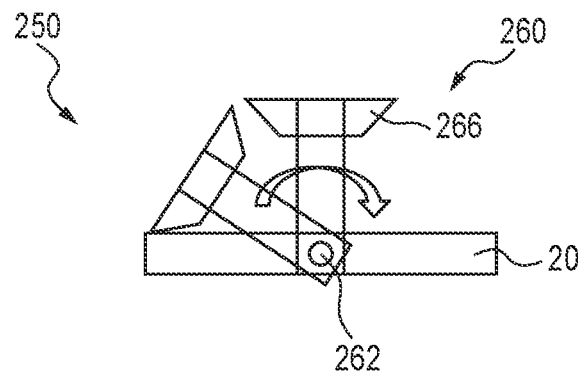
Figure 23F:
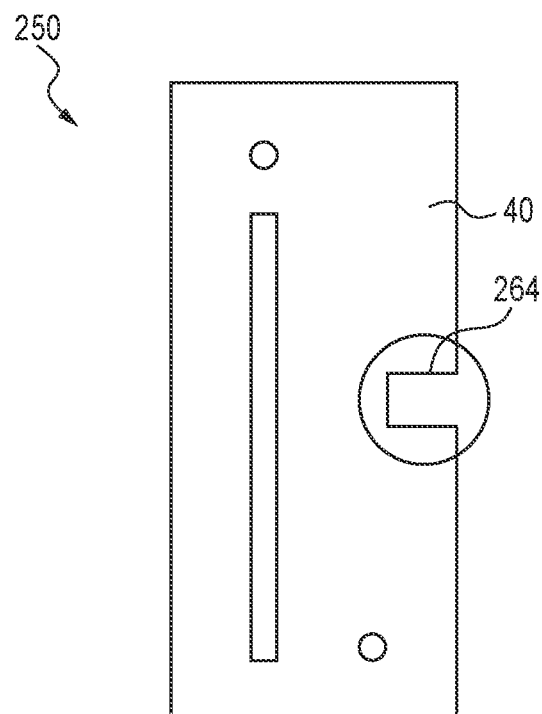
Figure 23G:
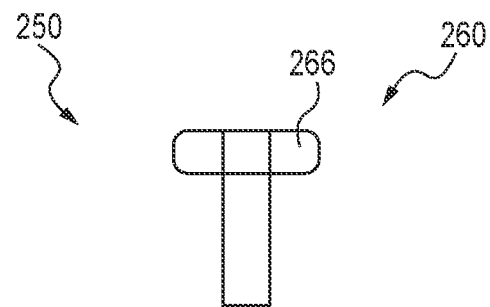
Figure 23H:
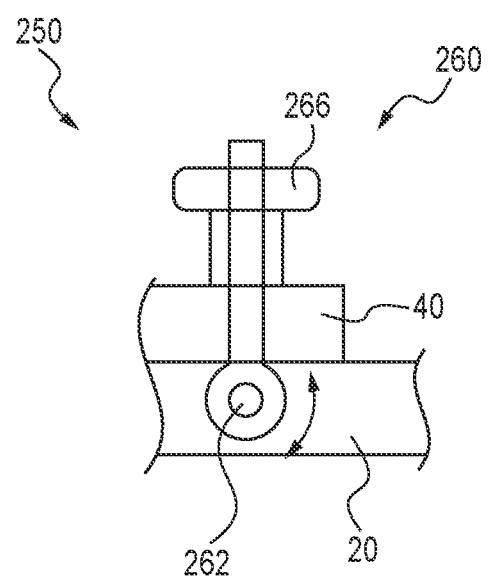
Figure 24A:
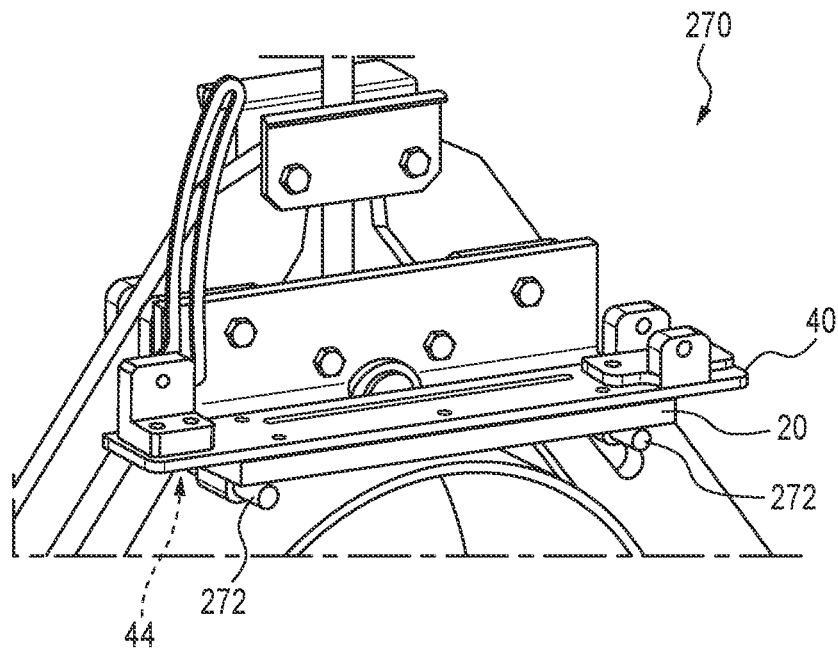
FIGS. 24A-24K illustrate an embodiment of a spring pin connection in association with a clamp and saw joint assembly in accordance with the present subject matter.
Figure 24B:
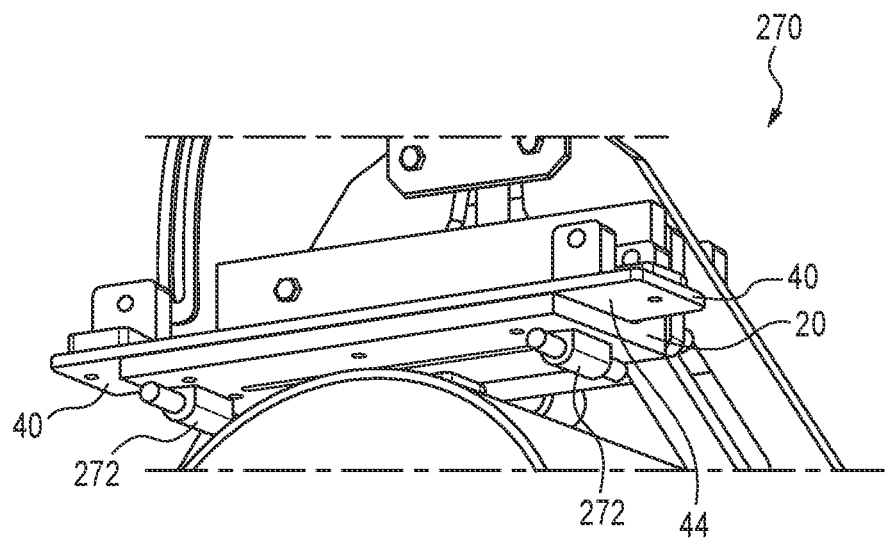
Figure 24C:
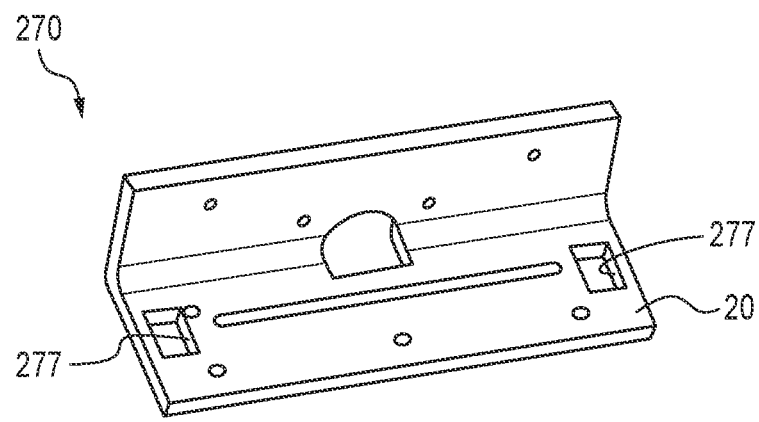
Figure 24D:
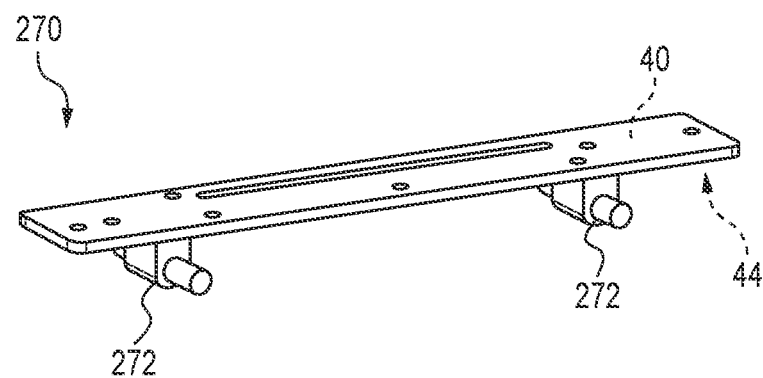
Figure 24E:
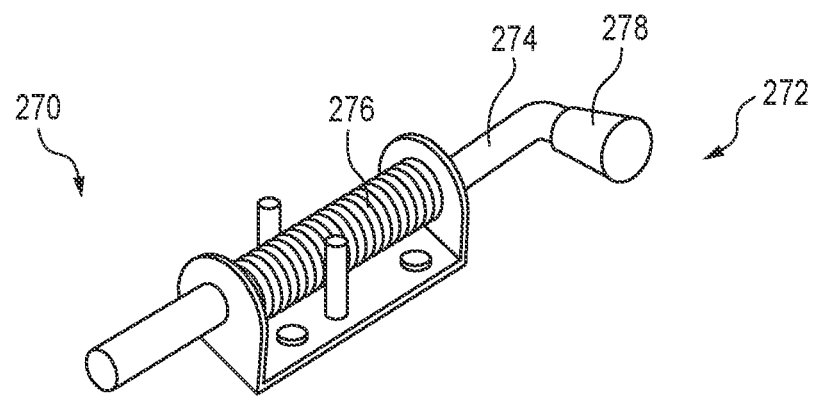
Figure 24F:
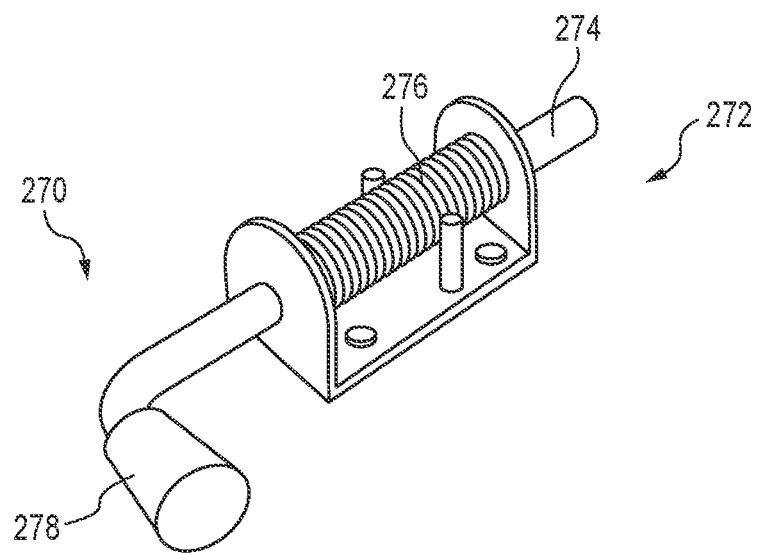
Figure 24G:
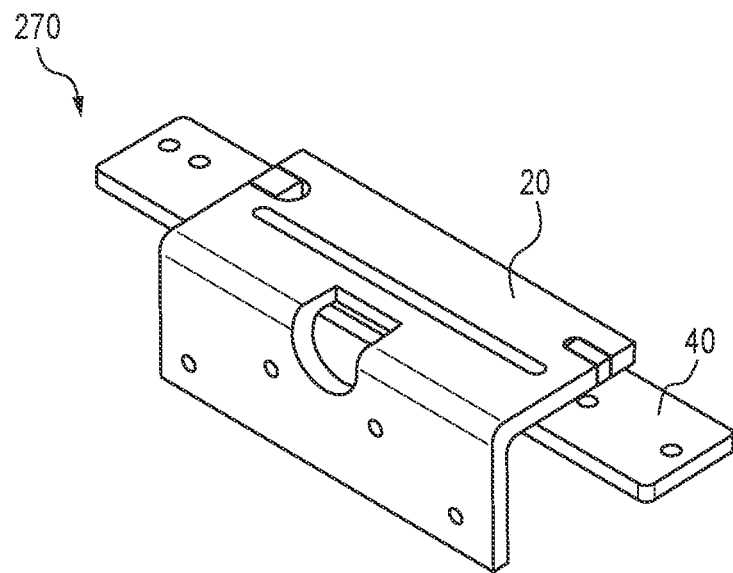
Figure 24H:
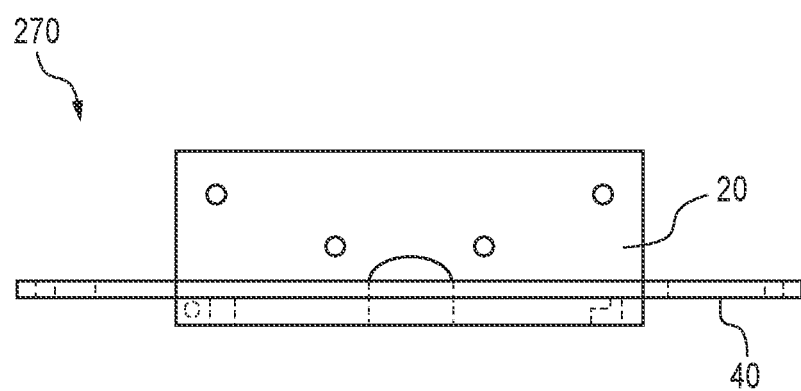
Figure 24I:
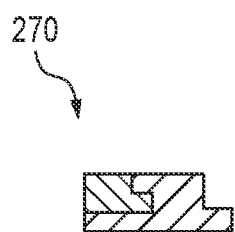
Figure 24J:
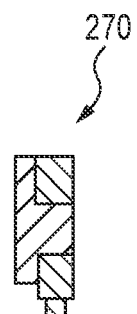
Figure 24K:
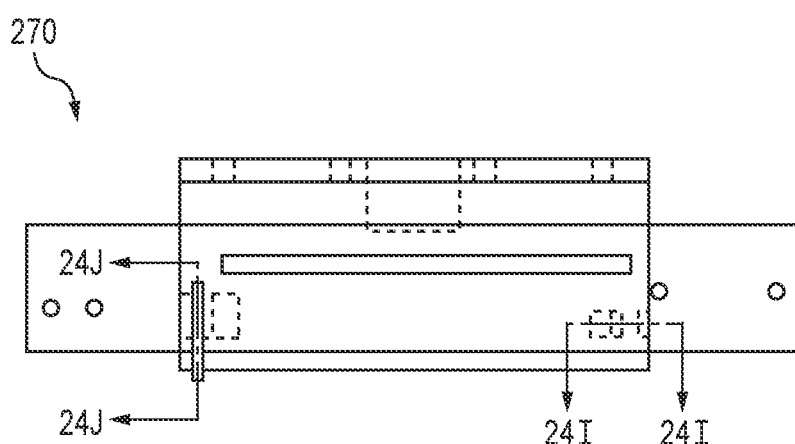

FIGS. 22A-22E illustrate an embodiment of a slotted assembly 220 for the saw joint assembly 10. The slotted assembly 220 utilizes one or more slots 224 provided in the saw base 40, one or more threaded apertures 226 in the clamp base 20, and one or more threaded members 222 extending in the slots 224 and threadedly engaging the threaded apertures 226 of the clamp base 20. As will be understood, in this embodiment, a user attaches a saw (not shown) to the saw base 40 and laterally slides the saw base 40 into position on the clamp base 20 by aligning the slots 224 of the saw base 40 with the threaded members 222 of the clamp base 20. Upon proper alignment and insertion of the members 222 in the slots 224 as shown in FIG. 22D, the members 222 can be tightened to thereby releasably secure the saw base 40 to the clamp base 20.

Swivel clamps can similarly be used to rotate and engage the two bases in contact, as shown in FIGS. 23A-23H. Specifically, FIGS. 23A-23H illustrate an embodiment of a swivel clamp assembly 250 in accordance with the present subject matter. The swivel clamp assembly 250 is utilized to affix or otherwise engage a clamp base 20 with a saw base 40. The swivel clamp assembly 250 comprises one or more and particularly a plurality of swivel clamps 260. Each swivel clamp 260 is typically pivotally or moveably secured to the clamp base 20 at a base 262 of the swivel clamp 260. The saw base 40 includes one or more receiving slots 264 adapted for receiving a corresponding swivel clamp 260. As will be understood, the saw base 40 can be releasably affixed or secured to the clamp base 20 by positioning the saw base 40 relative to the clamp base 20 such that the receiving slots 264 are aligned with the swivel clamps 260, and then contacting the bases 20, 40. Each swivel clamp 260 is then pivoted or otherwise positioned such that it extends through its corresponding slot 264, and a head or gripping member 266 of the swivel clamp is disposed on and in contact with the saw base 40. Instead of an integral head or gripping member 266, the present subject matter also includes adjustable threaded fasteners such as shown as 267. It will be understood that the arrangement of components can be reversed so that the swivel clamps 260 are pivotally secured to the saw base 40 and are received in slots in the clamp base 20.

Spring pins mounted to one of the base panels can be used to engage a clearance hole in the opposite base panel to hold the saw base to the clamp base, as shown in FIGS. 24A-24K. Specifically, FIGS. 24A-24K illustrate an embodiment of a spring pin assembly 270 used in association with the saw joint assembly of the present subject matter. The spring pin assembly 270 is used to affix or otherwise engage a clamp base 20 with a saw base 40. The spring pin assembly 270 comprises one or more spring pins 272. Each spring pin 272 includes an axially positionable member 274 and a spring 276 or other biasing member typically configured to urge the member 272 axially outward. Each spring pin 272 can also include a handle 278. The spring pins 272 are typically located along an engagement face 44 of the saw base 40. The clamp base 20 includes a plurality of access ports 277 (see FIG. 24C) sized and located to receive the spring pins 272 such that upon contacting and engaging the bases 20, 40 together, the spring pins 272 extend through and are accessible along the clamp base 20. FIGS. 24G-24K depict a variation of a spring pin assembly 270 in which a user aligns protrusions on the saw base 40 to openings on the clamp base 20, then slides the saw and corresponding saw base to engage features that hold the two in contact while a pin is inserted. The pin, then, locks the two components together.

Figure 25A:
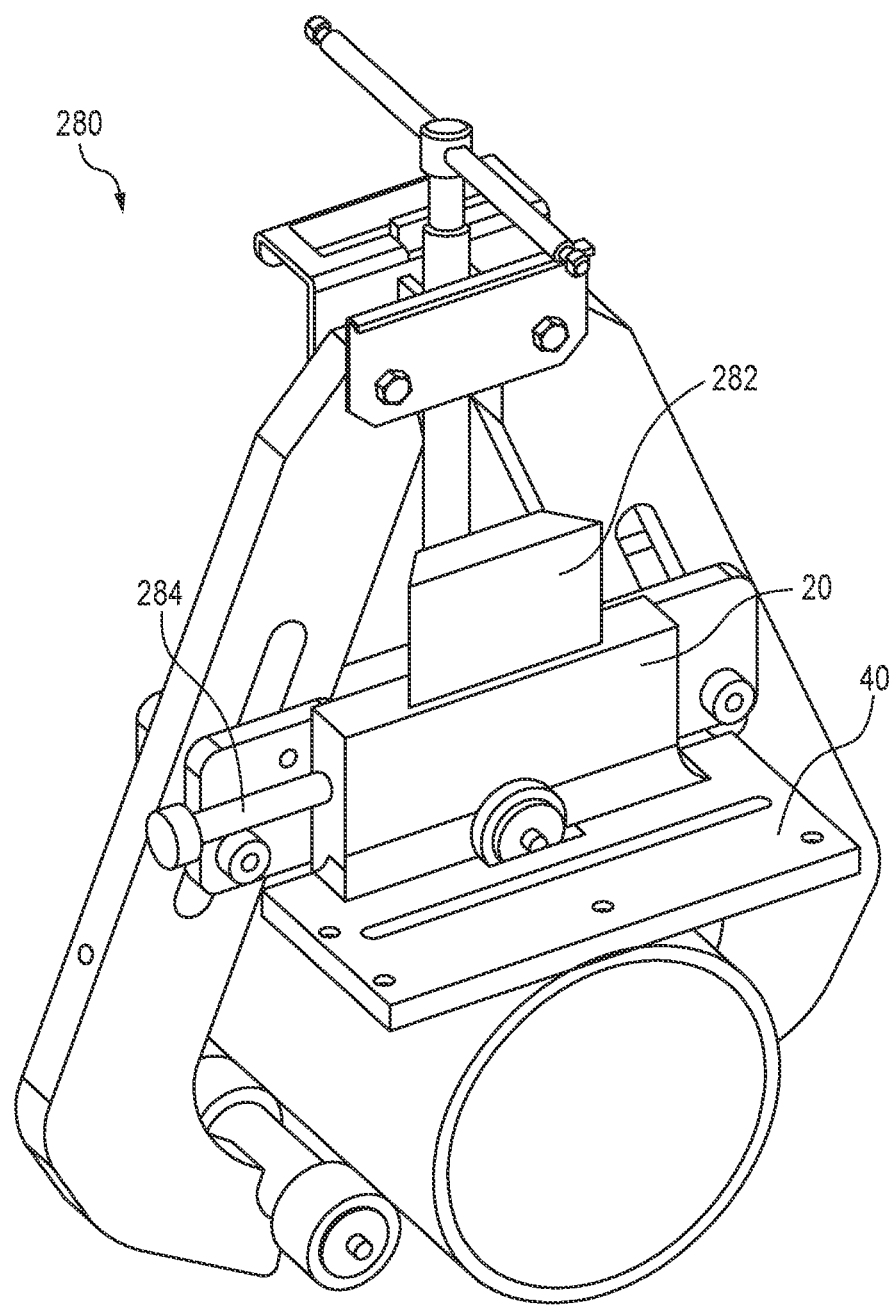
FIGS. 25A-25D illustrate an embodiment of a dovetail joint connection in association with a clamp and saw joint assembly in accordance with the present subject matter.
Figure 25B:
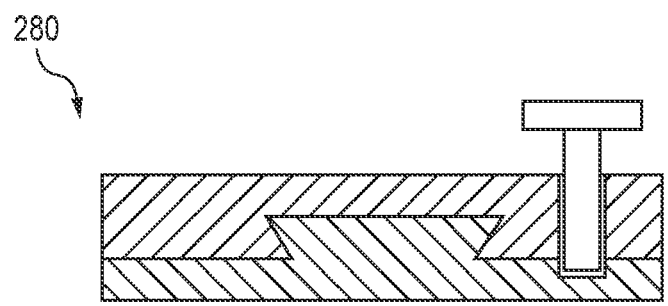
Figure 25C:
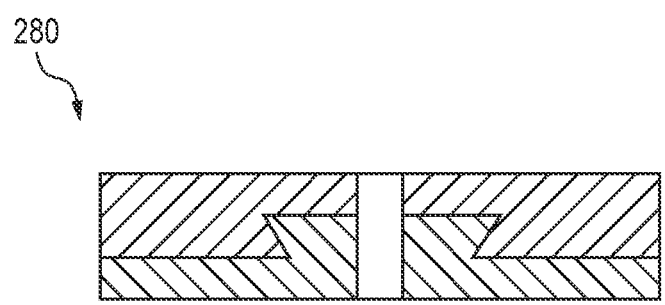
Figure 25D:
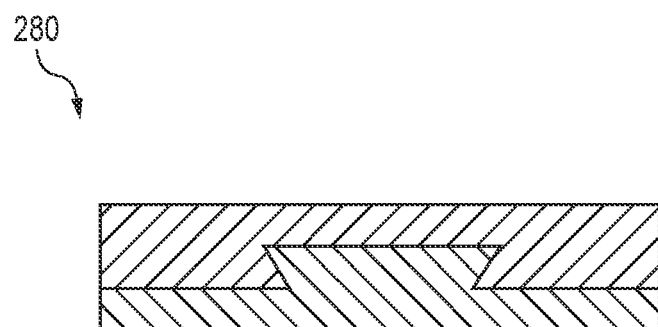

A dovetail joint incorporated into the saw base and clamp base can be used to hold the two components together, then a screw used to maintain joint tension and prevent inadvertent separation, as shown in FIGS. 25A-25D. Specifically, FIGS. 25A-25D illustrate aspects of an embodiment of a dovetail joint assembly 280 in association with a saw joint assembly of the present subject matter. The dovetail joint assembly 280 includes a dovetail component 282 and an axially positionable adjusting member 284, which can for example be in the form of a threaded member that is threadedly engaged in a threaded aperture in the clamp base 20. FIG. 25B presents a different orientation for the axially positionable adjusting member (like described for FIG. 25A) that could alternatively work with this dovetail joint-style attachment.

Figure 26A:
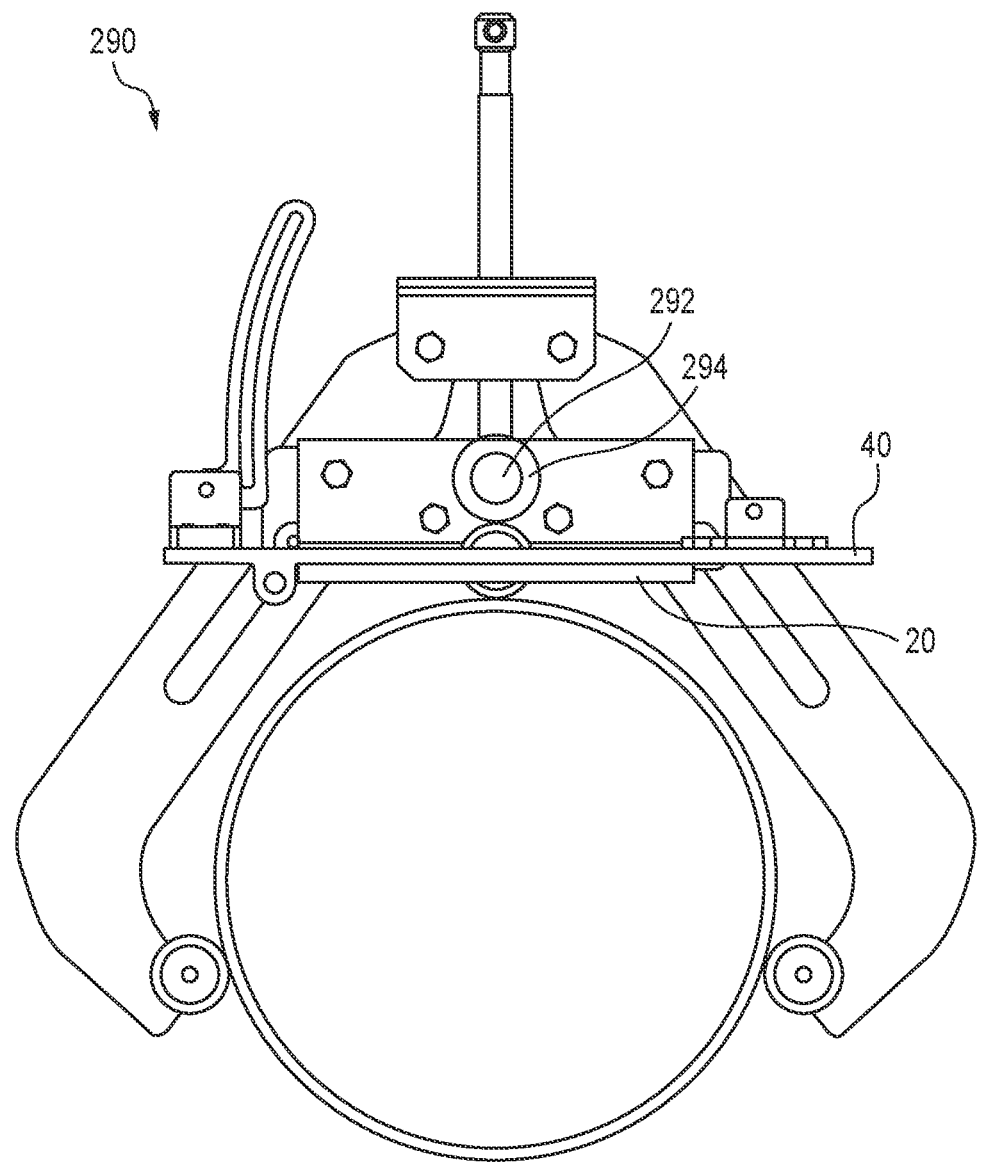
FIGS. 26A-26C illustrate an embodiment of a shaft clamp connection in association with a clamp and saw joint assembly in accordance with the present subject matter.
Figure 26B:
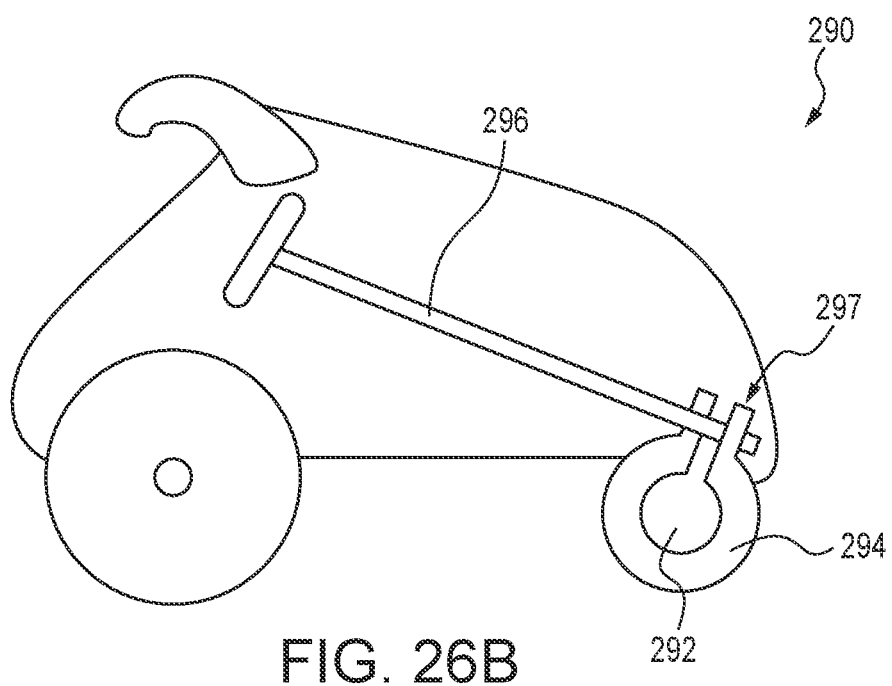
Figure 26C:
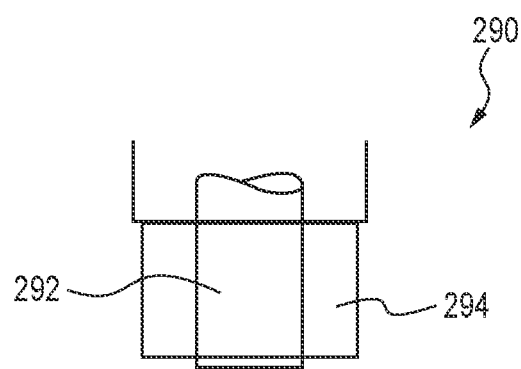

The entire saw base could be mounted onto a horizontally-oriented shaft via a shaft collar clamping system. In this manner, the user would slide a female collar of the saw base onto a male shaft of the clamp base, then tighten a clamp to affix the position of the two components together. This is depicted in FIGS. 26A-26C. Specifically, FIGS. 26A-26C illustrate an embodiment of a shaft clamp connection assembly 290 in association with a saw joint assembly in accordance with the present subject matter. In this version, the clamp base 20 includes a male shaft member 292, about which is positioned a female collar 294 associated with the saw base 40. The female collar 294 is circumferentially adjustable via an adjusting member 296. A threaded engagement 297 can be utilized such that rotation of the member 296 about its longitudinal axis results in size adjustment of the collar 294 about the shaft 292.

Figure 27A:
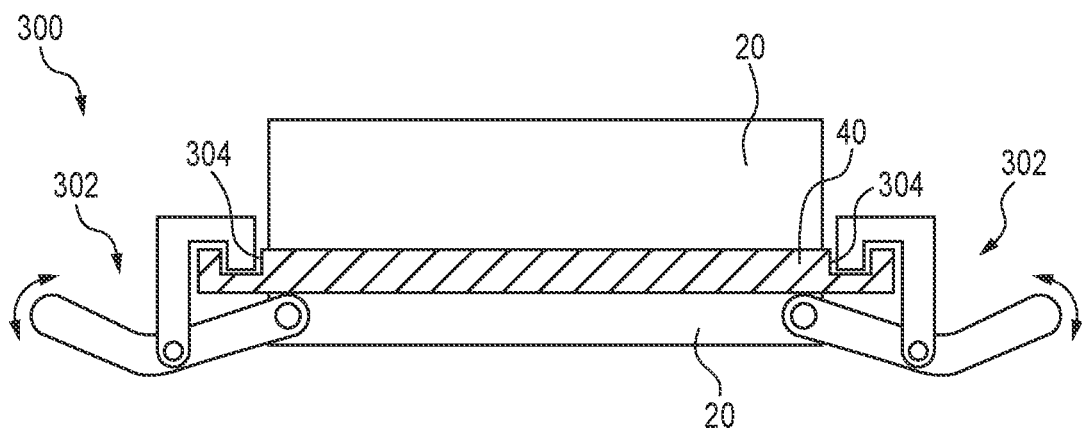
FIGS. 27A-27D illustrate an embodiment of a toggle clamp connection in association with a clamp and saw joint assembly in accordance with the present subject matter.
Figure 27B:
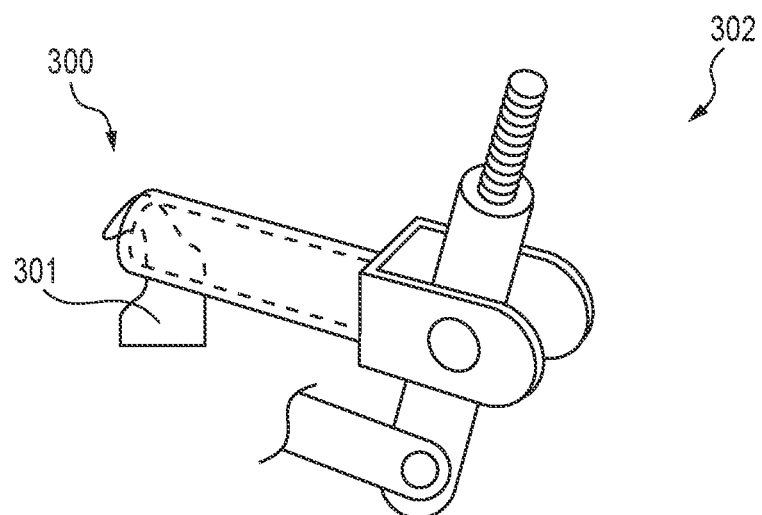
Figure 27C:
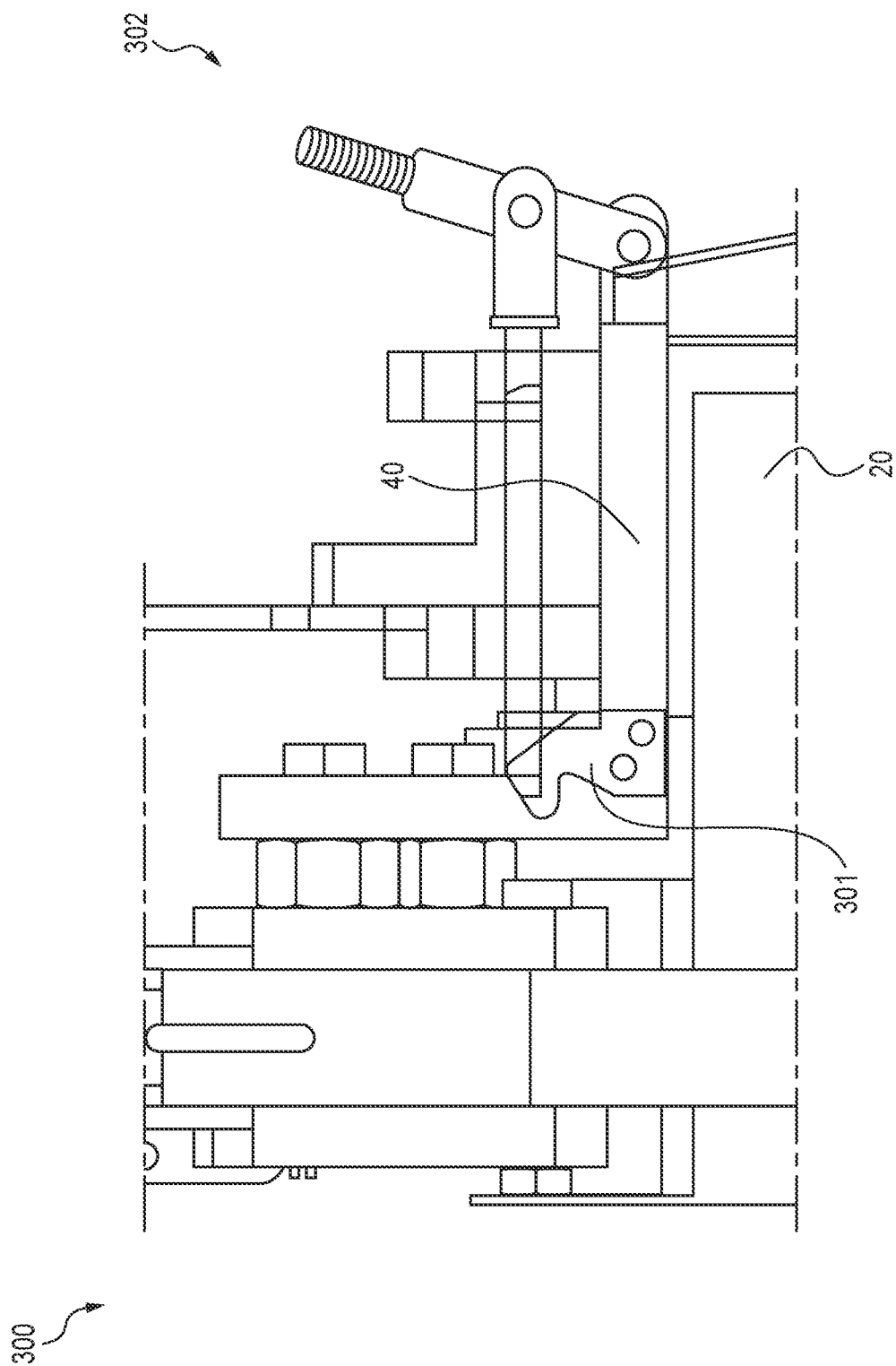
Figure 27D:
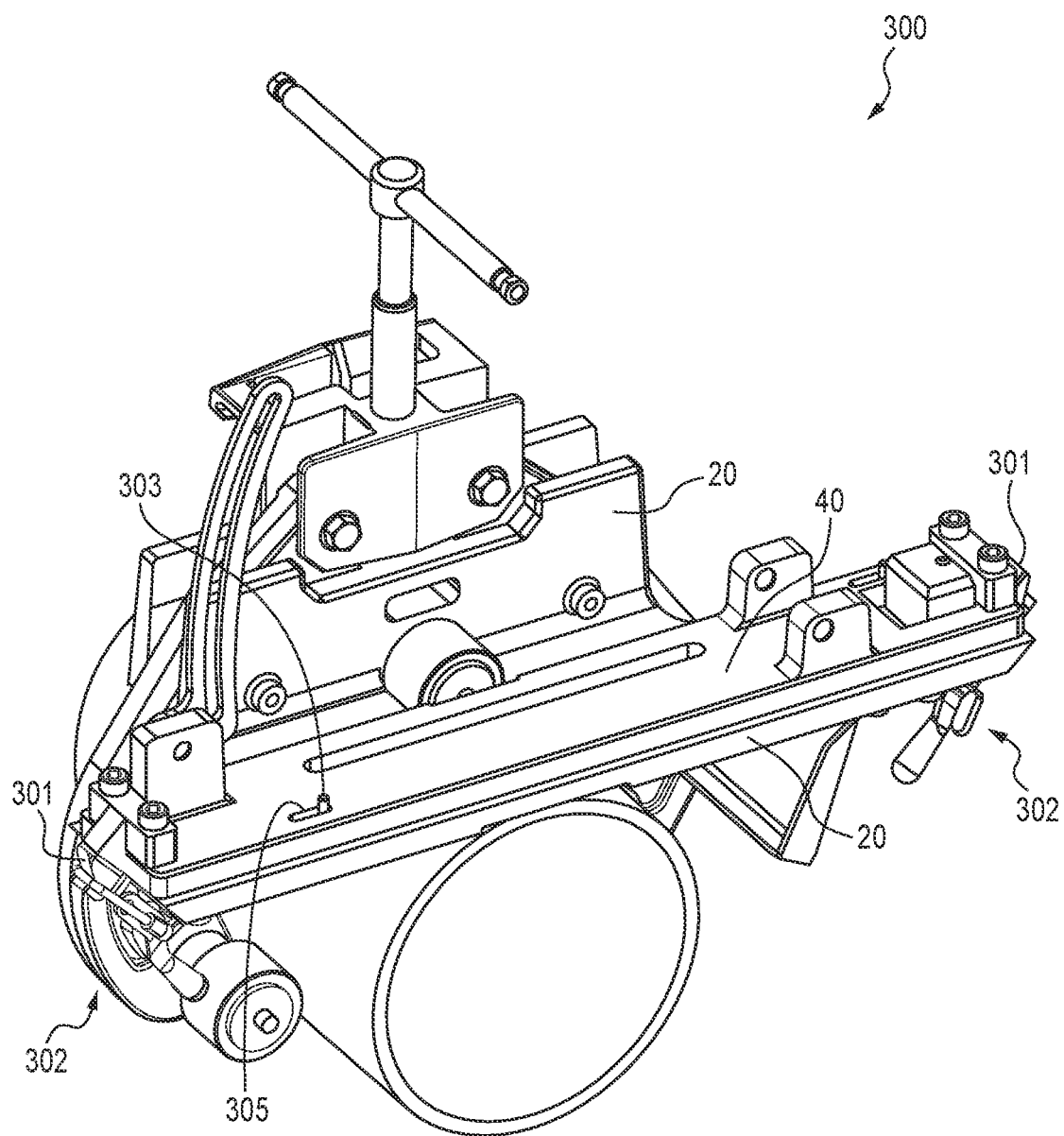
Figure 28A:
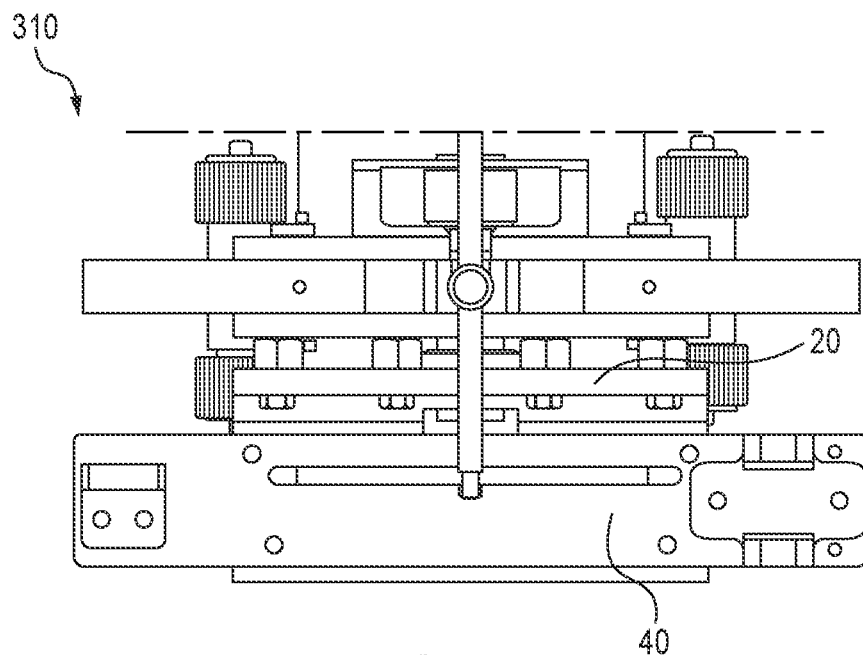
FIGS. 28A-28I illustrate an embodiment of a cam locking connection in association with a clamp and saw joint assembly in accordance with the present subject matter.
Figure 28B:
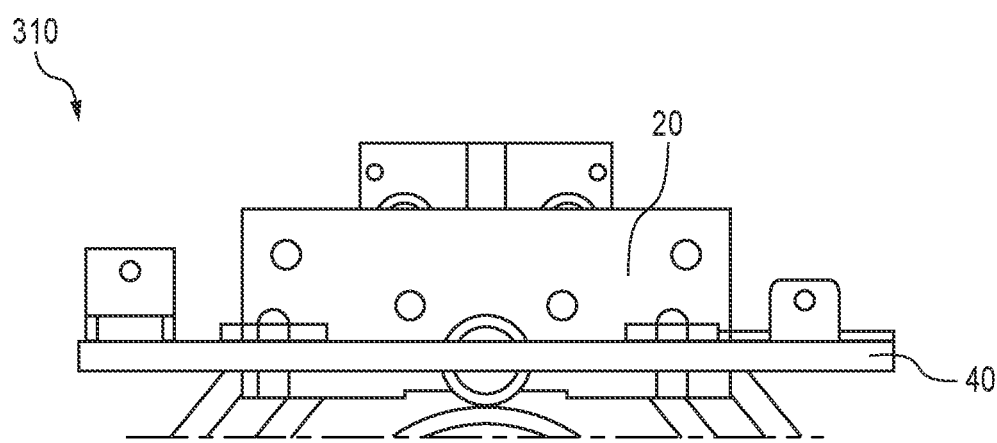
Figure 28C:
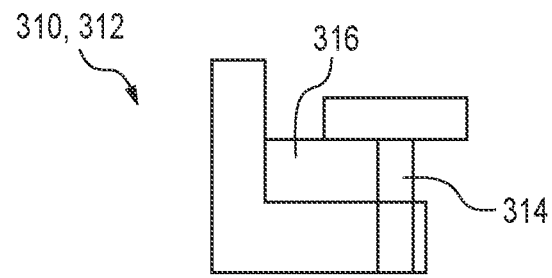
Figure 28D:
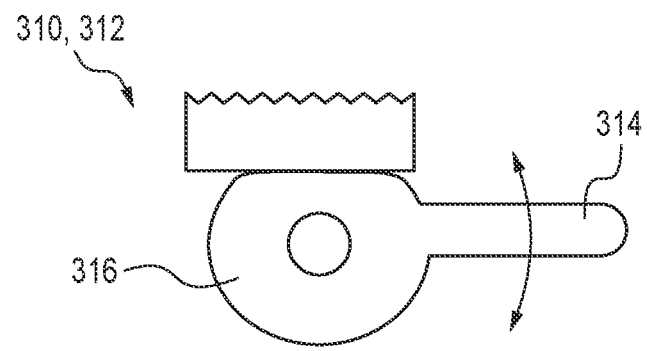
Figure 28E:
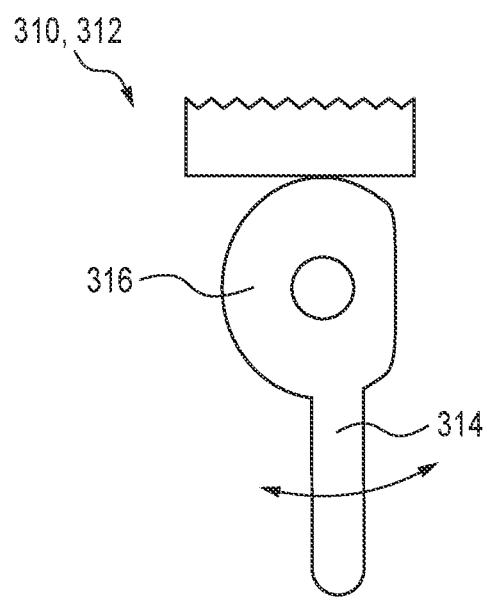
Figure 28F:
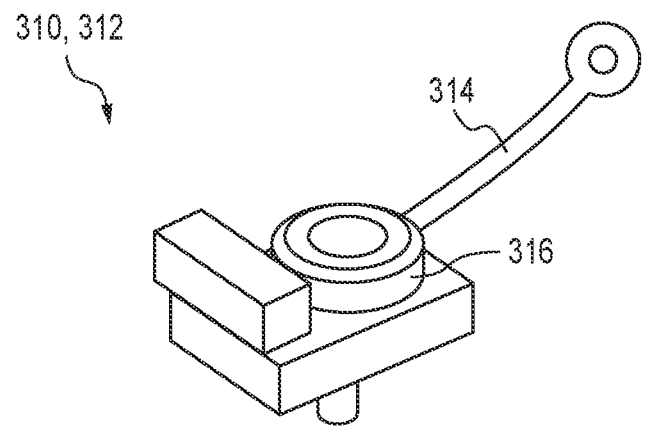
Figure 28G:
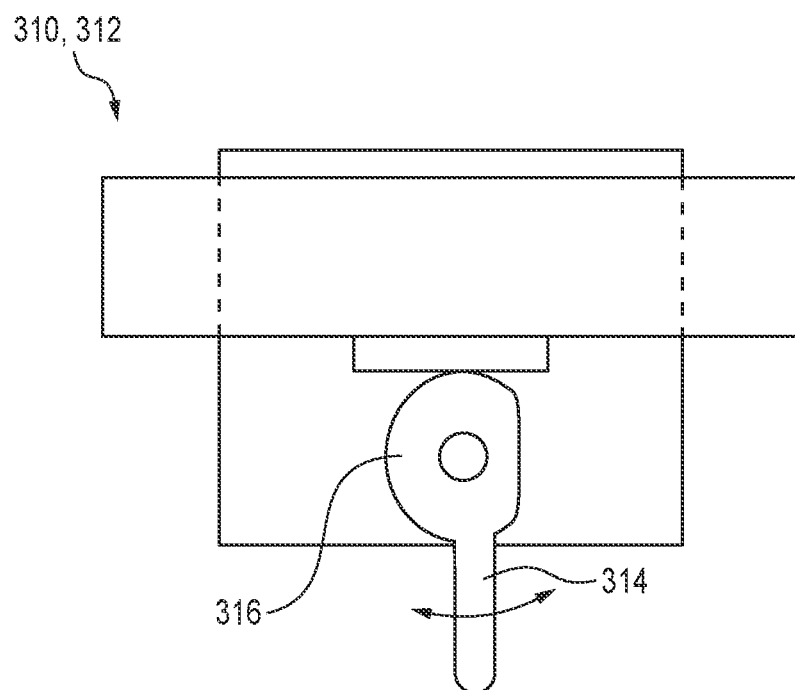
Figure 28H:
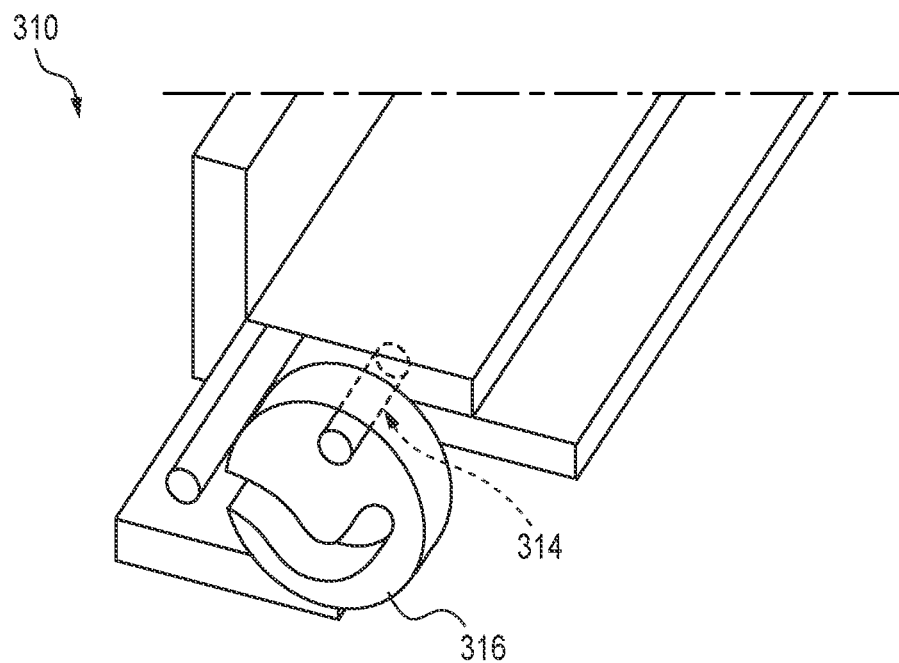
Figure 28I:
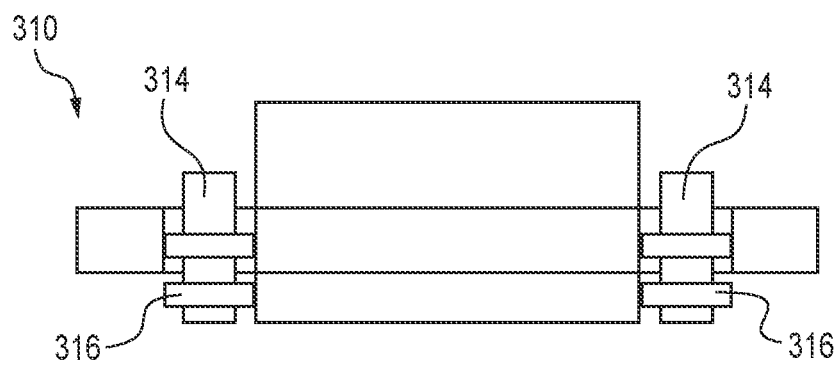

Toggle clamps can similarly be used to draw and hold the saw base to the clamp base. These toggle clamps could be configured over center to achieve a latching mechanism, or drawn to a certain position to reach clamp action. This is shown in FIGS. 27A-27D. Specifically, FIGS. 27A-27D illustrate an embodiment of a toggle clamp assembly 300 in accordance with the present subject matter. The toggle clamp assembly 300 is used to releasably engage the saw base 40 to the clamp base 20. The toggle clamp assembly 300 includes one or more toggle clamps 302. The toggle clamps 302 are typically affixed to the clamp base 20 and are releasably engageable with the saw base 40. In many versions, the toggle clamps 302 engage the saw base 40 at landings 304. The toggle clamps move over center to lock in position and hold the saw base to the clamp base. FIG. 27B shows a hook 301 that the toggle clamp 302 engages in tension to draw the joint tight. FIG. 27C shows how the hook 301 could be positioned on the saw base 40 to allow the clamp base, mounted over center to engage the toggle clamp 302. FIG. 27D shows two toggle clamps 302, attached to the clamp base 20, that engage hooks 301 on each end of the saw base. The saw base 40 is set onto the clamp base 20 and aligned via a pin 303 of the clamp base 20 that passes through a slot 305 in the saw base 40, then the system is tightened together via the toggle clamps 302 on the hooks 301 present on the saw base 40.

Cam locking knobs can be positioned such that a male feature in the clamp base is engaged when the knob, integral to the saw base, is rotated. The cam profile would then draw the saw base and clamp base together and hold the components in position with adequate force. This is shown in FIGS. 28A-28I. Specifically, FIGS. 28A-28I illustrate an embodiment of a cam locking knob assembly 310 in accordance with a saw joint assembly of the present subject matter. The cam locking knob assembly 310 comprises one or more adjustable cam assemblies 312 having a member 314 with a positionable cam 316. As will be understood, the member 314 and cam 316 are affixed or secured to one of the clamp base 20 or the saw base 40. Upon rotating or otherwise selectively positioning the cam 316 via the member 314, the cam 316 contacts one of the clamp base 20 or the saw base 40 and secures the bases together 20, 40. An eccentric cam provides a force between the saw base and clamp base, holding them together.

Figure 29A:
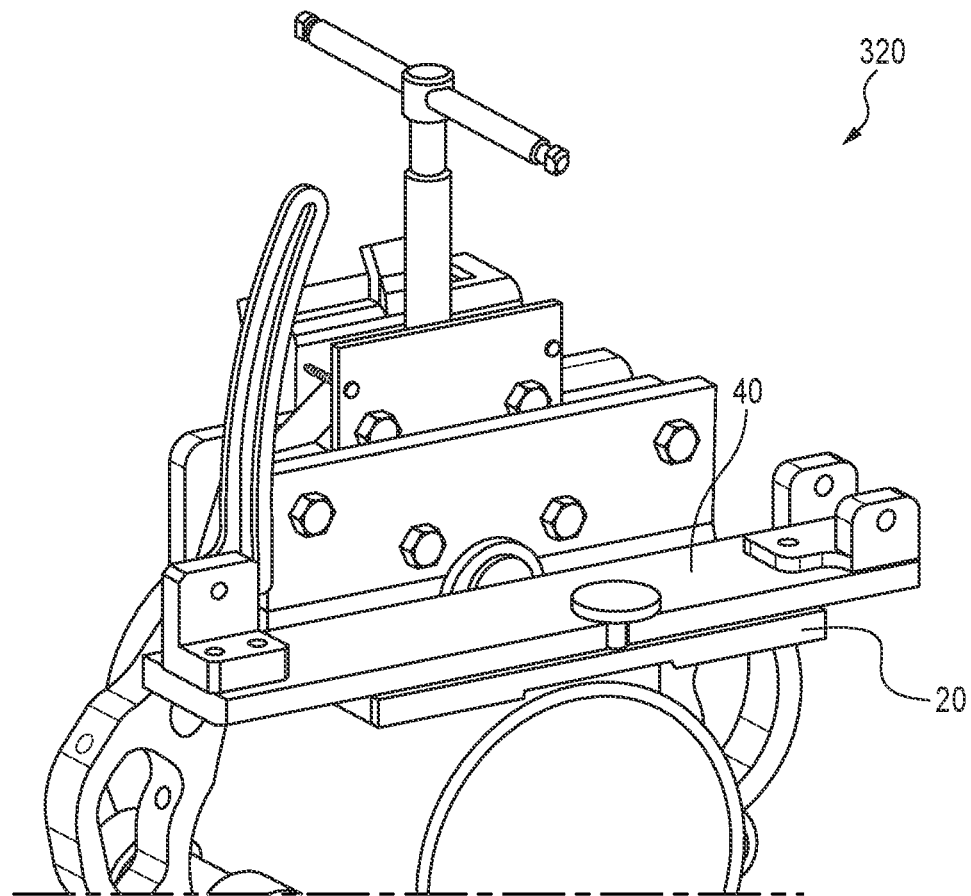
FIGS. 29A-29B illustrate another embodiment of a cam locking connection in association with a clamp and saw joint assembly in accordance with the present subject matter.
Figure 29B:
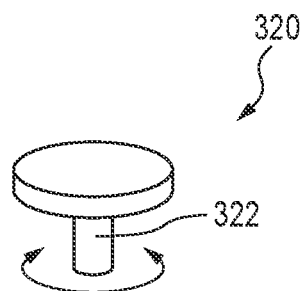

Similar to the noted cam locking-knobs, a cam-profile knob can be used to grip the saw base to the clamp base when rotated, as shown in FIGS. 29A-29B. Specifically, FIGS. 29A-29B illustrate an embodiment of a cam profile knob 320. The cam profile knob 320 includes a cam member 322. One or more cam profile knobs 320 can be used to releasably engage the saw base 40 to the clamp base 20. As will be understood, rotation of the cam profile knob 320 as shown in FIG. 29B causes engagement between the bases 20, 40.

Figure 30A:
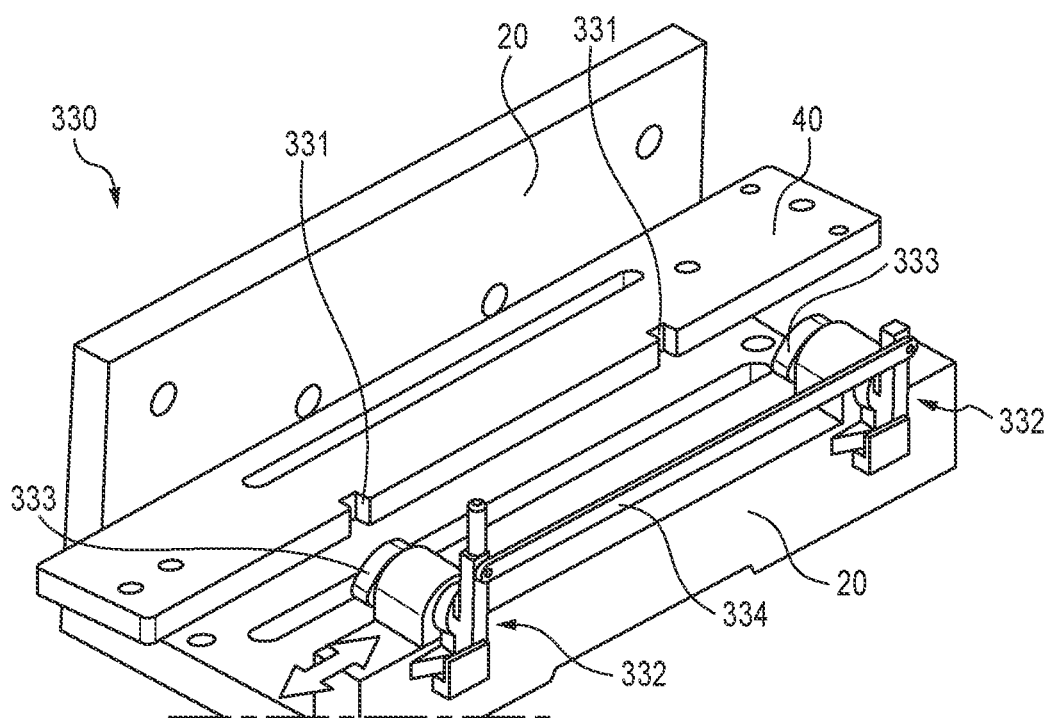
FIGS. 30A-30B illustrate an embodiment of a twin cam locking knob connection in association with a clamp and saw joint assembly in accordance with the present subject matter.
Figure 30B:
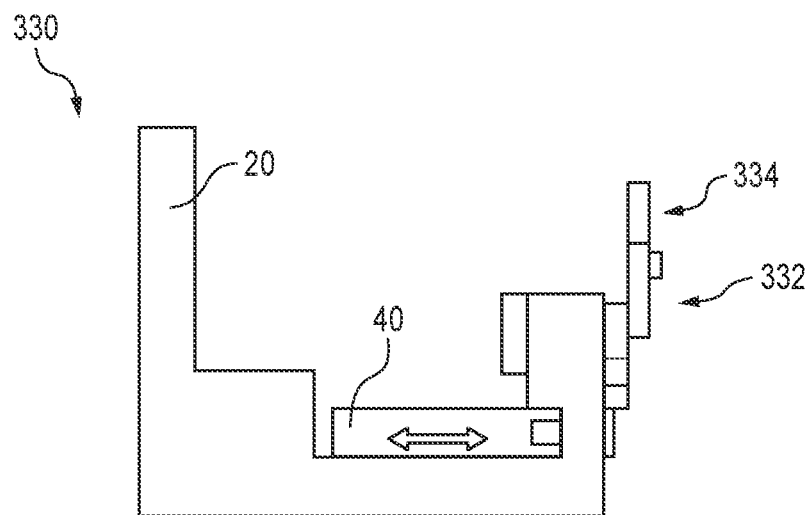
Figure 31A:
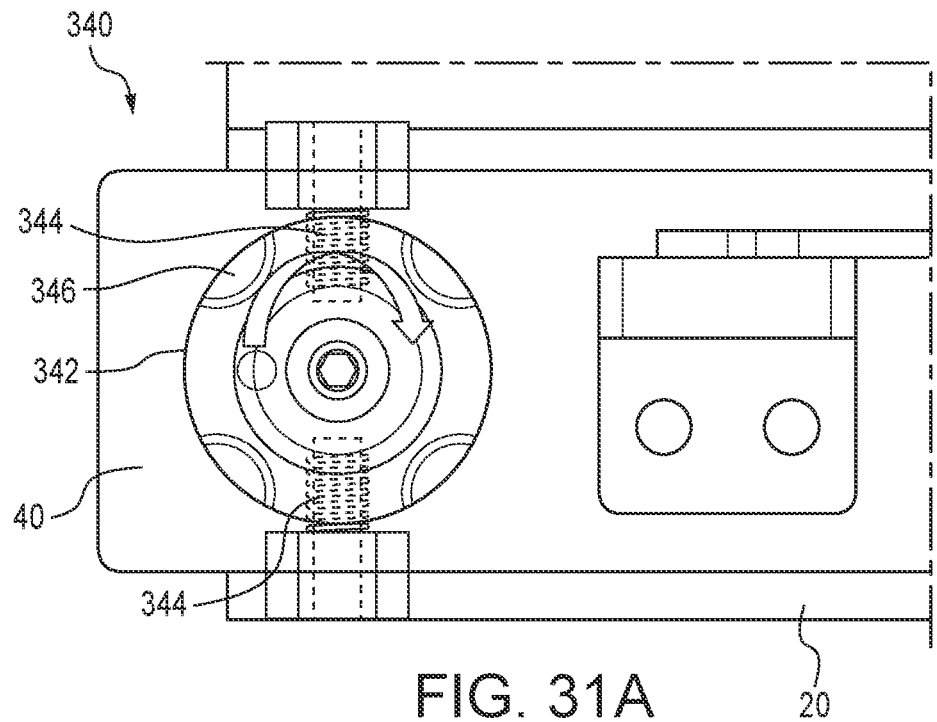
FIGS. 31A-31D illustrate an embodiment of a cam knob and pin connection in association with a clamp and saw joint assembly in accordance with the present subject matter.
Figure 31B:
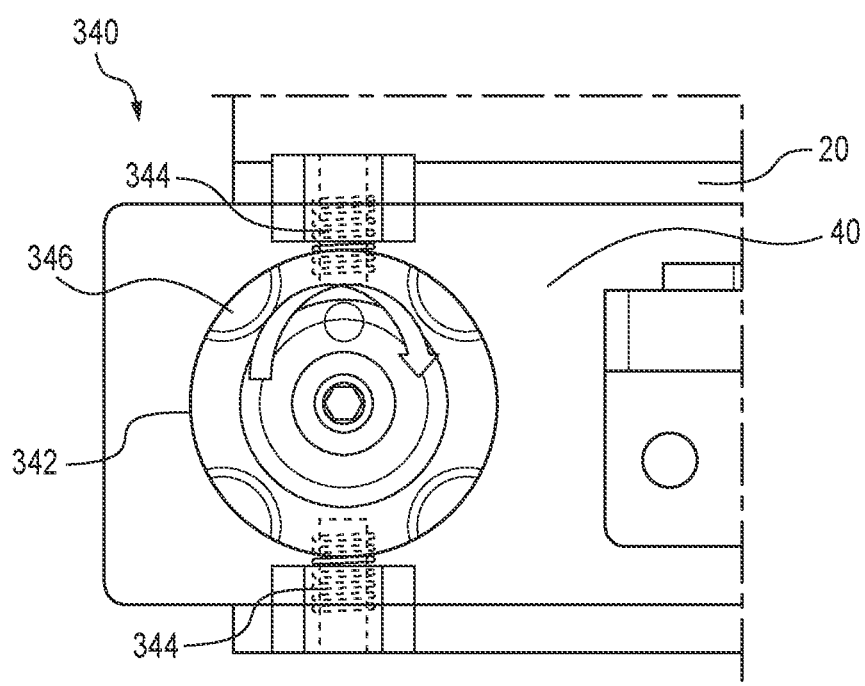
Figure 31C:
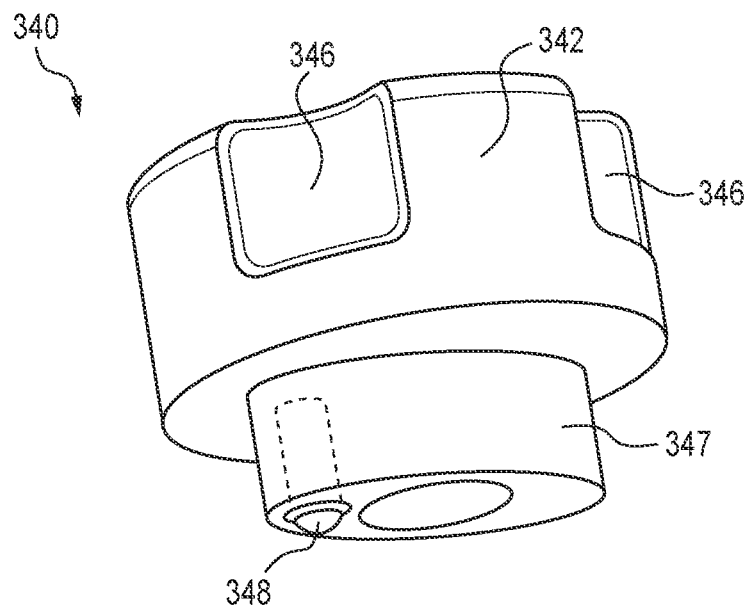
Figure 31D:
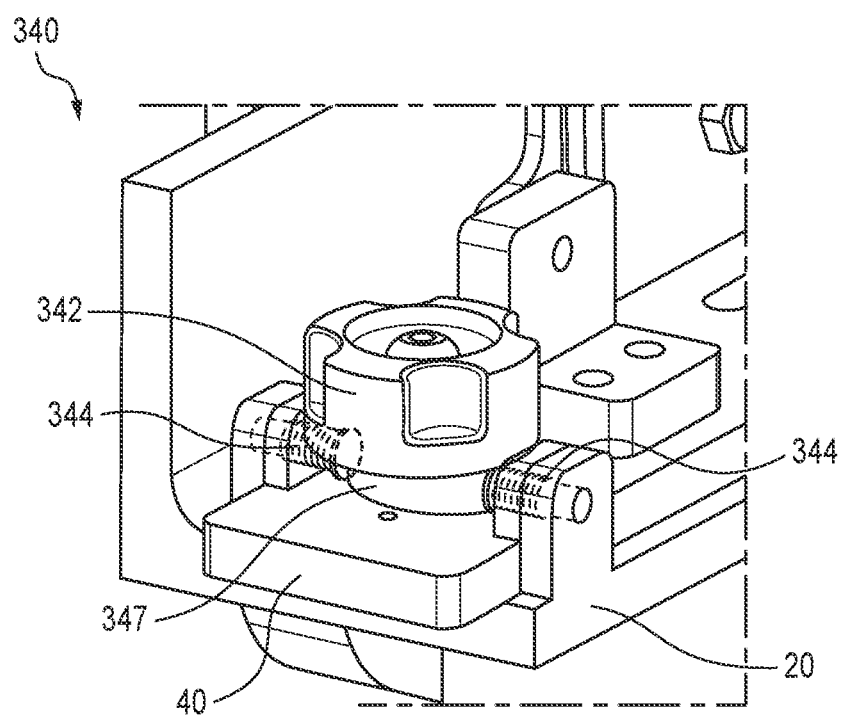

Two cam-locking knobs can be used to hold the position of the saw base to the clamp base by engaging the cam into a female slot on the saw base via a link between the actuation handle and the cam pins, as shown in FIGS. 30A-30B. Figures illustrate a twin cam locking knob assembly 330 in association with a clamp base 20 and a saw base 40. The twin cam locking knob assembly 330 includes two cam locking assemblies 332 secured to the clamp base 20 and a linkage assembly 334 connecting the cam locking assemblies 332. Upon engagement and desired positioning of the bases 20, 40, a handle or other member is displaced to translate the linkage 334 and position the cam locking assemblies 332. More specifically, the saw base includes slots 331 which are sized and located to receive corresponding cams 333 of the cam locking assemblies 332. A user places the saw base 40 onto the clamp base 20. The user then moves or otherwise displaces the saw base 40 towards the cam locking assemblies 332 as shown in FIG. 30B. The user then actuates the linkage assembly 334 and/or the cam locking assemblies 332 to thereby engage the cams 333 with their slots 331. This securely affixes the saw base 40 to the clamp base 20.

An oval cam knob can also act as a stop for spring pins that engage alignment/lock holes in the mating base. By rotating the knob 90 degrees, the spring pins will engage or disengage to clamp or free the saw base to/from the clamp base. A detent can optionally be used to hold the position. This is shown in FIGS. 31A-31D. Specifically, FIGS. 31A-31D illustrate an embodiment of an oval cam knob assembly 340 in accordance with the present subject matter. The oval cam knob assembly 340 comprises a selectively positionable cam knob 342 secured to the saw base 40 and one or more, and typically a plurality of spring biased members 344 associated with the clamp base 20. The cam knob 342 defines one or more recessed receiving regions 346 adapted for promoting gripping by a user. The cam knob 342 includes a cam member 347. The cam knob 342 may optionally include a detent 348 as noted.

Figure 32A:
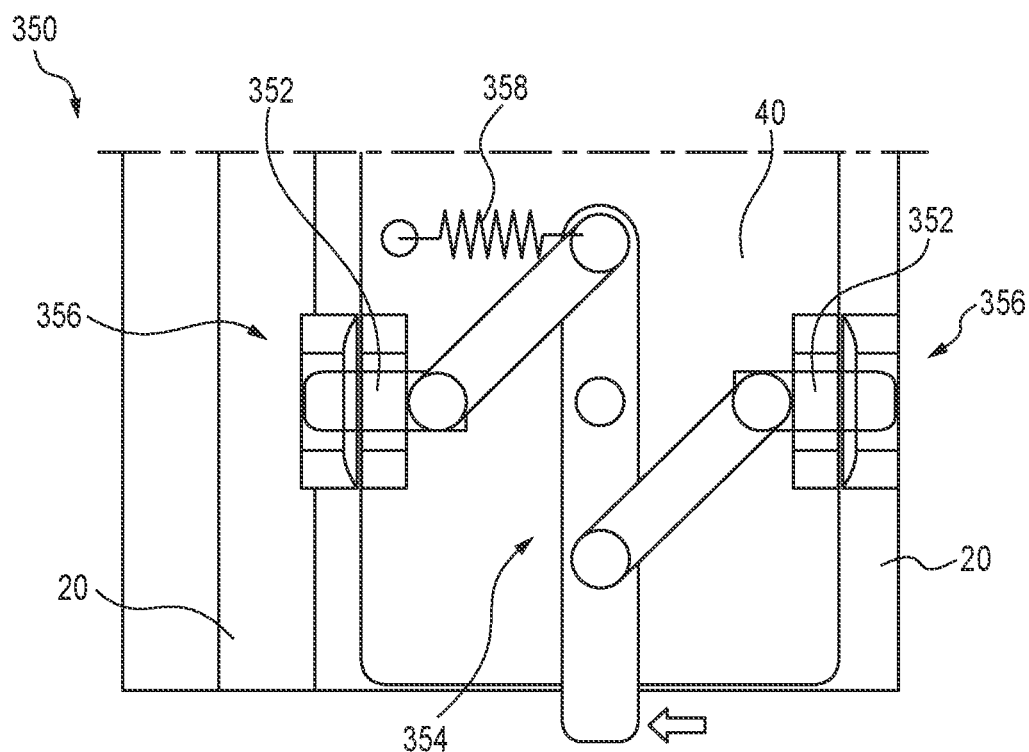
FIGS. 32A-32B illustrate an embodiment of a spring loaded lever connection in association with a clamp and saw joint assembly in accordance with the present subject matter.
Figure 32B:
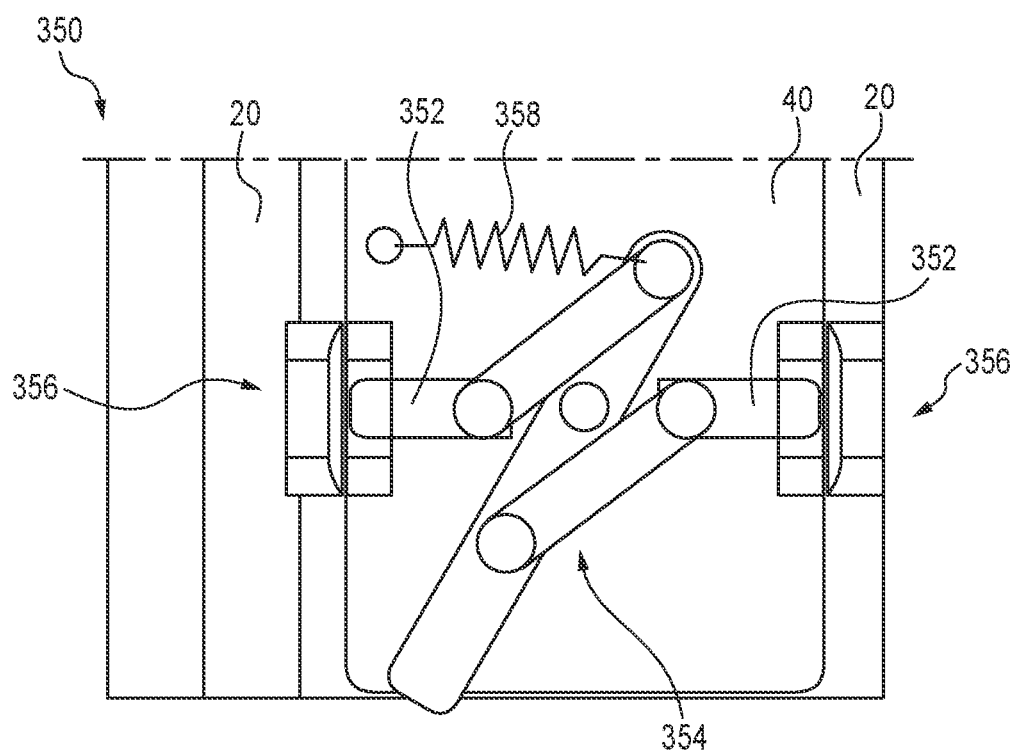

Similar to the various cam assemblies described herein, a spring loaded lever can be used engage a locking pin between the saw base and clamp base. See FIGS. 32A-32B. Specifically, FIGS. 32A-32B illustrate an embodiment of a spring loaded lever assembly 350 for engaging a saw base 40 and a clamp base 20, in accordance with the present subject matter. The assembly 350 comprises one or more and typically a plurality of locking pins 352 which are axially positionable via a linkage assembly 354. The locking pins 352 upon axial displacement, engage receiving regions 356 in the clamp base 20. A spring or biasing member 358 can be used to bias the pins 352 to an outwardly projecting engagement position as shown in FIG. 32A.

Figure 33:
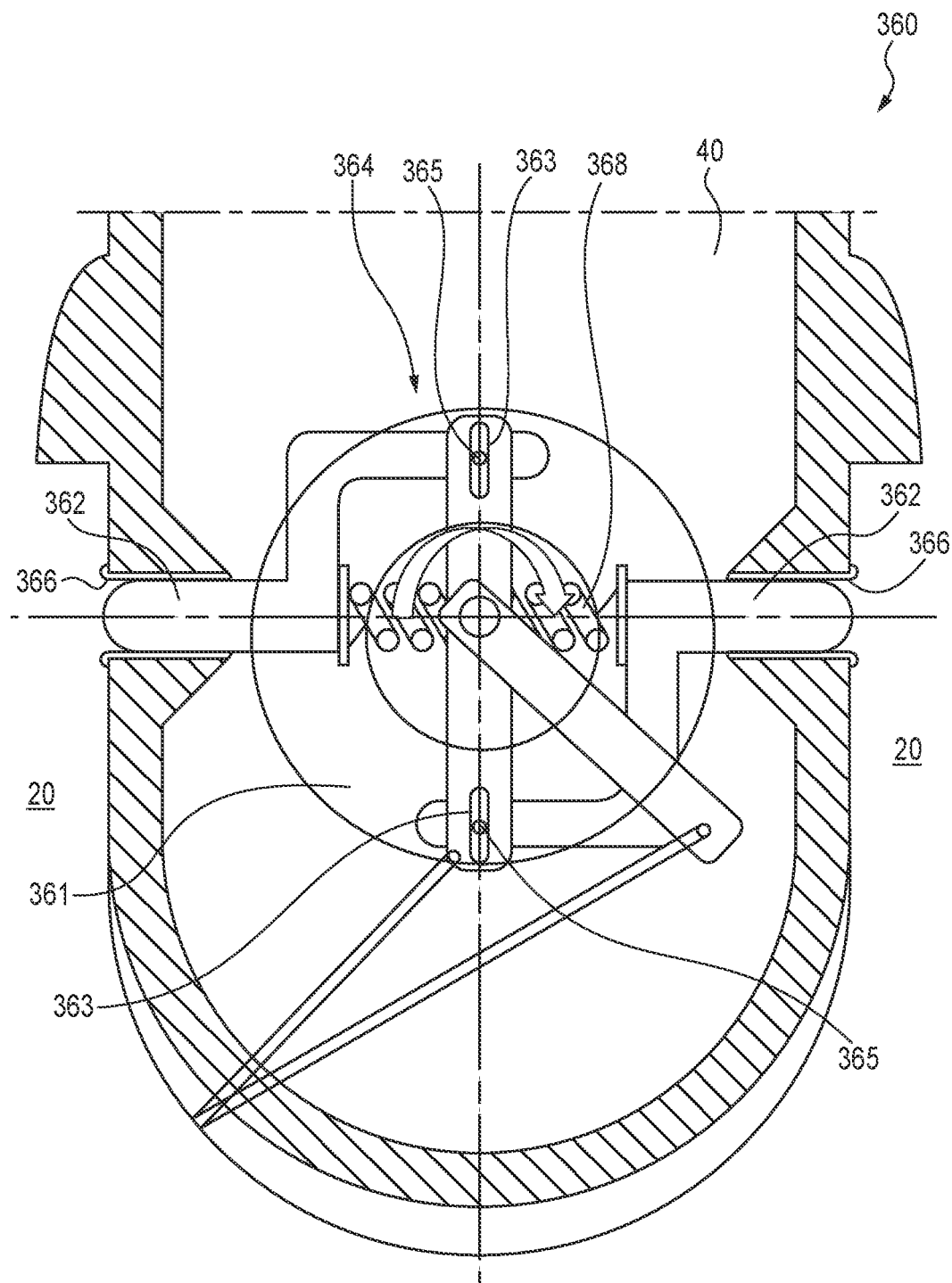
FIG. 33 illustrates an embodiment of a spring loaded knob connection in association with a clamp and saw joint assembly in accordance with the present subject matter.

Likewise, similar actuation can be achieved through rotating a knob that moves a linkage lever and engages or disengages the locking pins, as shown in FIG. 33. Specifically, FIG. 33 illustrates an embodiment of a spring loaded knob assembly 360 used in an assembly of a clamp base 20 and a saw base 40, in accordance with the present subject matter. The assembly 360 comprises a rotatable knob 361, one or more and typically a plurality of locking pins 362 which are axially positionable via a linkage assembly 364. The knob 361 defines slots 363 within which guide pins 365 are retained. The guide pins 365 are integral or affixed to the locking pins 362. As will be understood, as the knob 361 is rotated, the movement draws the guide pins 365 via their retention in the slots 363. Movement of the guide pins 365 results in movement of the locking pins 362. The locking pins 362 upon axial displacement, engage receiving regions 366 in the clamp base 20. A spring or biasing member 368 can be used to bias the pins 362 to an outwardly projecting engagement position. In certain versions, the assembly 360 is integral to the saw and base and the locking pins 362 engage the receiving regions 366 in the clamp base 20 to hold the components together.

Figure 34A:
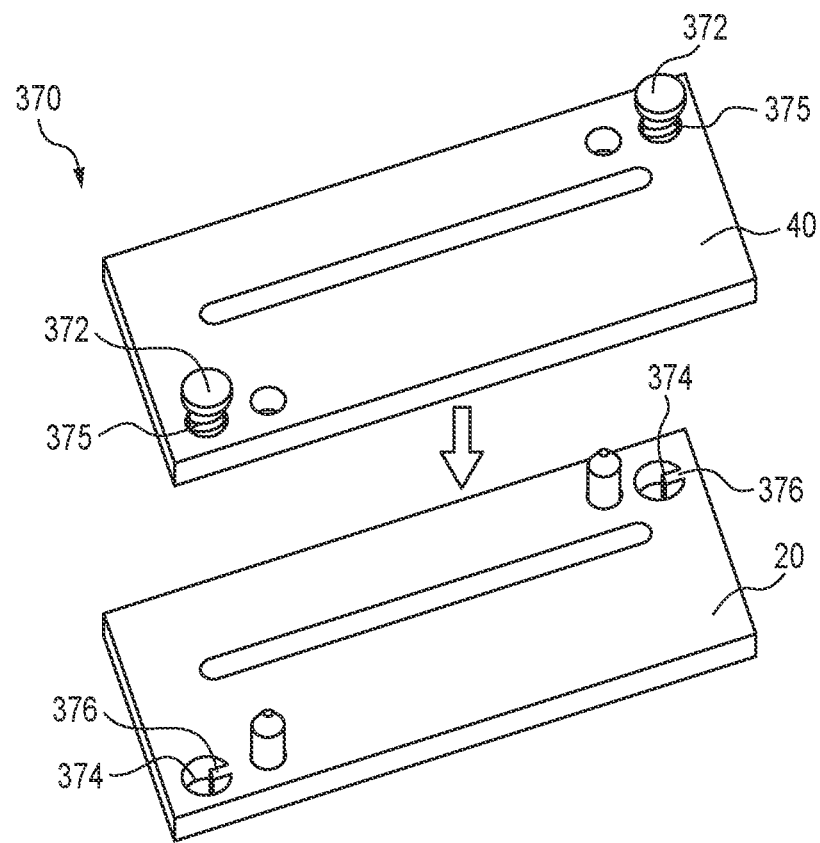
FIGS. 34A-34B illustrate an embodiment of a spring biased quick release pin connection in association with a clamp and saw joint assembly in accordance with the present subject matter.
Figure 34B:
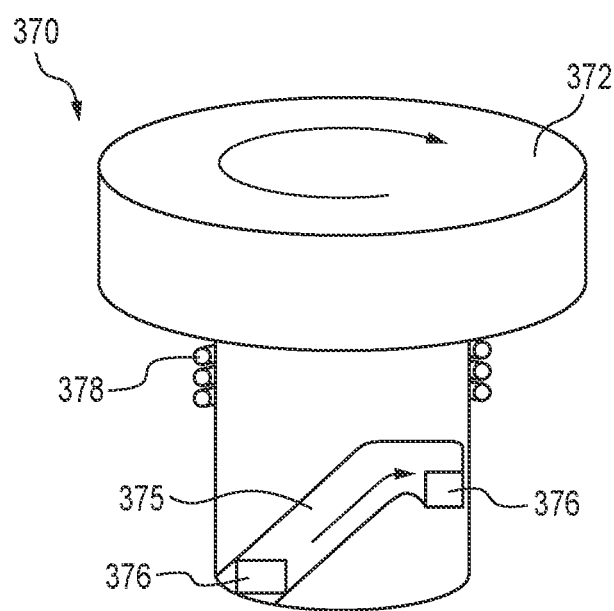

Another embodiment is to utilize a quick release pin with an integral cam profile that engages a pin/tab on the clamp base. When turned or otherwise positioned, the pin/tab changes the axial position of the pin. The cam profile is configured such that the spring force holds the pin in position during tool use, preventing inadvertent separation. See FIGS. 34A-34B. Specifically, FIGS. 34A-34B illustrate an embodiment of a spring biased quick release pin assembly 370 for releasably engaging a clamp base 20 with a saw base 40. The assembly 370 comprises one, and typically a plurality of, quick release pin(s) 372 with a groove or helical channel 375 retained with the saw base. Corresponding receiving regions 374 are provided in the clamp base 20. Each receiving region 374 includes one or more fingers 376. Upon positioning of a pin 372 in region 374 and engagement between the finger 376 and groove 375, the bases 20, 40 can be tightened together by rotation of the pin 372 as shown in FIG. 34B. The assembly 370 may optionally include a spring 378 or other biasing member.

Figure 35A:
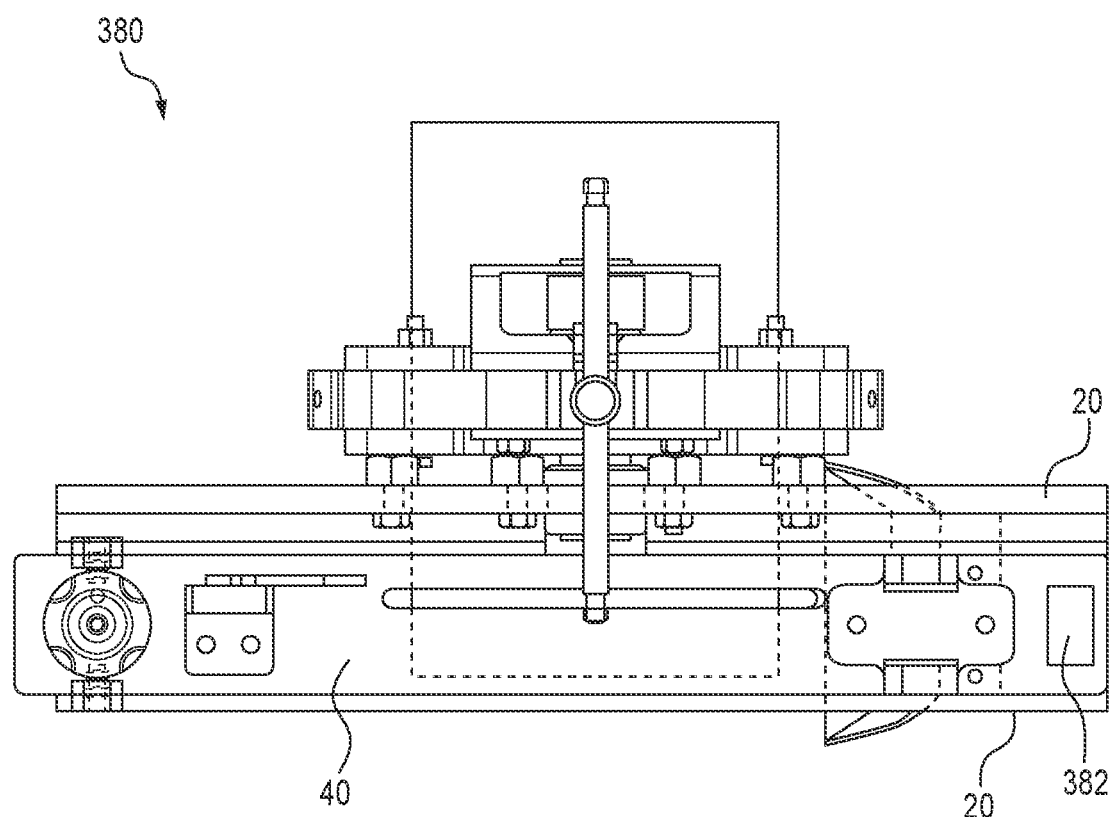
FIGS. 35A-35C illustrate an embodiment of a hook connection in association with a clamp and saw joint assembly in accordance with the present subject matter.
Figure 35B:
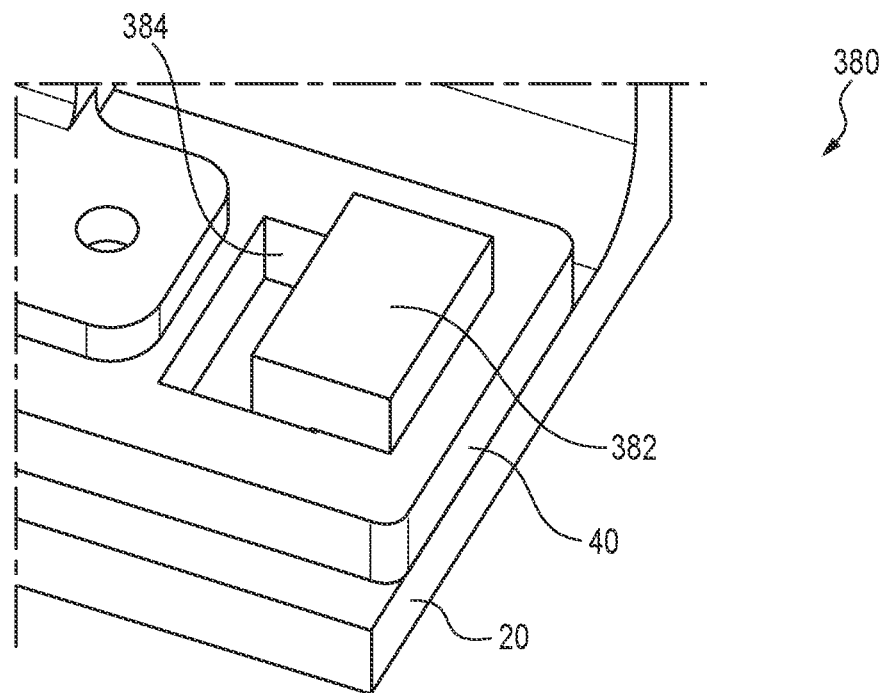
Figure 35C:
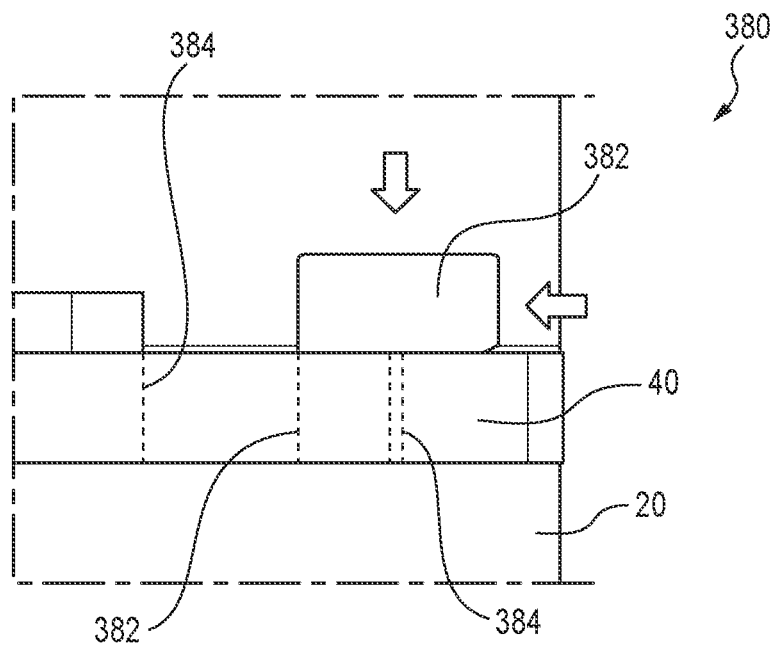

With most of the embodiments described herein, a hook can be used to locate and lock one end of the saw base to the clamp base, thereby reducing the number of inputs required from the user when trying to lock or unlock the saw to/from the clamp. See FIGS. 35A-35C. Specifically, FIGS. 35A-35C illustrate an embodiment of a hook assembly 380 in association with a saw base 40 and a clamp base 20, in accordance with the present subject matter. The hook assembly 380 includes at least one hook member 382 projecting from the clamp base 20. The hook 382 extends through an aperture 384 defined in the saw base 40.

A significant benefit of the present subject matter is its efficiency and ease of use. The setup of the saw and clamp system to the pipe is simplified through the use of the quick connection embodiments, while retaining the accurateness desired to improve efficiency compared to other steel pipe fabrication methods currently employed. Allowing separation of the saw from the clamping components improves a user's ability to install onto the workpiece and reduces physical effort required.

The chip deflector and/or the chip management system improves cleanliness during the cutting process and reduces clean-up time required after completing the cut. This provides additional efficiency in the fabrication process.

Saws or Pipe Fabrication Tools

A wide array of tools and particularly cutting tools such as powered pipe fabrication tools or cutting saws can be used with the clamping systems and/or accessories described herein. Typically, the cutting tools include a rotary cutting blade driven by an electric motor. The cutting tools can be in the form of an integral electrically powered rotary blade saw that is engaged to the clamping system. Examples of such saws are those available from Exact Tools under the designation EXACT SAW. In other applications, the cutting tools can be in the form of a rotary blade saw that is driven by a separable electrically powered drive. Examples of this latter system include a Model 258 (or 258XL) Power Pipe Cutter and Number 700 Power Drive, available from Ridge Tool under the RIDGID designation. It will be understood that the present subject matter can be used with a wide array of cutting tools and/or saws. Non-limiting examples of tools include pipe fabrication tools, bevellers, grinders, cutting or grinding wheeled tools, and the like. It will be understood that the saws or tools of the present subject matter include one or more of the accessories described herein.

Figure 36:
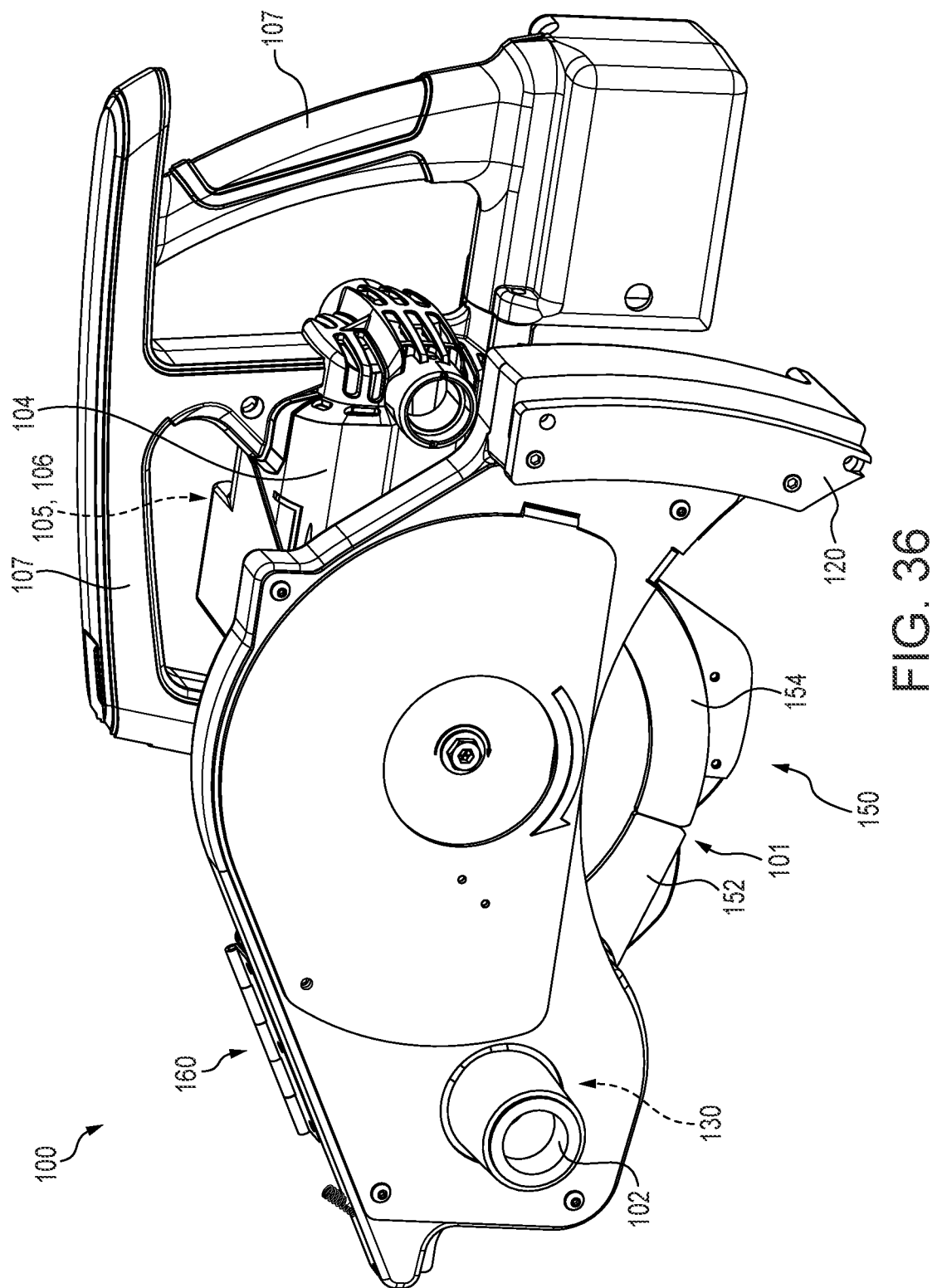
FIGS. 36 and 37 illustrate an embodiment of a cutting saw assembly having various accessories described herein.
Figure 37:
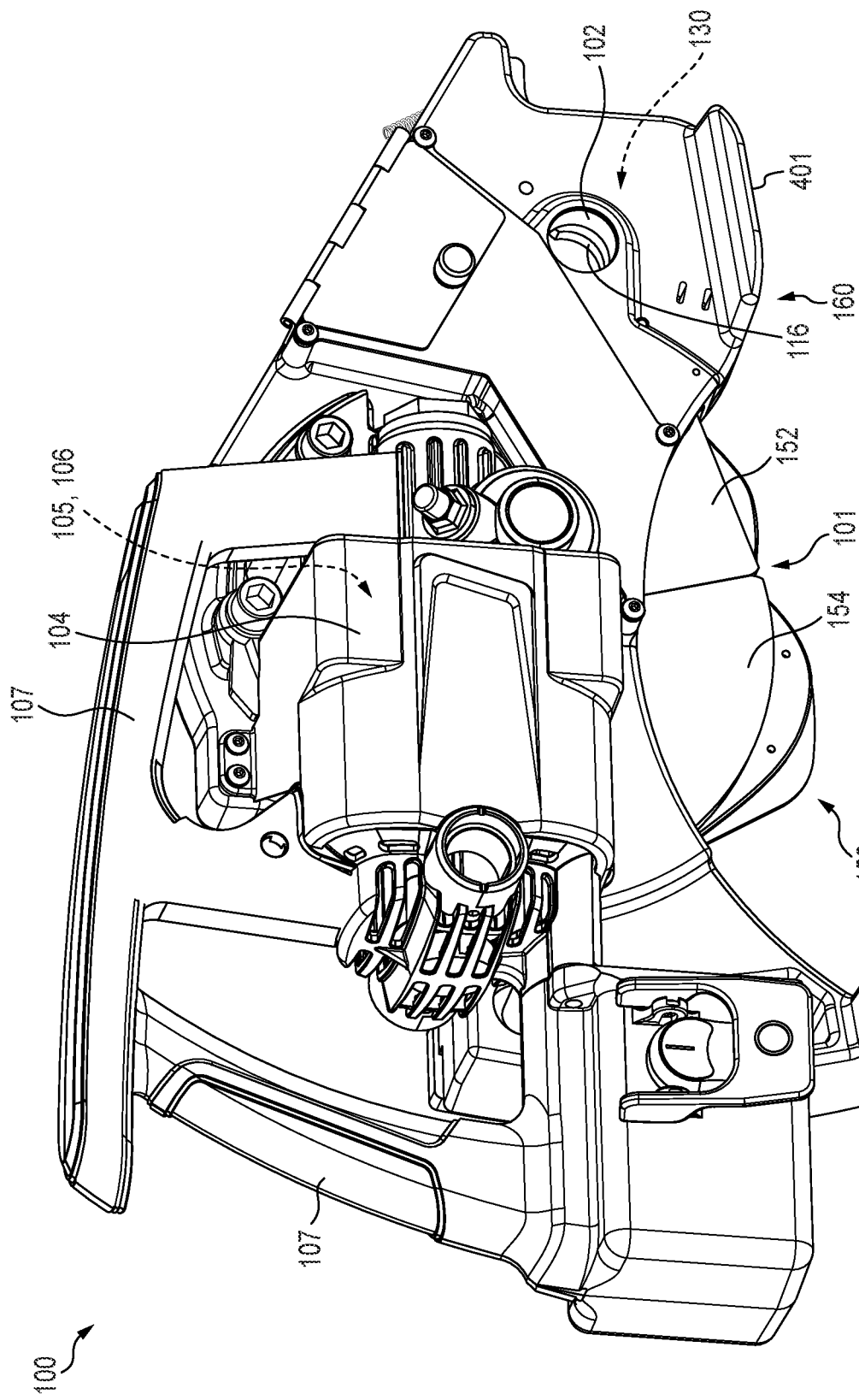

FIGS. 36 and 37 illustrate an embodiment of a saw assembly 100 in accordance with the present subject matter. The saw assembly 100 comprises a body or enclosure 104 generally housing an electric motor 105 and a gearbox 106 that transfers rotary power from the motor to a saw blade 101. A clutch may optionally be provided between the gearbox and the blade. The saw assembly 100 also comprises one or more handle(s) 107 for facilitating gripping and positioning the saw 100 and ground-contacting members or feet 401, 403 sufficiently spaced apart to allow a user to place the saw assembly 100 horizontally on the ground or another preselected horizontal surface. The saw assembly 100 also comprises control provisions to control operation of the saw such as a switch which can be in the form of an actuator that is depressed to turn the motor 105 on, and a separate button to turn the motor 105 off. A variable position trigger switch can be used to adjust motor speed and thus blade rotary speed. Typical blade speeds are within a range of from about 1500 rpm to about 5000 rpm or greater. Although the saws and tools are typically powered by an electric motor, the present subject matter includes the use of pneumatic or hydraulic power source. Also, the present subject matter includes tools and assemblies devoid of a gearbox or transmission.

FIGS. 36 and 37 additionally illustrate the saw assembly 100 with the previously described receiving aperture 102 and concave cutout 116 of the latch plate 110 (not visible) which engages the quick connect pin 70 (not shown). The saw assembly 100 is also depicted as including the previously described alignment plate 120 of the plunge guide assembly. The saw assembly 100 also includes the previously described interlock system 130 (not visible). The saw assembly 100 also includes the previously described blade guard system 150 having a forward blade guard 152 and a rearward blade guard 154. The saw assembly 100 also comprises the previously described chip management system 160 (not visible). As previously noted, the saw assembly 100 can utilize one or more, or all, of these features. In a particular version, the saw assembly includes the noted alignment plate in which the alignment plate is adapted to engage a guide on the clamp system, or vice versa. This configuration serves to direct path of the saw by maintaining alignment.

Figure 38:
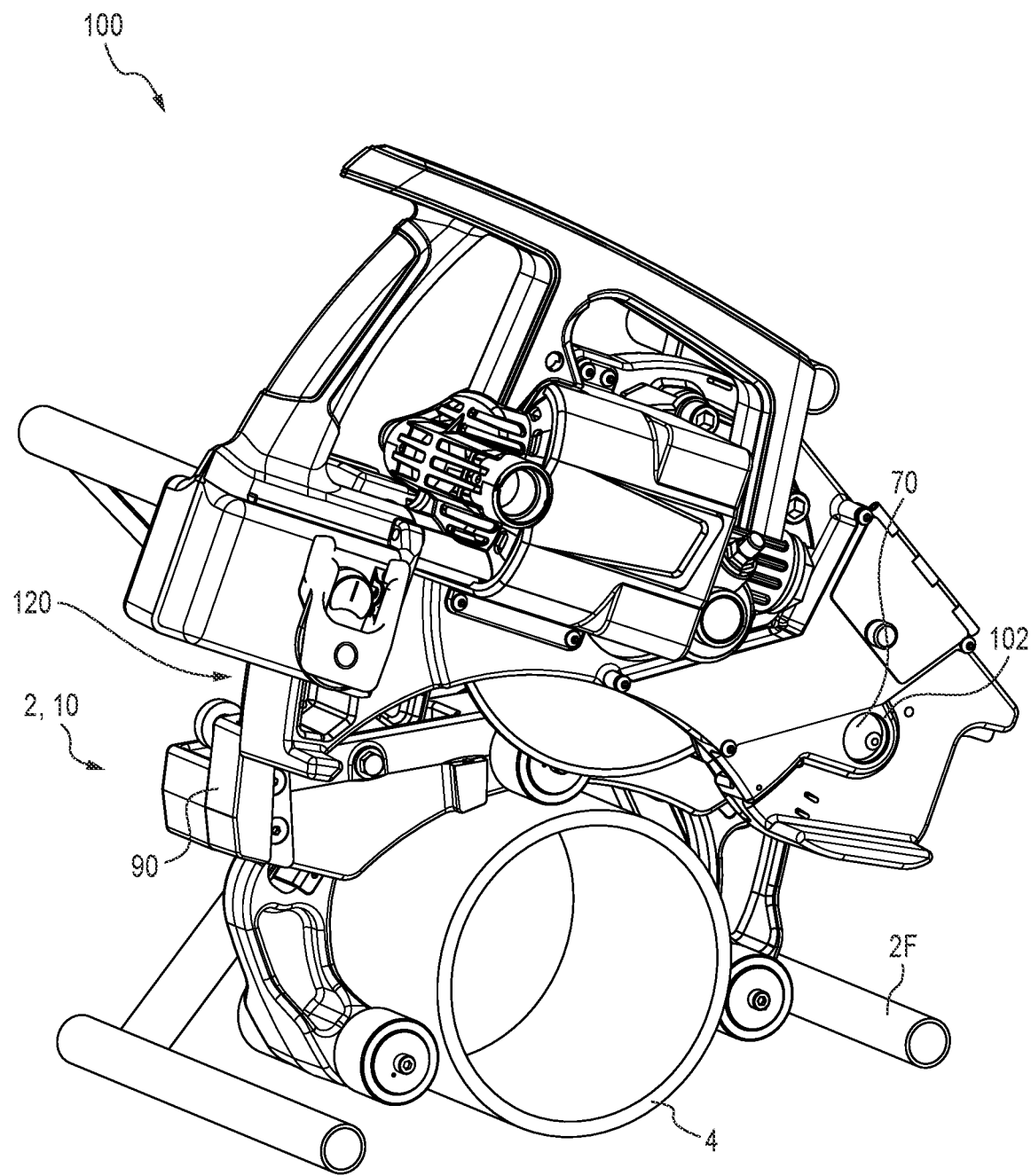
FIGS. 38 and 39 illustrate the saw assembly of FIGS. 36 and 37 in conjunction with a clamping assembly, a saw joint assembly, and a workpiece, in which the saw is at a "ready" position.
Figure 39:
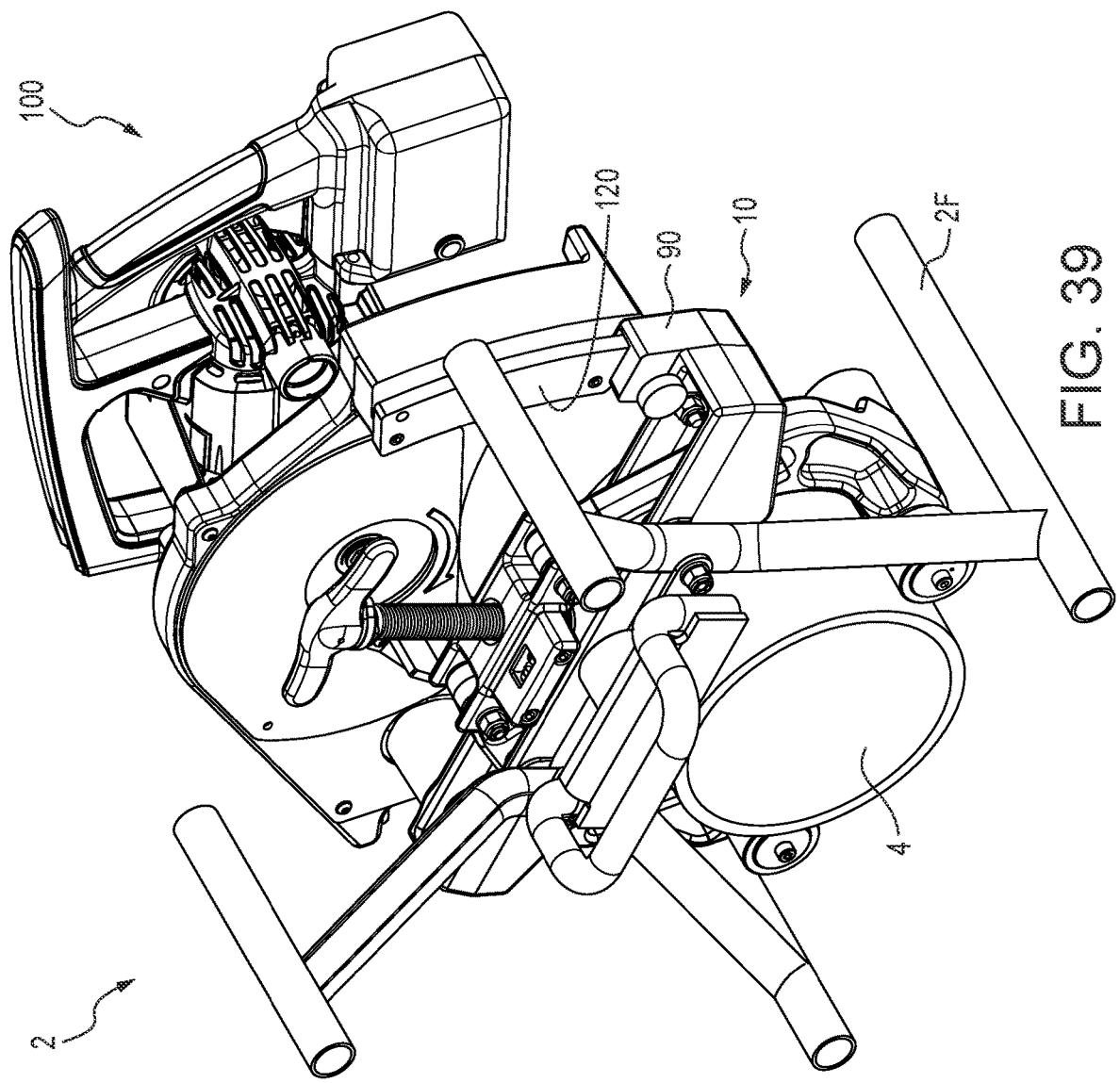

FIGS. 38 and 39 illustrate the saw assembly 100 from FIGS. 36 and 37. FIGS. 38 and 39 illustrate the saw assembly 100 releasably engaged with the previously described clamping system 2 via the clamp and saw joint assembly 10. FIGS. 38 and 39 also depict the clamping system 2 used in association with a frame assembly 2F. Details of the clamping system and noted frame assembly are set forth in U.S. application Ser. No. 16/591,753 filed Oct. 3, 2019. FIGS. 38 and 39 further illustrate the clamping system 2 engaging a workpiece 4 and the saw assembly in a "ready" position. These figures also illustrate additional features of the previously described receiving aperture 102 and quick connect pin 70; and the alignment plate 120 and its slideable engagement with the grooved guide 90 of the clamping system 2.

Figure 40:
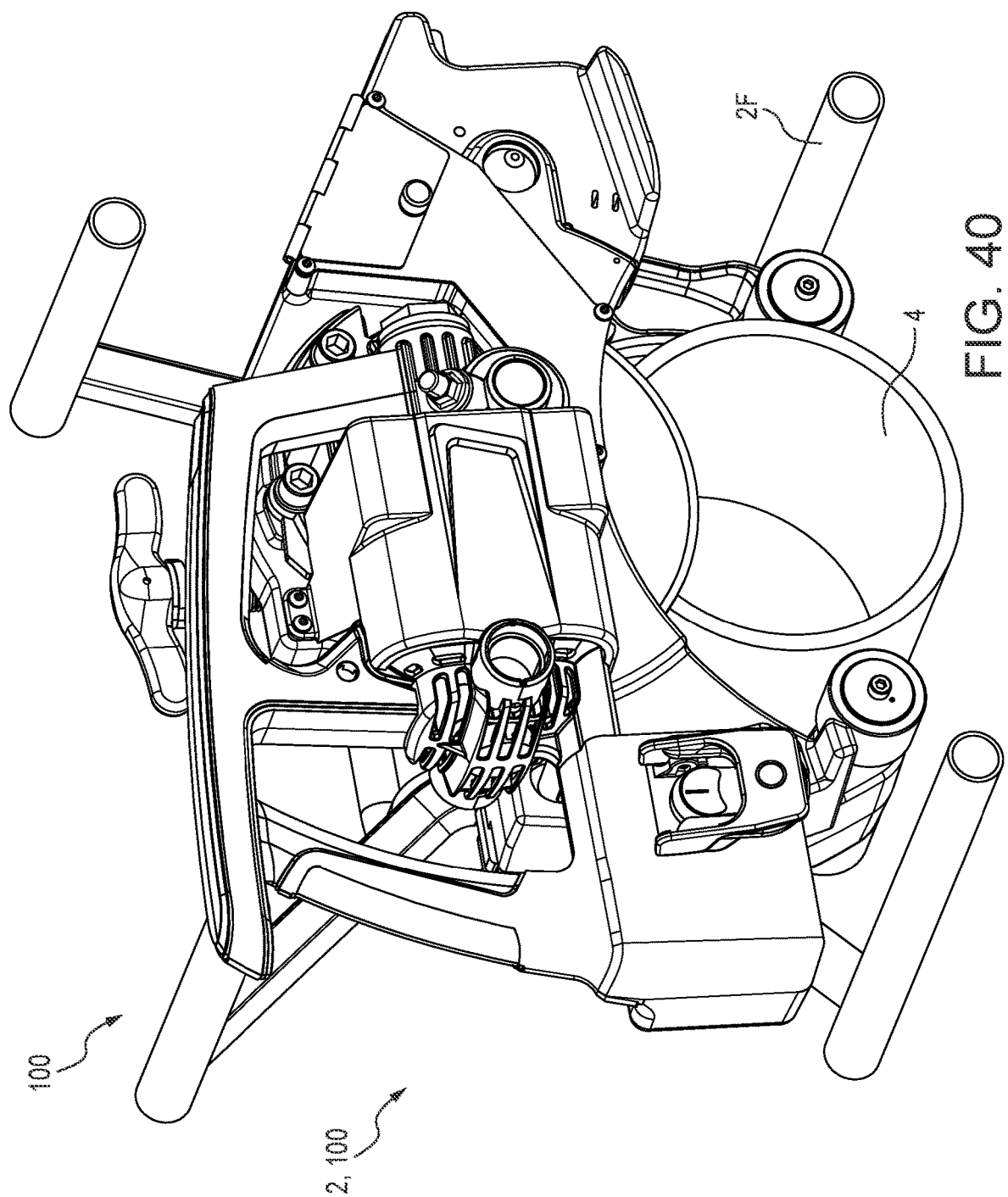
FIGS. 40 and 41 illustrate the saw assembly of FIGS. 38 and 39 in which the saw is at a "plunged" position.
Figure 41:
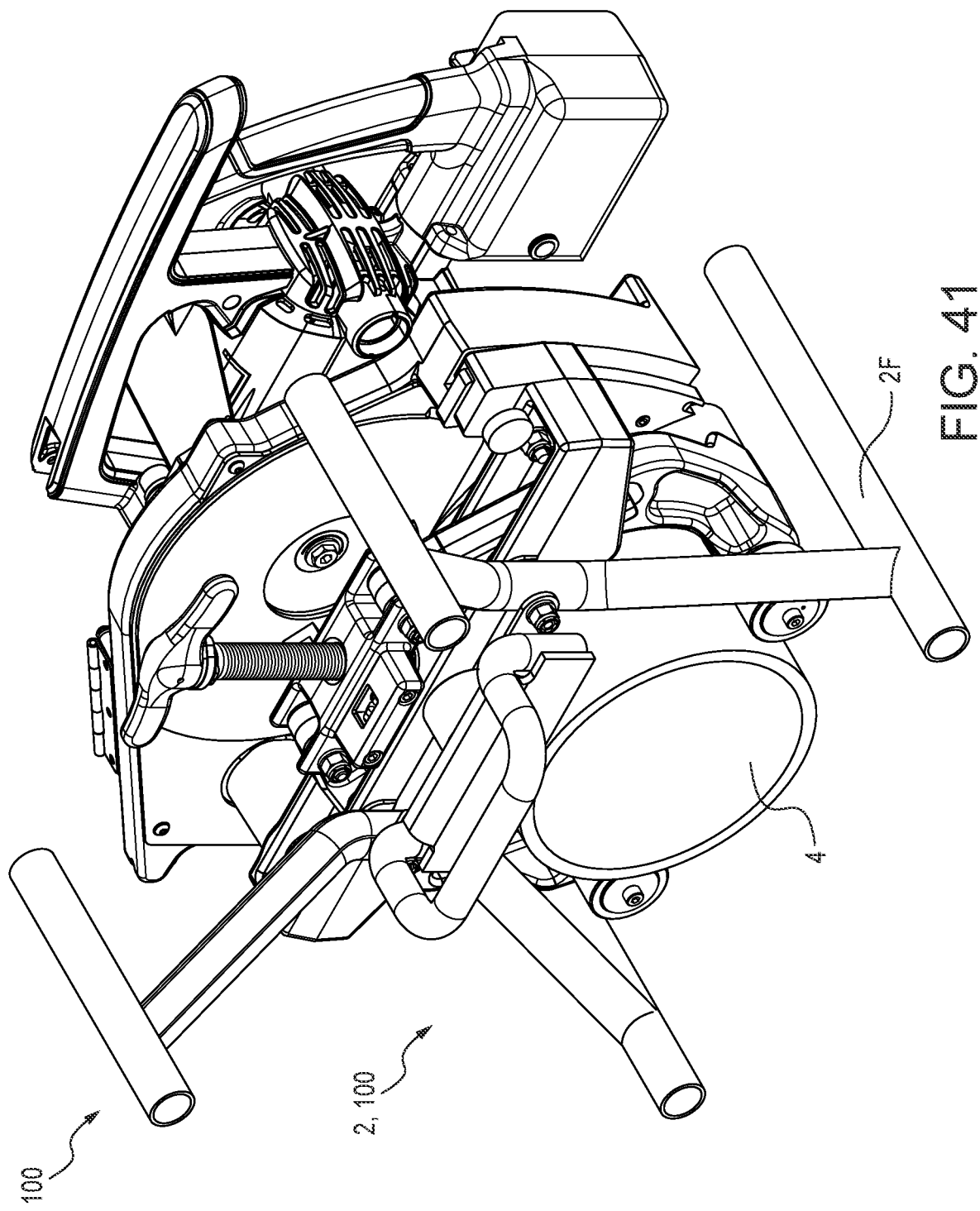
Figure 41A:
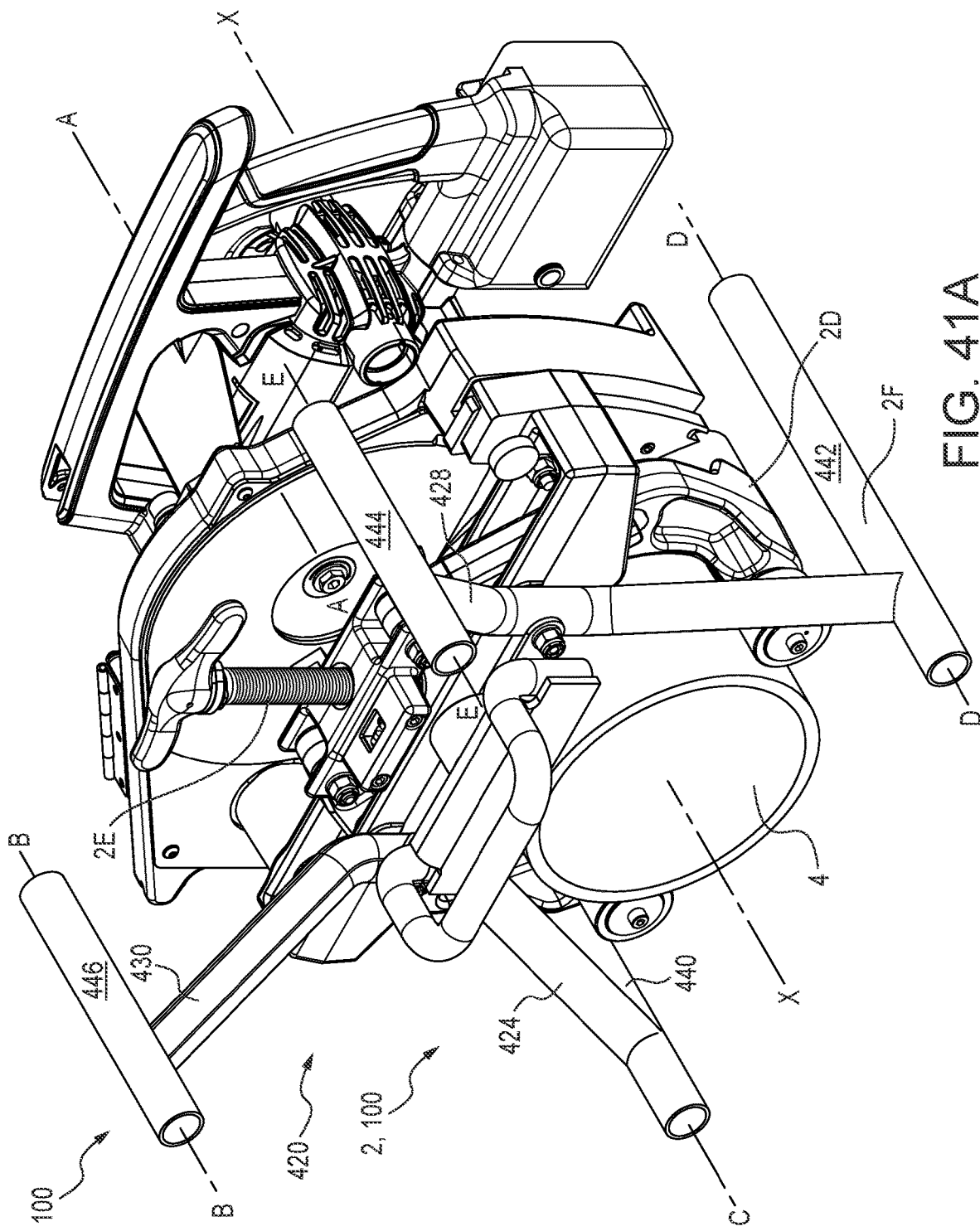
FIG. 41A illustrates a clamping system and various improvements.

FIGS. 40 and 41 illustrate the saw assembly 100, the clamping system 2, the frame assembly 2F, and the clamp and saw joint assembly 10 from FIGS. 38 and 39 in which the saw assembly is in a "plunged" position relative to the workpiece 4.

Additional Aspects

Figure 12A:
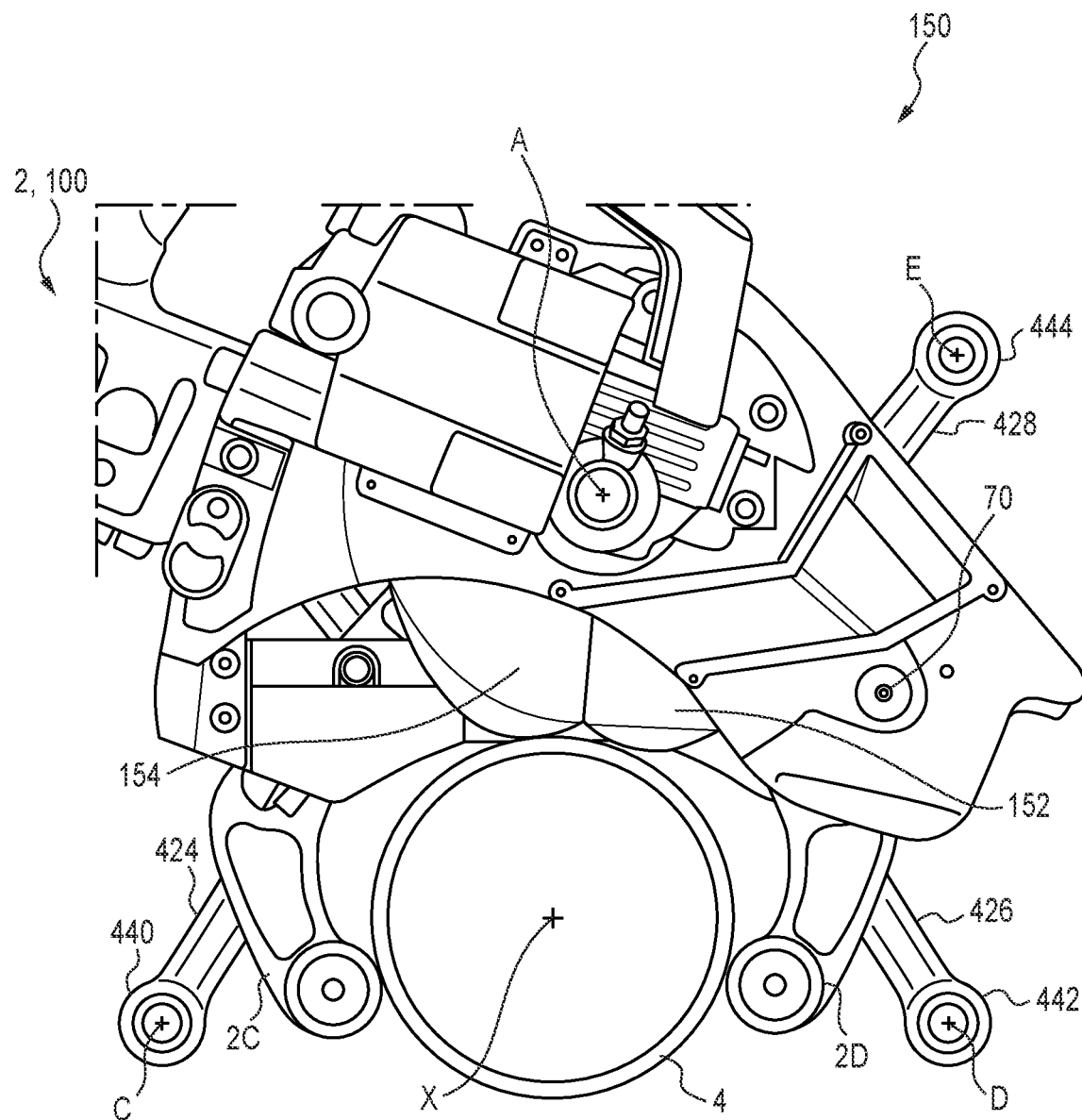
FIG. 12A illustrates a clamping system and various improvements.

A clamping system and various improvements are also provided. Referring to FIGS. 1, 2, 2A, 11, 12A, and 41A, a clamping system 2 is operatively associated with a tubular workpiece 4, and comprises a base 20 (FIGS. 1, 2, 2A) including a first arm 2C and a second arm 2D (FIGS. 2A, 12A). The first and second arms 2C, 2D are pivotally connected and secured to the base 20. The clamping system 2 also comprises a frame 420 (FIG. 41A) secured to the base 20 and mounted on the tubular workpiece 4 for rotation about a first longitudinal axis X. The first and second arms 2C, 2D are biased together for securing the tubular workpiece 4 therebetween. The tubular workpiece 4 is aligned with the first axis X. The clamping system 2 also comprises a saw assembly 100 removably secured to one of the base 20 and the frame 420 in fixed relation to the plurality of outwardly extending members 424, 426, 428, 430. The saw assembly 100 includes a blade 101 rotatable about a second axis A spaced parallel to the first axis X. The frame 420 defines a plurality of outwardly extending members 424, 426, 428, 430 spaced from an exterior surface portion of the tubular workpiece 4. The plurality of outwardly extending members 424, 426, 428, 430 each include an associated one of a plurality of grab members 440, 442, 444, 446 at a respective distal end portion thereof spaced from the exterior surface portion of the tubular workpiece 4, wherein the blade 101 includes an edge portion spaced between the first and second axes X, A and adapted for cutting the tubular workpiece 4. Rotation of the plurality of grab members 440, 442, 444, 446 about the first axis X, when the edge portion of the saw blade 101 engages the tubular workpiece 4, causes the blade 101 to cut the tubular workpiece 4. In this manner, the present subject matter can be used to cut lengths of pipe ranging from 1 to 6 inches in diameter, as well as lengths of pipe ranging from 6 to 12 inches in diameter.

In addition in certain embodiments, and with further reference to the clamping system 2, rotation of the blade 101 entirely about the circumference of the exterior surface portion of the tubular workpiece 4 that is located between the first axis X and the second axis A causes the tubular workpiece 4 to be cut into two sections.

In addition in certain embodiments, and with further reference to the clamping system 2, each one of the plurality of grab members 440, 442, 444, 446 is oriented along an associated one of a plurality of additional axes B, C, D, E, wherein each one of the plurality of additional axes is spaced parallel to the first axis X.

In addition in certain embodiments, and with further reference to the clamping system 2, the plurality of outwardly extending members 424, 426, 428, 430 are each spaced apart generally from an exterior surface portion of the tubular workpiece 4. The exterior surface portion is located between the first and second axes X, A, and the plurality of outwardly extending members 424, 426, 428, 430 consists of only four members 424, 426, 428, 430.

The present subject matter also provides interlock systems for use in the devices and assemblies described herein. For instance, regarding the present subject matter, a conventional sensor or switch could be used to perform the interlock function. In particular, a proximity sensor (e.g., Hall Effect sensor) could be used by the controller to allow or disallow operation. Thus, a discrete (digital, in this case, binary) signal such as from a switch is not the only embodiment that captures the spirit of the present subject matter. Indeed, a continuous (analog) signal from a sensor could be used along with predetermined threshold values or other parameter limits that the controller would, in turn, evaluate and then use to determine whether tool operation is to be permitted, or not. FIGS. 42-47 illustrate representative interlock systems, components thereof, and related methods. These interlock systems, components, and/or methods can be used in association with, or as alternatives to, the previously described interlock system 130 described in association with FIG. 10.

Figure 42:
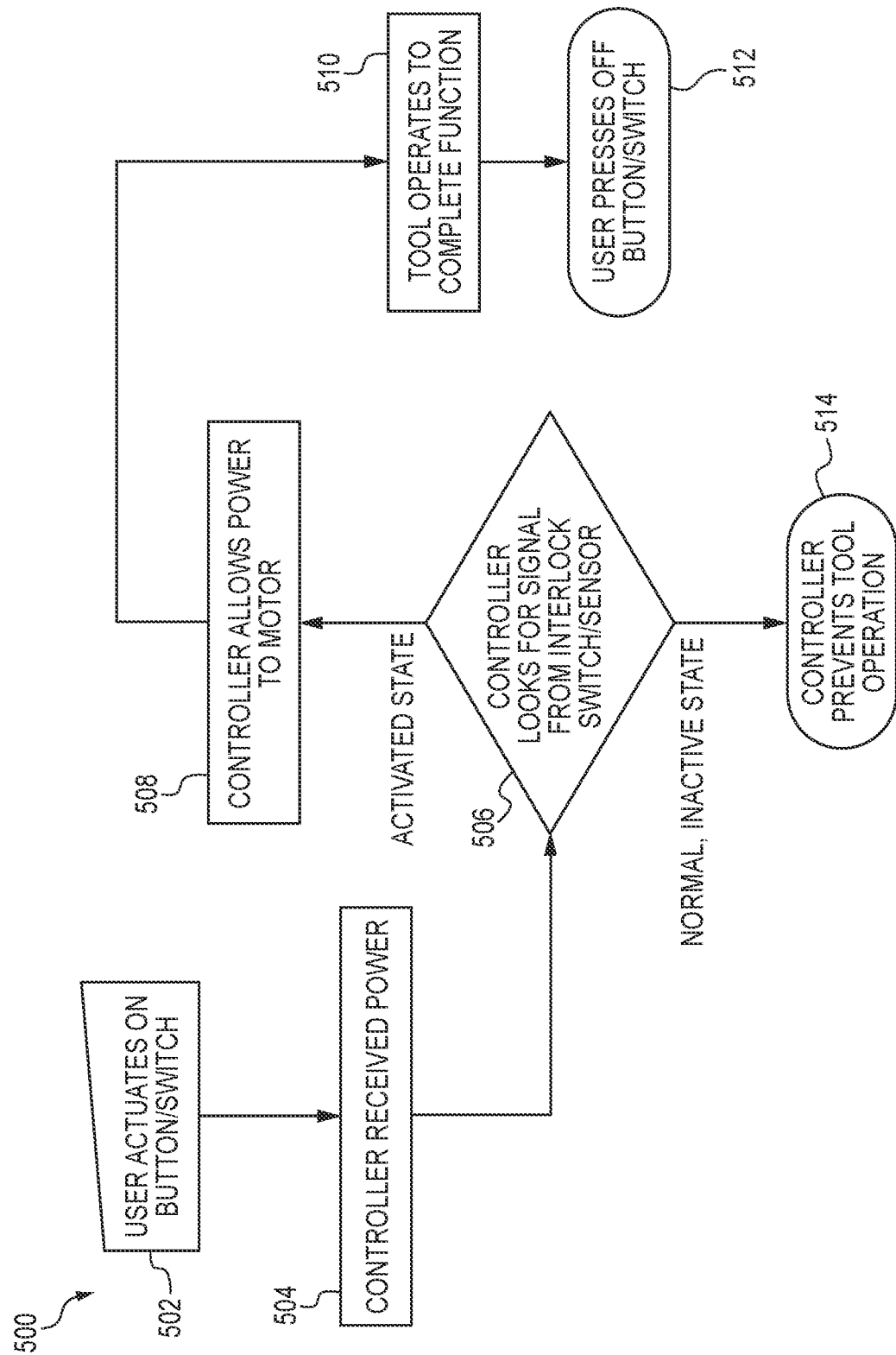
FIG. 42 is a schematic flowchart illustrating an embodiment of an interlock system method in accordance with the present subject matter.

Specifically, FIG. 42 schematically depicts a flowchart of a method 500 for operation of an embodiment of an interlock system. This interlock system typically uses one or more digital binary switches and is incorporated and/or used in cutting tools or devices. The method 500 comprises an actuation operation 502 in which a user actuates a power button or switch associated with the device, tool, or assembly. Upon such activation, a power-receiving operation 504 occurs in which electrical power is delivered to a controller of the device or assembly, and/or the controller receives the power. In a subsequent "search" operation 506, the controller assesses or "looks" for a signal from one or more interlock switch(es) or sensor(s). If the state of such a signal corresponds to an activated state, the controller allows electrical power to be delivered to a motor of the device, tool, or assembly. This operation is depicted as an "enablement" operation 508 in FIG. 42. If the state of the signal corresponds to a normal, inactive state, the controller prevents tool operation as shown in operation 514. Upon delivery of electrical power to the motor in operation 508, the device, tool, or assembly operates to perform one or more desired functions, as shown by operation 510 in FIG. 42. Upon completion of the desired function, a user terminates operation of the device, tool, or assembly by actuation or de-actuation of one or more buttons or switches as shown in operation 512 of FIG. 42.

Figure 43:
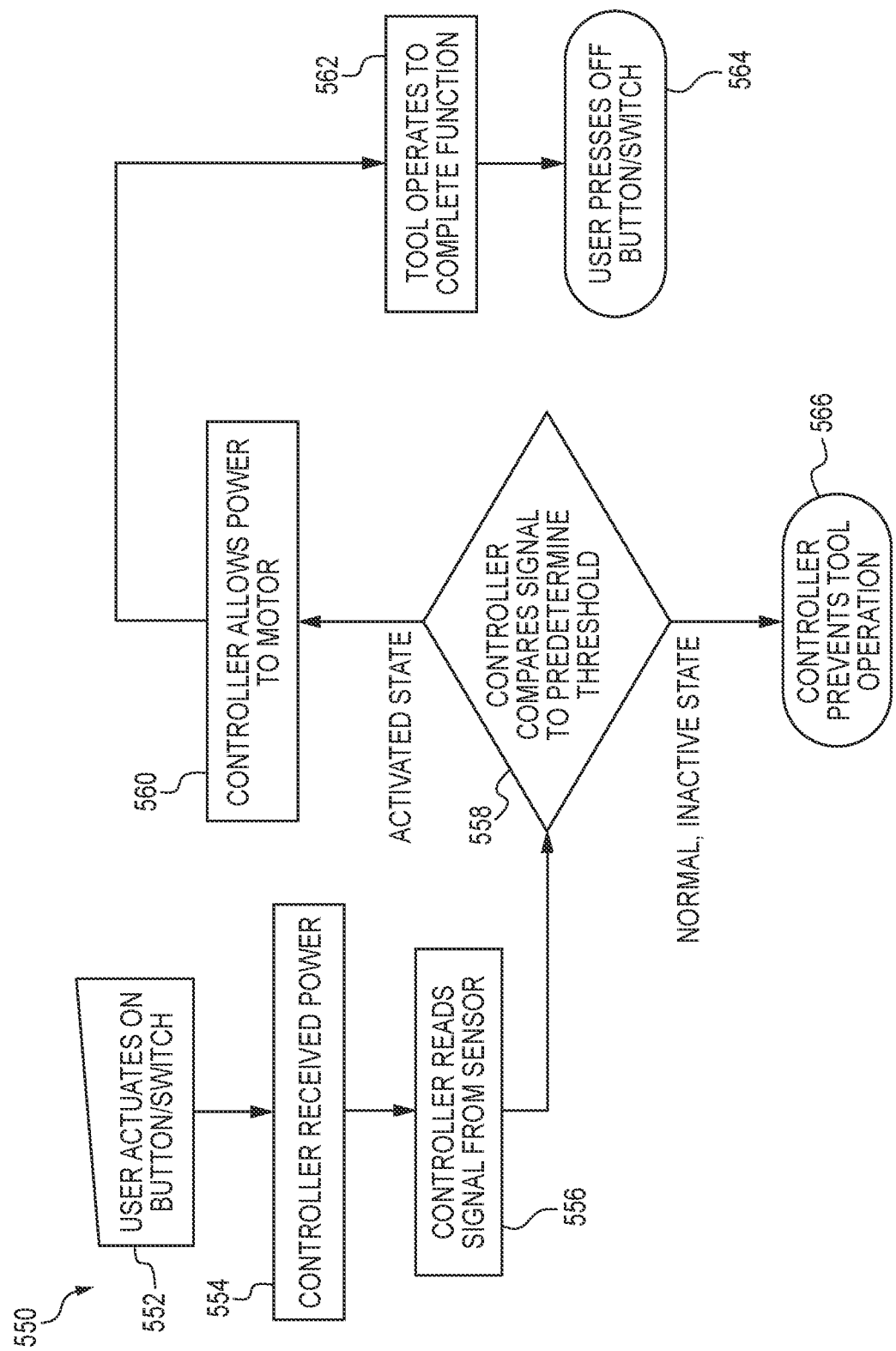
FIG. 43 is a schematic flowchart illustrating another embodiment of an interlock system method in accordance with the present subject matter.

Specifically, FIG. 43 schematically depicts a flowchart of a method 550 for operation of another embodiment of an interlock system. This interlock system typically uses one or more analog sensor(s) and is incorporated and/or used in cutting tools or devices. The method 550 comprises an actuation operation 552 in which a user actuates a power button or switch associated with the device, tool, or assembly. Upon such actuation, a power-receiving operation 554 occurs in which electrical power is delivered to a controller of the device or assembly and/or the controller receives the power. In a subsequent operation 556, the controller reads a signal from one or more interlock sensor(s). In a signal-comparing operation 558, the controller compares the signal "read" to a predetermined threshold signal value. If the controller determines that the device is in an activated state, the controller allows electrical power to be delivered to a motor of the device. This operation is shown as an enablement operation 560 in FIG. 43. If the controller determines that the device is in a normal, inactive state, the controller prevents tool operation as shown in tool use-prevention operation 566. Upon delivery of electrical power to the motor in enablement operation 560, the device or tool operates to perform one or more desired functions, as shown by permitted-use operation 562 in FIG. 43. Upon completion of the desired function, a user terminates operation of the device, tool, or assembly by actuation or de-actuation of one or more buttons or switches as shown in use termination operation 564 of FIG. 43.

Figure 44:
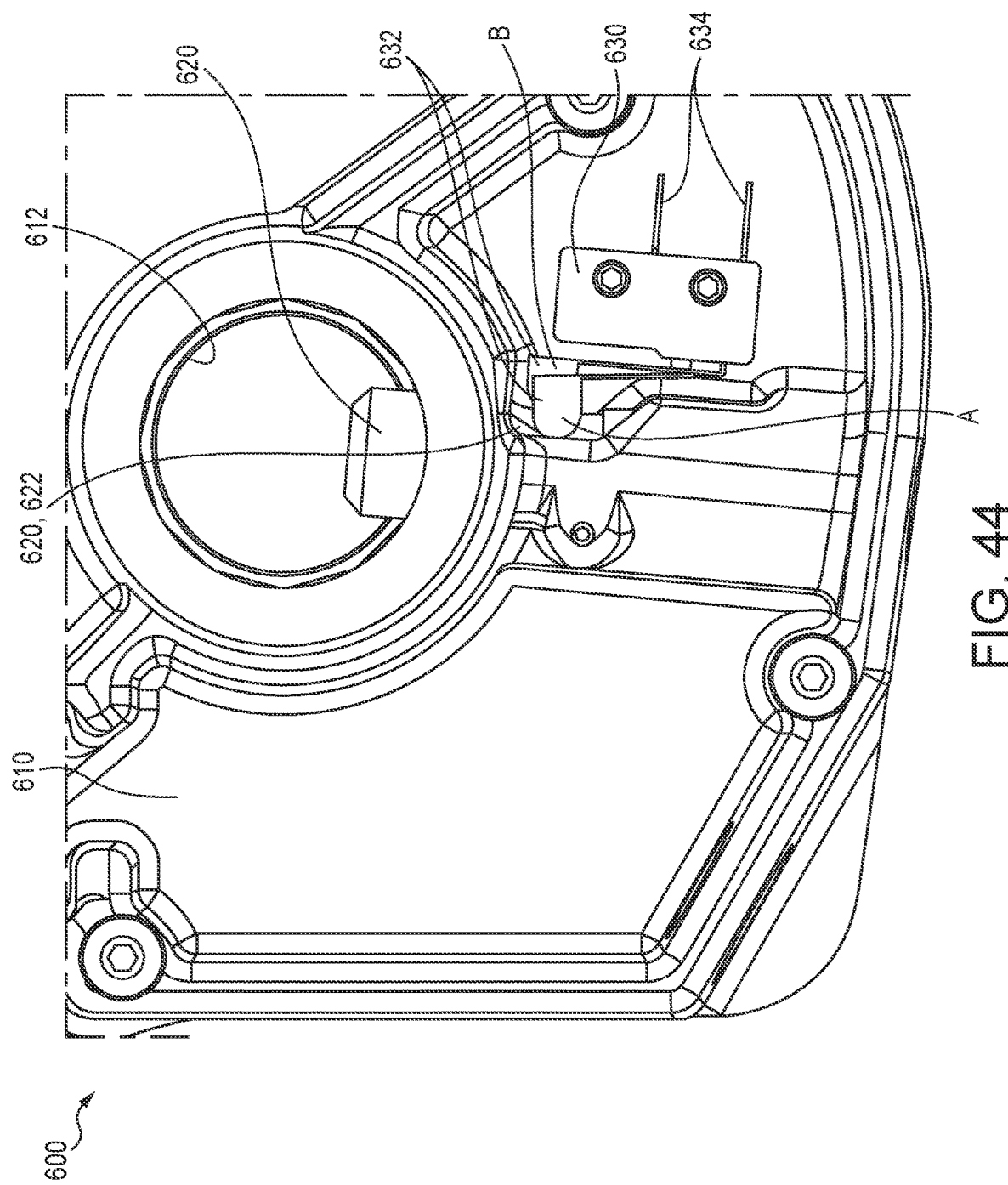
FIG. 44 illustrates an embodiment of an interlock system in a normal, inactive state method in accordance with the present subject matter.
Figure 45:
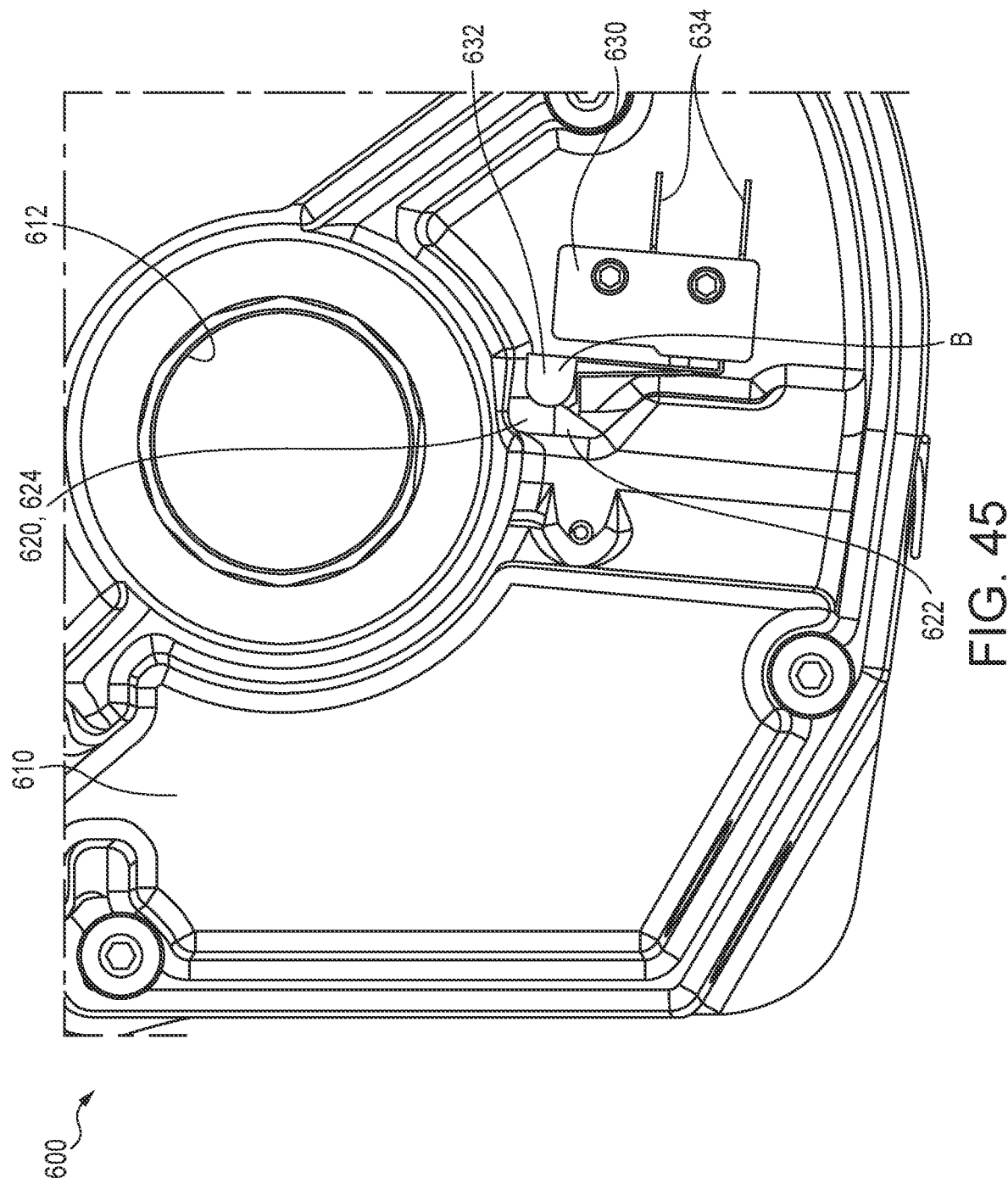
FIG. 45 illustrates the interlock system of FIG. 44 in an activated state.

FIGS. 44 and 45 illustrate an embodiment of an interlock system 600 in a normal inactive state, and in an activated state, respectively. The interlock system 600 is incorporated in a saw assembly 610 that includes a receiving aperture 612 or main pivot bore sized and shaped to receive a quick connect pin, such as quick connect pin 70 described herein. The interlock system 600 comprises a positionable or moveable plunger 620, and an interlock switch 630. The plunger 620 is positionable between an extended state as shown in FIG. 44, in which the plunger 620 extends into and within the receiving aperture 612; and a retracted state as shown in FIG. 45, in which the plunger 620 is free from or does not extend into and within the receiving aperture 612. The plunger 620 can be provided in a wide array or different geometries and configurations. In the version shown in FIGS. 44 and 45, the plunger 620 includes a plurality of regions, differing in geometry such as for example, diameter. These regions include a first region 622, a second region 624, and a third region 626. The first region 622 separates and/or is disposed between the second and the third regions 624, 626. These regions are described in greater detail herein in association with the interlock switch 630. The interlock switch 630 can be provided in a wide array of configurations and forms, but in the version shown in the referenced figures, the switch 630 comprises a displaceable lever contact 632 which is positionable between positions A and B. The switch 630 also comprises electrical contacts 634. As described herein, the state of the electrical contacts 634, i.e., either opened or closed, depends upon the position of the lever contact 632 which in this assembly depends upon the position of the plunger 620, i.e., plunger extended or retracted in the receiving aperture 612. The lever contact 632 slidingly contacts or otherwise engages the plunger 620. Upon the plunger moving to the extended position shown in FIG. 44, the lever contact 632 moves to first position A as shown in FIG. 44 as a result of contact between the lever contact 632 and the third region 626 of the plunger 620. Upon the plunger 620 moving to the retracted position shown in FIG. 45, the lever contact 632 moves to a second position B as shown in FIG. 45 as a result of contact between the lever contact 632 and the second region 624 of the plunger 620. Typically, the lever contact 632 is biased to urge that member in contact with the plunger 620 and specifically, the noted plunger regions 622, 624. The interlock switch 630 and/or other components may include one or more biasing members (not shown) to promote contact between the lever contact 632 and the plunger 620. The contacts 634 of the interlock switch 630 provide electrical signal(s) and/or signal communication(s) as to the state of the switch 630 which is typically governed by the position of the lever contact 632, i.e., positions A and B.

Figure 46:
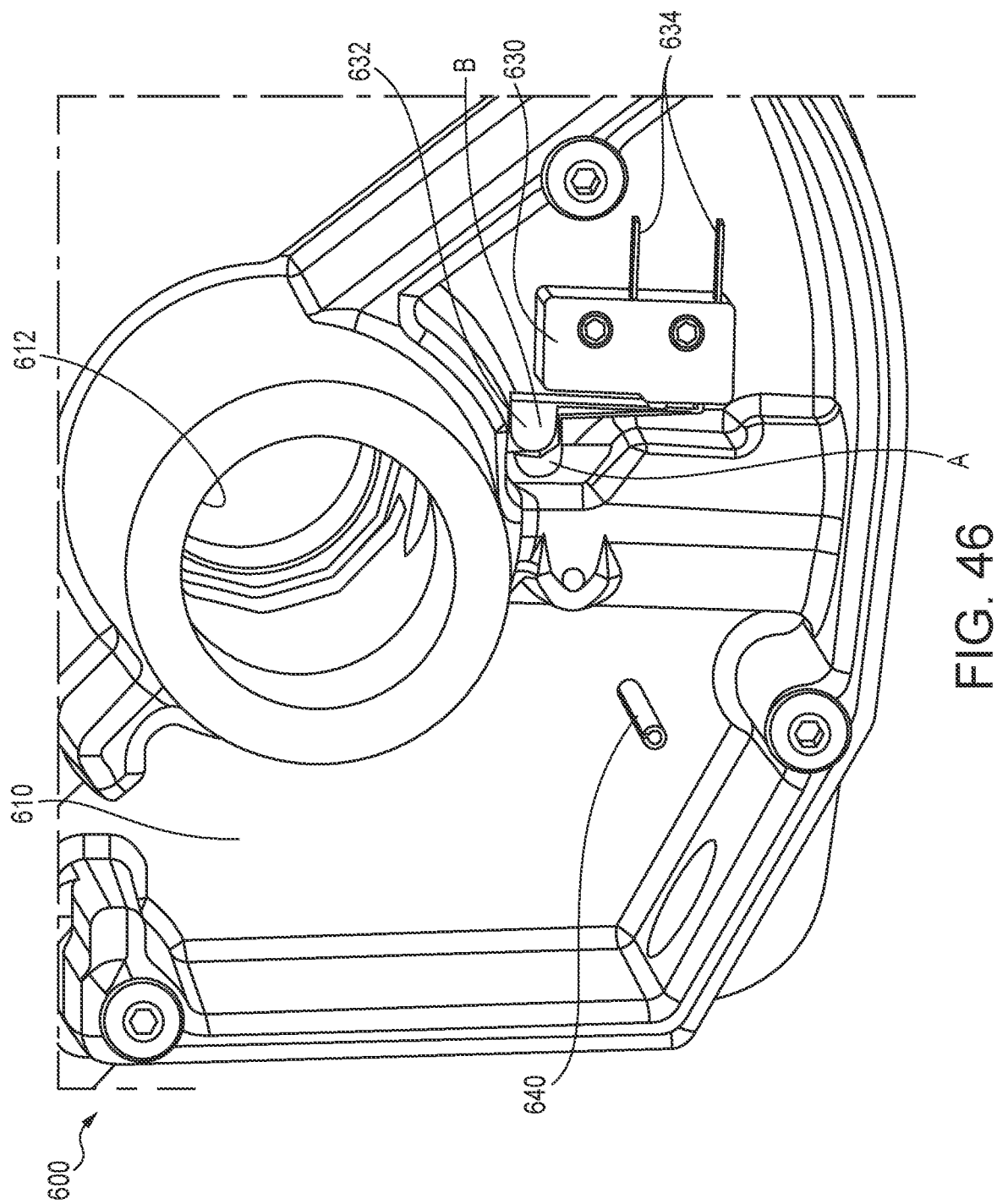
FIG. 46 is a partial assembly view illustrating components of the interlock system of FIGS. 44-45.

FIG. 46 is a partial assembly view illustrating additional aspects and components of the interlock system 600 of FIGS. 44-45. FIG. 46 further shows the positions A and B of the lever contact 632 of the switch 630. As previously noted, the position A corresponds to a normal, inactive state, i.e., plunger 620 extended into the receiving aperture 612, and position B corresponds to an activated state, i.e., plunger 620 retracted and not extending into the receiving aperture 612. The interlock system 600 in certain embodiments further comprises a limit pin 640. The limit pin 640 provides a stop for the plunger 620 (see FIGS. 44, 45, and 47) when the plunger 620 is extended into or within the receiving aperture 612. In particular versions, the interlock system 600 may also comprise one or more biasing members (see FIG. 47) to urge the plunger 620 to extend into or within the receiving aperture 612.

Figure 47:
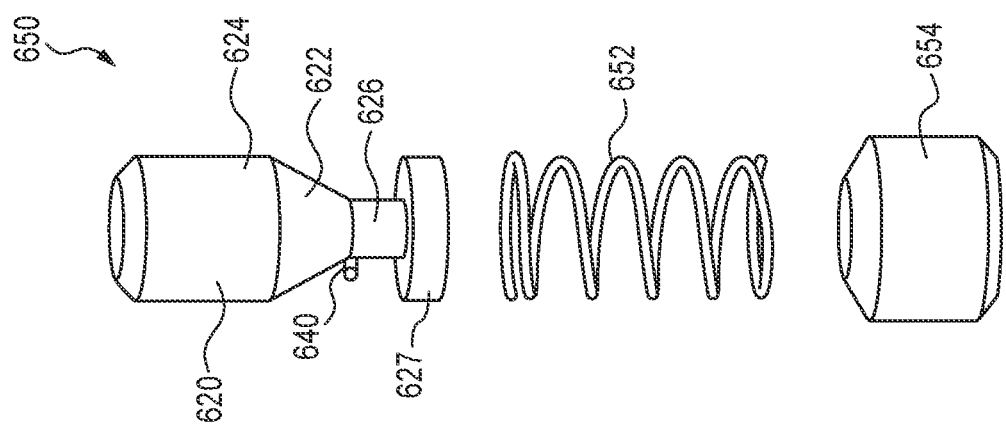
FIG. 47 is an exploded assembly view illustrating a plunger system used in the interlock system of FIG. 44.

FIG. 47 illustrates the plunger 620 and additional components constituting a plunger system 650. The plunger system 650 comprises the previously described plunger 620 having distinct regions 622, 624, and 626. As noted, the lever contact 632 of the switch 630 engages the plunger 620 in region 624 when the device is in an activated state. And, the lever contact 632 of the switch 630 engages the plunger 620 in region 626 when the device is in a normal, inactive state. The plunger system 650 also comprises a biasing member 652 which is shown for example as being in the form of a coil spring. The biasing member 652 urges the plunger 620 to enter into the receiving aperture 612. The plunger assembly 650 also comprises a securing member 654 which is depicted in FIG. 47 as a set screw, for example. The set screw 654 is threadedly engaged into a housing member of the saw 610 and provides a seat or support for the biasing member 652. FIG. 47 also illustrates the limit pin 640 and its position relative to the plunger 620. As shown, the limit pin 640 resides in a gap nearest 622 and 626, but contacts the plunger 620 at a flange 627 when the biasing spring 652 urges the plunger 620 into the receiving aperture 612.

The present subject matter includes a wide array of different interlock assemblies, components, and methods. In certain embodiments, all electrical current of the tool or device passes through an interlock switch and the action of closing the interlock switch allows use of the tool. When the interlock switch is "open," the circuit is not complete and, therefore, the tool cannot operate. In certain embodiments, an electrical controller is used that simply looks at the signal of the interlock switch. If the interlock switch is open, the controller determines that the tool cannot run. If the interlock switch is closed, the controller sees that and allows the tool to operate. Those signals could be reversed such that the tool can operate only if the switch is open. In certain embodiments, the electrical power of the tool does not flow through the controller or the interlock switch. The controller controls FETs through which the electrical power flows.

Generally, a switch or sensor performs the interlock function. A sensor such as a proximity sensor (e.g., Hall Effect sensor) can be used by the controller to allow or disallow operation. A discrete (digital, in this case, binary) signal like from a switch is not the only embodiment that can be used. A continuous (analog) signal from a sensor can be used with predetermined thresholds that the controller evaluates and uses to determine if tool operation is allowable.

In yet another embodiment of the interlock system 130 and with further reference to the figures, the controller (not shown) receives electrical power for the saw assembly 100 and is operatively connected to the interlock switch or sensor 140. The controller receives electrical power when the user actuates the tool "on" button or switch and the controller subsequently looks for a signal from the interlock switch or sensor 140. If the receiving aperture 102 is devoid of the quick connect pin 70, the signal from the interlock switch or sensor remains in the normal, inactive state whereby the controller, determining this state, disallows operation of the tool. If, however, the quick connect pin 70 is inserted within the receiving aperture 102, the interlock switch or sensor 140 is moved from the normal, inactive state to the active state thereby allowing use of the tool (most commonly via actuating FETs on the control board). Accordingly, the controller allows electrical power to the motor and corresponding tool operation until the user presses the off button or switch (see FIG. 42). It will be understood that the interlock system 130 could consist of a switch with discrete positions (e.g., electrically open or electrically closed) and whereby the normal, inactive state of the interlock could be either the electrically open or electrically closed switch position and, correspondingly, the activated state is characterized by a move to the opposite position (electrically closed or electrically open, respectively). Alternatively, it will be understood that the interlock system 130 could consist of a sensor (e.g., proximity sensor) with continuous output signals whereby the controller compares the received signal to a predetermined value or range of values to a predetermined threshold or thresholds to determine the state (normal, inactive, or activated) of the interlock system 130 (see FIG. 43). In this embodiment, the sensor may sense the presence of the quick connect pin 70 directly when in the receiving aperture 102 or separately sense a secondary component similar to the paddle 132.

Regarding the plunger assembly, in many embodiments the plunger is slidably contained inside a bore of the saw assembly 100 and spring biased to extend into the receiving aperture 102. When the quick connect pin 70 is inserted into the receiving aperture 102, the plunger is translated within the saw assembly 100, thereby interacting with the switch or sensor.

Figure 48:
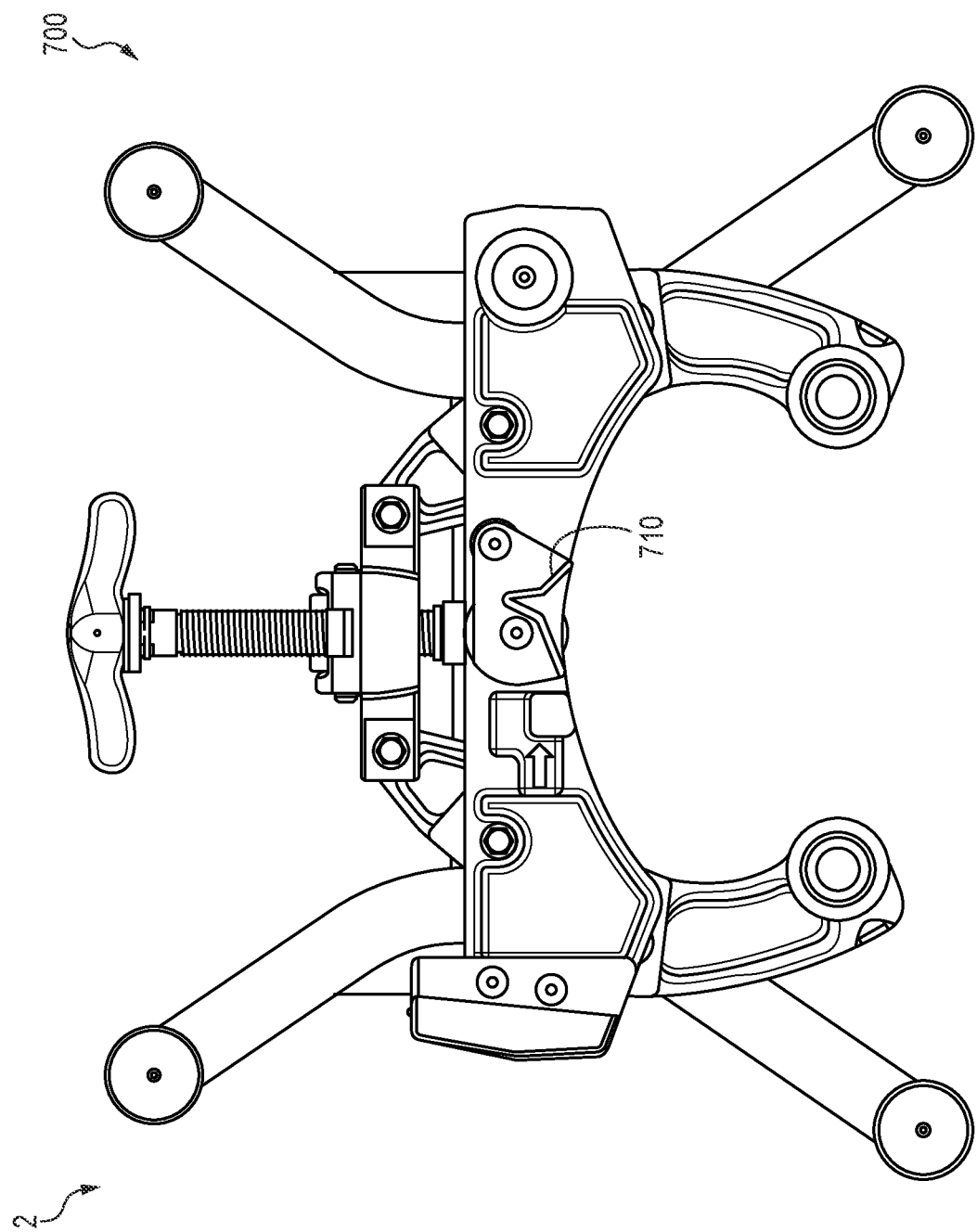
FIG. 48 illustrates an embodiment of a blade guard start system in accordance with the present subject matter.
Figure 49:
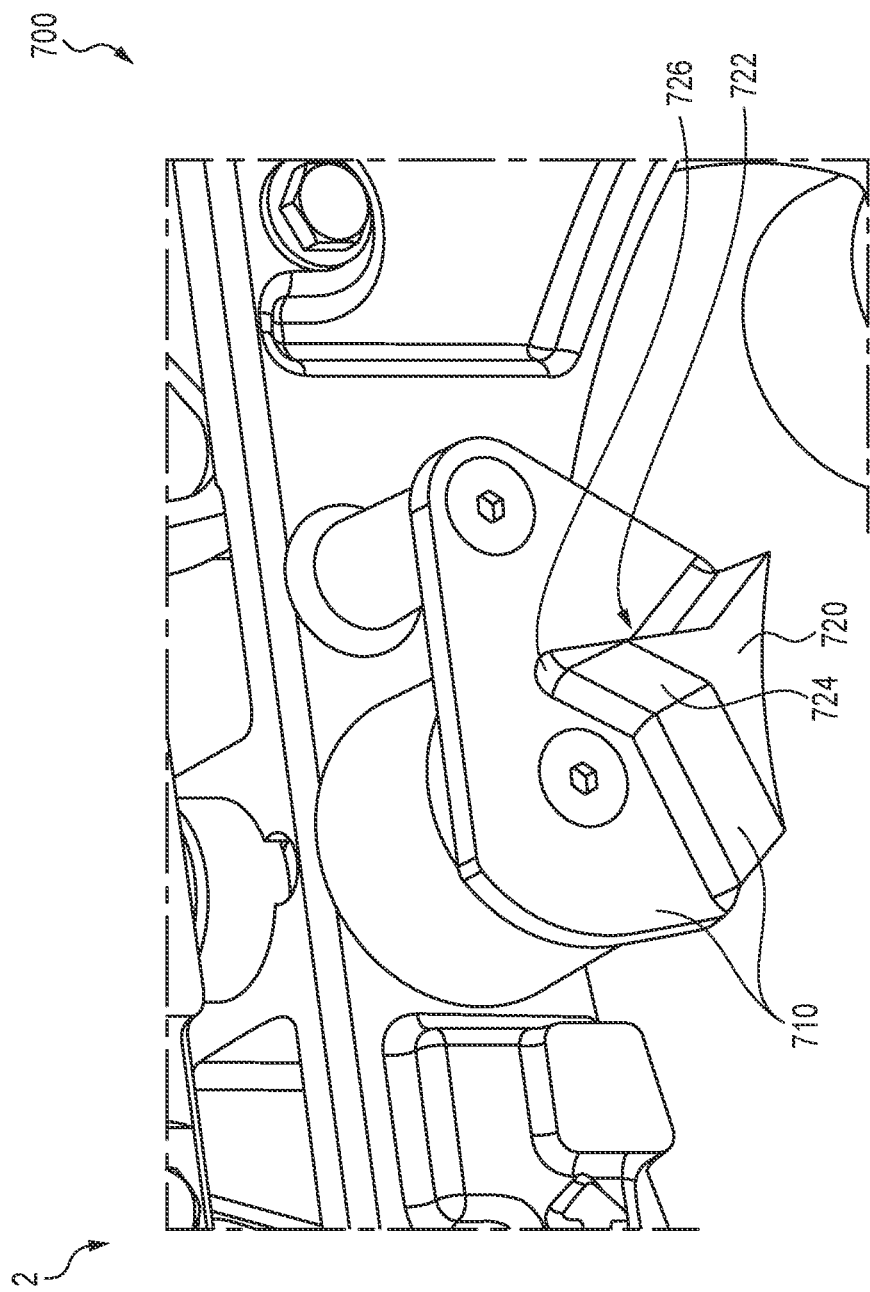
FIG. 49 is a detailed view of a guard start bracket used in the blade guard start system of FIG. 48.

A blade guard start system is also provided. Referring to FIGS. 11-15 and 48-52, an assembly is utilized which promotes or assists positioning of one or more blade guards during a cutting or tool operation involving pivoting or movement of the saw 100 relative to the clamping system 2. In a particular embodiment, a blade guard start system 700 is provided comprising a guard start bracket 710. Referring to FIGS. 48-49, the guard start bracket 710 is secured to or otherwise attached to the clamping system 2. The guard start bracket 710 pre-opens the blade guards (of the saw, tool, or device) when pivoting the saw relative to the clamping system 2, towards the pipe workpiece. The guard start bracket 710 is configured to minimize the amount of exposed blade but allowing the blade guards to open adequately with reasonable user input force when contacting the pipe.

Specifically, the blade guard start system 700 is used in conjunction with a saw assembly 100 with a rotary blade 101 and a forward blade guard 152 and a rearward blade guard 154. As previously described, the forward blade guard 152 and the rearward blade guard 154 pivot about the axis of rotation of the saw blade 101, shown as axis A in FIG. 11. As previously described, one or more springs or other biasing members are used to bias the guards 152, 154 to their closed position as shown in FIG. 11. Thus, the blade guards when closed reduce access to the saw blade 101.

Figure 50:
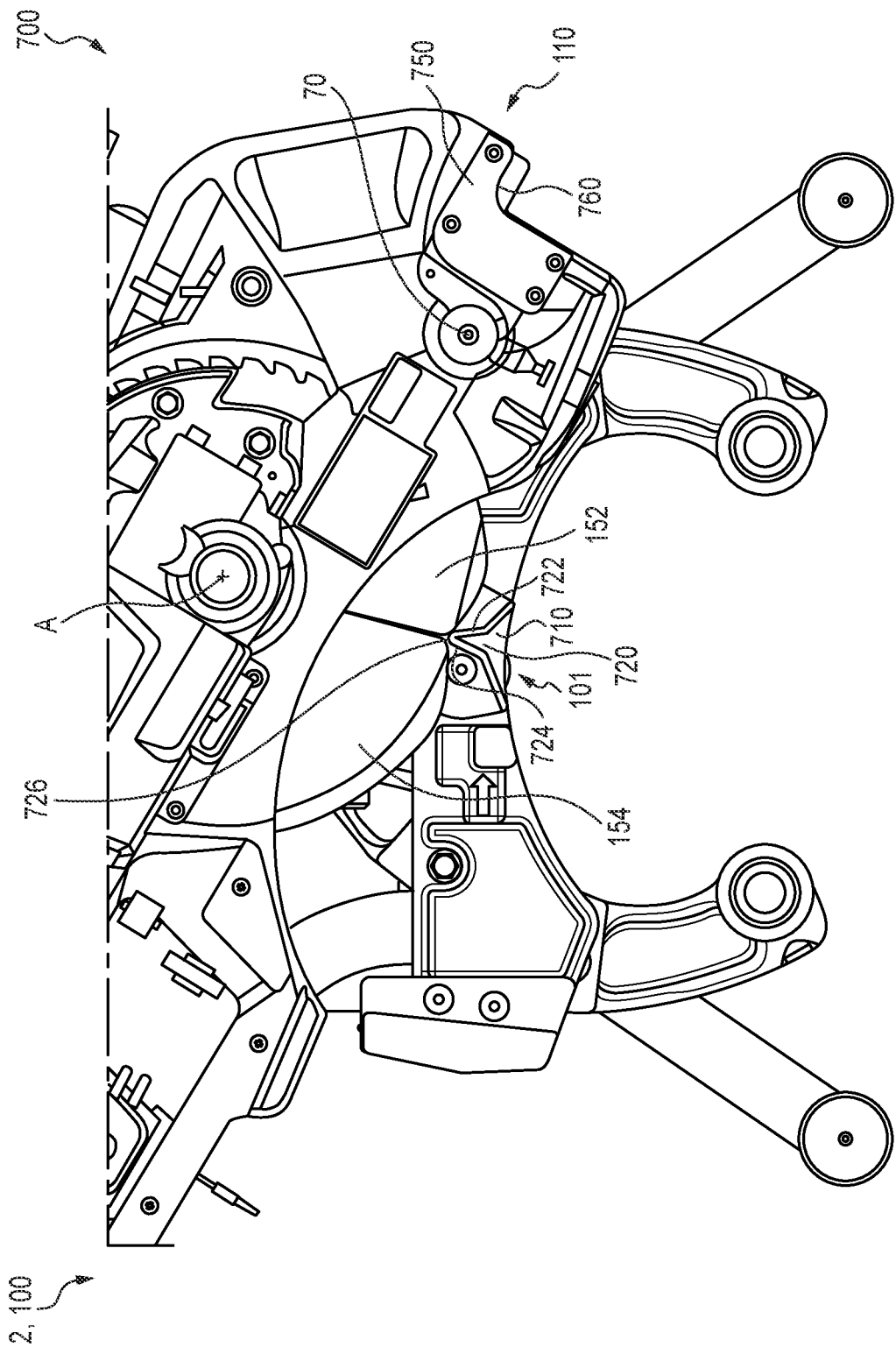
FIGS. 50-52 illustrate additional details and aspects of the blade guard start system of FIG. 48.

Referring further to FIG. 50, when the saw unit or assembly 100 is being installed onto the clamping system 2, the spring-biased forward and rearward blade guards 152, 154 cover the teeth of the blade 101 that would otherwise extend from the saw 100. The guard start bracket 710 is generally aligned with and positioned between the blade guards 152, 154 as described in greater detail herein.

Figure 51:
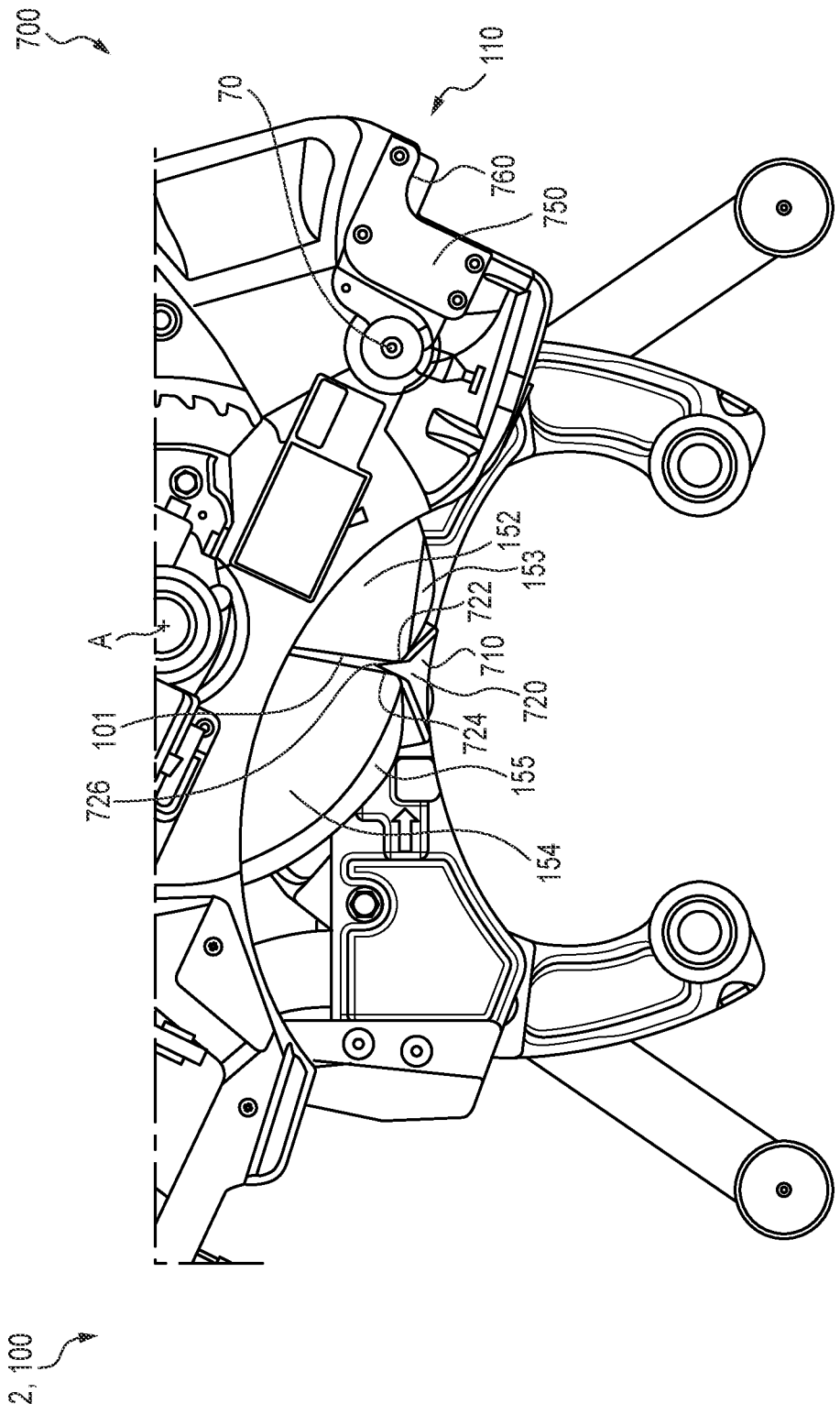

Referring to FIG. 51, as the user rotates the saw unit 100 about the quick connect pin 70 to reach the "ready" position of the saw unit, the forward blade guard 152 and the rearward blade guard 154 do not contact an outer diameter of a pipe (not shown). As can be seen in FIG. 51, the blade guards 152, 154 contact the guard start bracket 710 to reach the "ready" position of the saw unit. If the user were to rotate the saw about the quick connect pin 70 past the "ready" position to start cutting pipe, and subsequently reach the "plunge" position, then blade guards 152, 154 would contact the pipe surface and open further, beyond that which is already done via the guard start bracket 710. A raised fin 155 along the outside profile of the guard 154, along with a similar fin 153 on the forward blade guard 152, are configured such that the pivoting motion of the saw 100 urges or otherwise displaces the blade guards 152, 154 to open, against the spring-bias, to allow the blade 101 to contact the pipe surface. FIG. 51 illustrates the initial opening of the rearward blade guard 154 due to this contact with the saw in the "ready" position.

Figure 52:
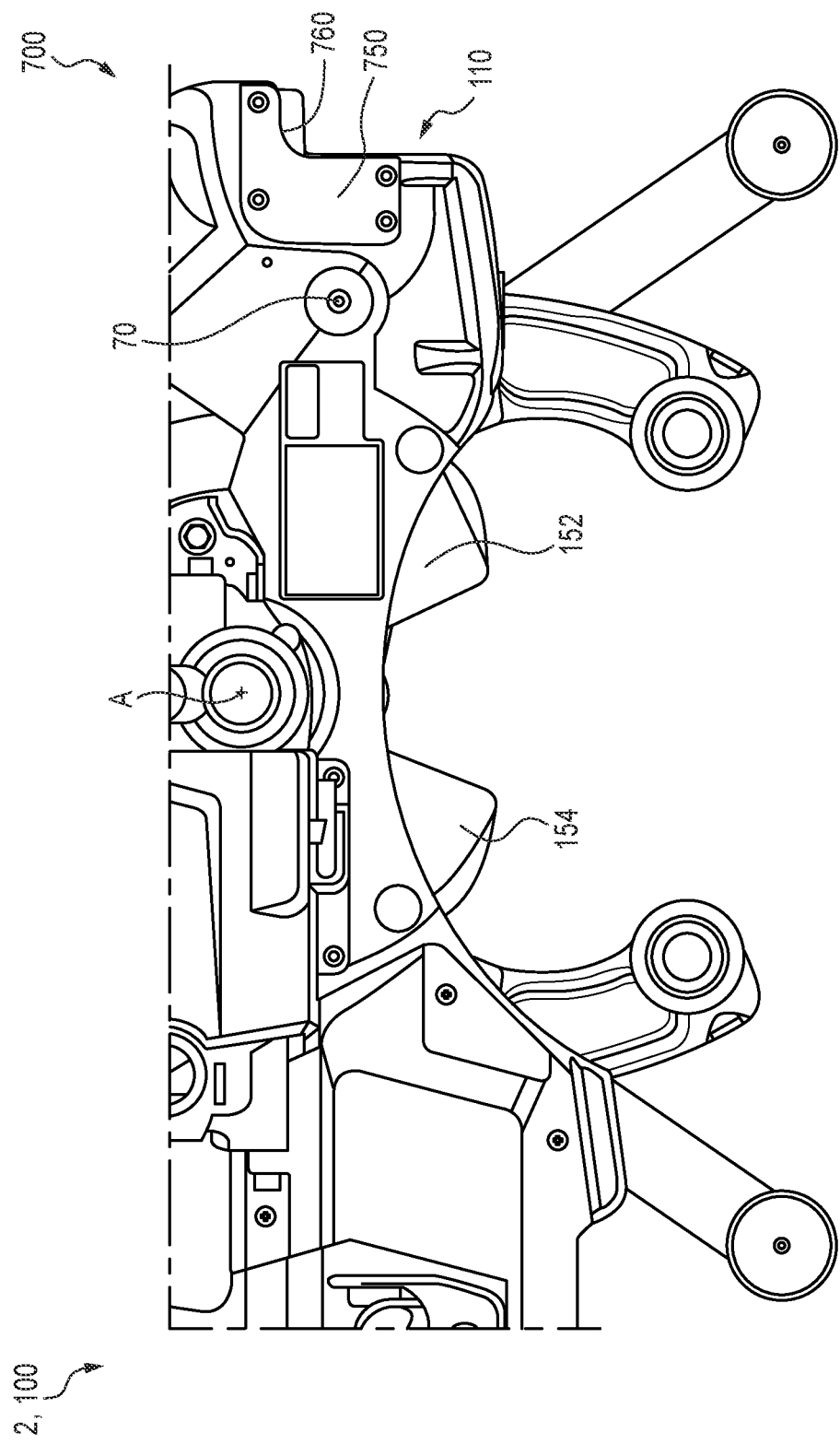

Referring to FIG. 52, when the user intends to cut the pipe, the saw blade is engaged with the pipe and the user rotatably moves the saw 100 to plunge the blade 101 into the pipe wall. With this additional plunge rotation, the rearward blade guard 154 continues to pivot open further, and the fin 153 on the forward blade guard 152 similarly causes the forward blade guard 152 to rotate about its pivot and further expose the saw blade 101 for adequate contact into the pipe wall.

The operations described in association with FIGS. 51 and 52 and particularly the opening of the forward and rearward blade guards 152, 154 is assisted and/or promoted by the guard start bracket 710. As previously noted, the guard start bracket 710 is affixed to the clamping system 2.

As best shown in FIGS. 49-51, the bracket 710 comprises a diverter 720 having a forward face 722, a rearward face 724, and a guide region 726 disposed between the forward and rearward faces 722, 724. The diverter 720 is aligned with the forward and rearward blade guards 152, 154 such that upon contact between the blade guards 152, 154 and the diverter 720, the diverter 720 is urged between the blade guards 152, 154. In particular versions, the forward face 722 and the rearward face 724 are oriented to diverge away from each other with increasing distance from the guide region 726. In certain versions, the angle between the forward face 722 and the rearward face 724 is within a range of from about 10° to about 45°. During operation, as the saw 100 and blade guards 152, 154 are urged or moved toward the bracket 710, the guide region 726 is urged between the blade guards 152, 154 and displaces the blade guards 152, 154 away from each other as depicted in FIGS. 50 and 51. Specifically, the forward blade guard 152 contacts the forward face 722 of the bracket 710, and the rearward blade guard 154 contacts the rearward face 724 of the bracket 710.

Figure 53:
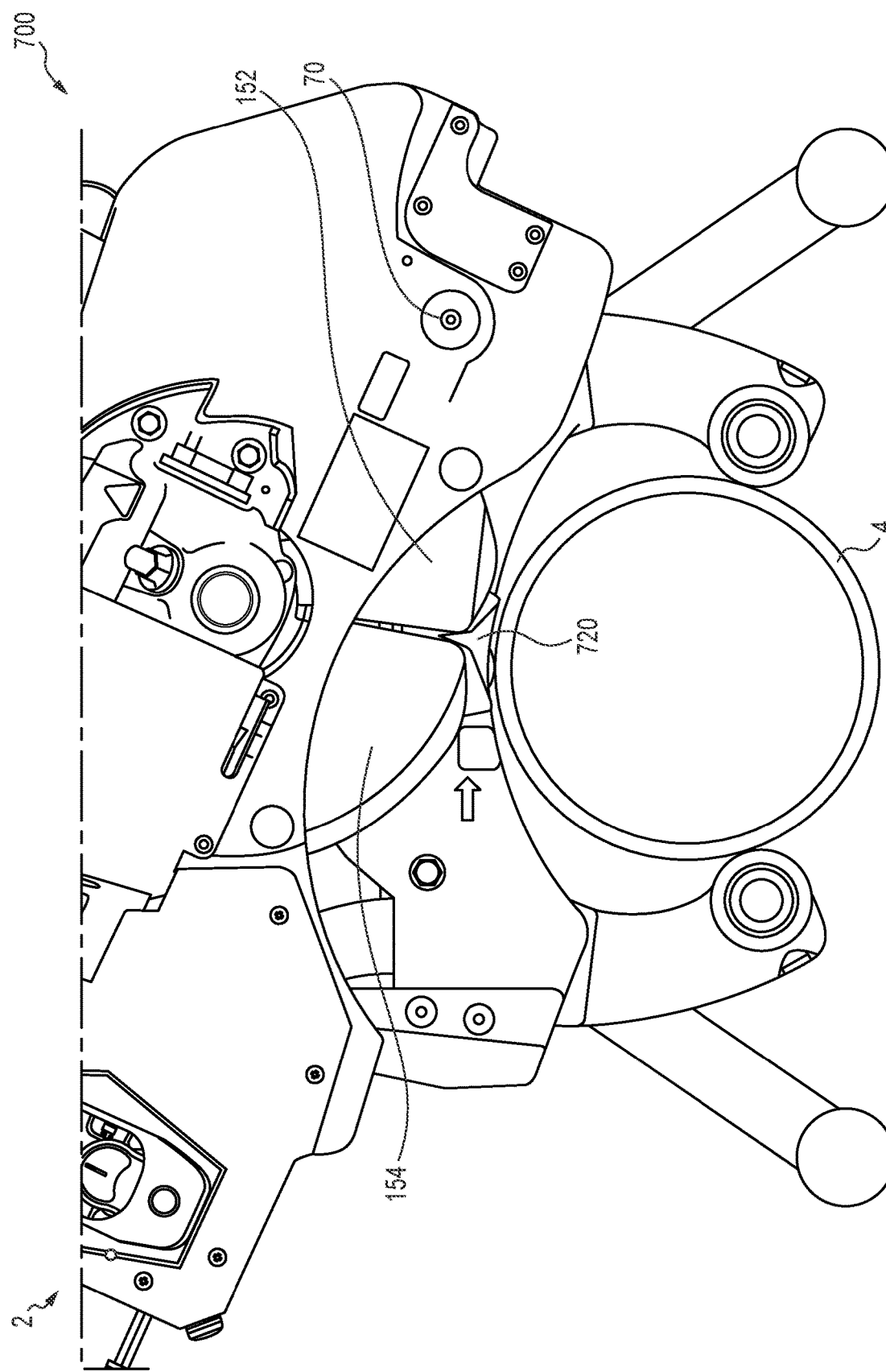
FIGS. 53-55 illustrate various positions of a blade guard start system in accordance with the present subject matter.
Figure 54:
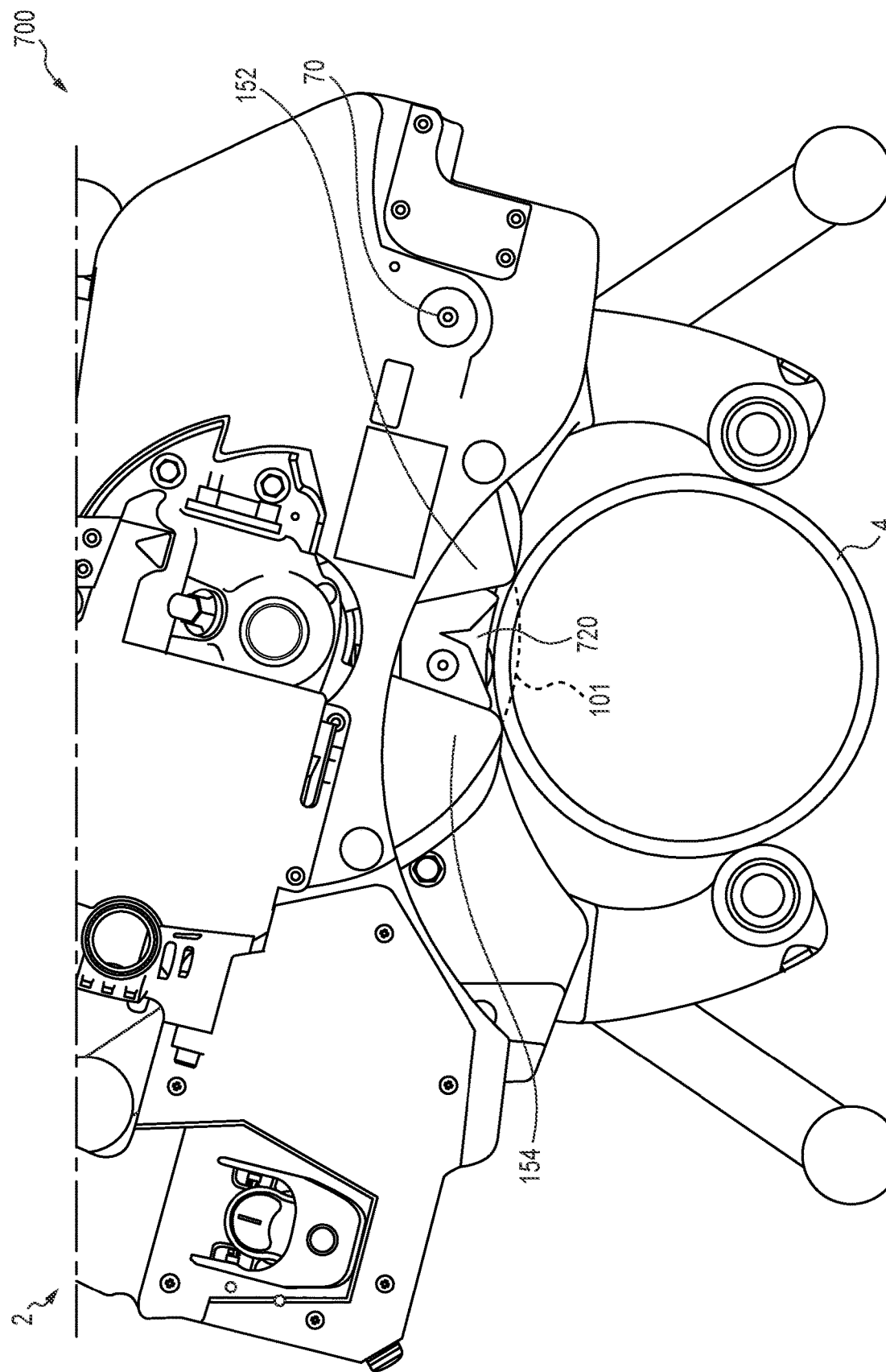
Figure 55:
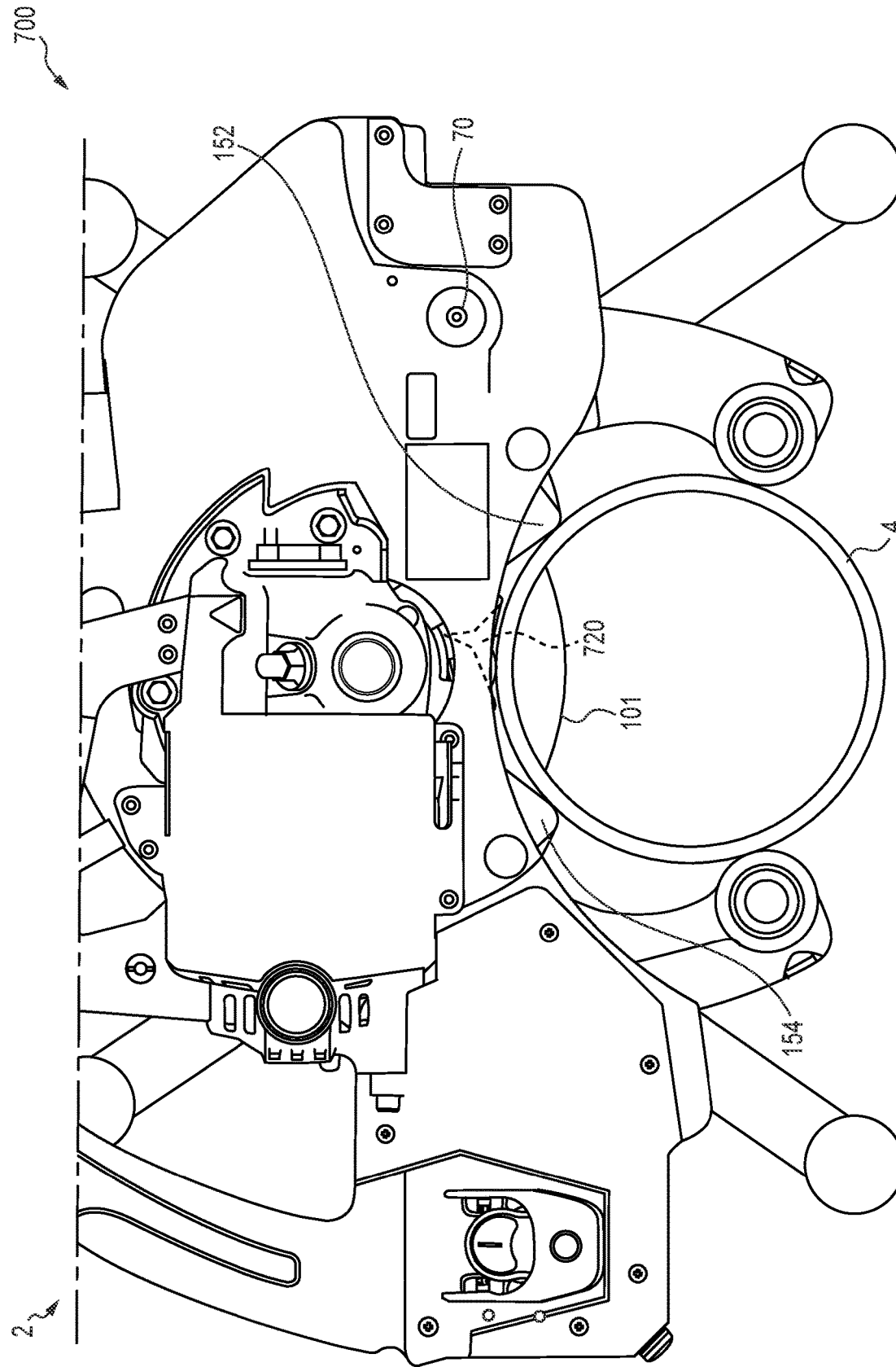

FIGS. 53-55 illustrate various positions of a blade guard start system 700 in accordance with the present subject matter. Referring to FIGS. 11-15 and 48-52, FIG. 53 illustrates a "ready position" (also referred to as a "pre-parting position") of the pair of blade guards 152, 154 as a result of the arcuate movement of depicted structure rotated counterclockwise about a pivot pin or quick connect pin 70, thereby causing the blade guards 152, 154 to contact and become spaced apart by the diverter 720 or cam as shown in FIG. 53. FIG. 54 illustrates an "open position" (also referred to as a saw blade "mid-plunge position") of the pair of blade guards 152, 154 as a result of additional arcuate movement of the structure by further rotation counterclockwise about the pivot pin 70, thereby causing the blade guards 152, 154 to be spaced further apart by the diverter 720 or cam to a point where the blade guards 152, 154 ultimately contact an exterior cylindrical surface of the pipe 4 and become further spaced apart as a result of being urged against the pipe 4, resulting in the saw blade 101 (shown in FIG. 54) plunging into the sidewall of the pipe 4. FIG. 55 illustrates a "fully engaged position" (also referred to as a saw blade "fully-plunged position") of the pair of blade guards 152, 154 as a result of additional arcuate movement of the structure caused by further rotation counterclockwise about the pivot pin 70, further spacing the blade guards 152, 154 apart as a result of the blade guards 152, 154 being urged against the pipe 4 by additional counterclockwise rotation of the structure about the pivot pin 70, resulting in the saw blade 101 (shown in FIG. 55) fully-plunging into the sidewall of the pipe 4.

Figure 56:
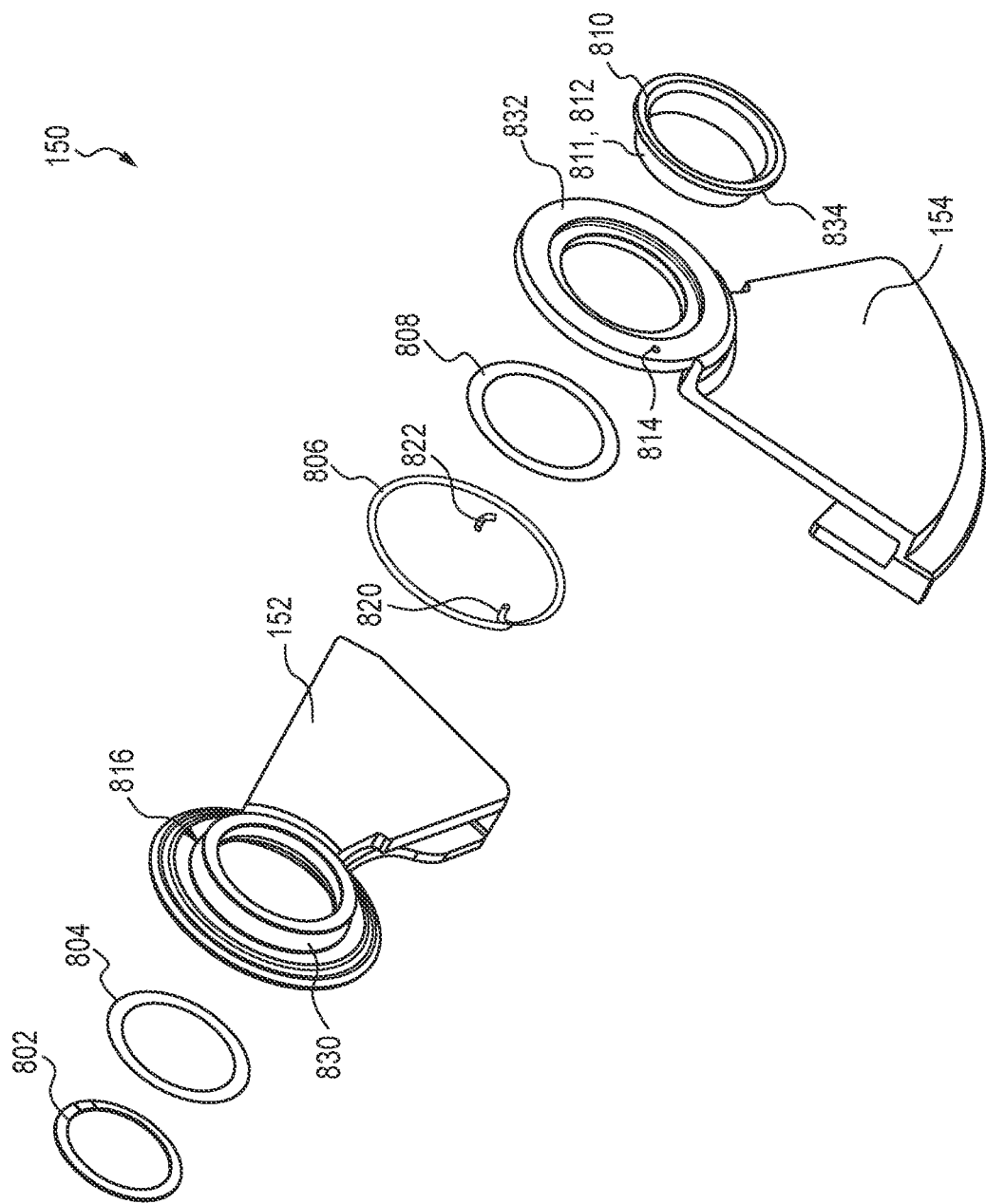
FIG. 56 is an exploded assembly view of a blade guard assembly in accordance with the present subject matter.

FIG. 56 is an exploded assembly view of an embodiment of a blade guard system, such as previously described blade guard system 150. The blade guard system 150 as depicted in FIG. 56 comprises the forward blade guard 152 and the rearward blade guard 154. The system 150 also comprises a snap ring 802 and a top spacer 804. The top spacer 804 is disposed between the snap ring 802 and the forward blade guard 152. The system 150 also comprises a torsion spring 806 and a middle spacer 808. The torsion spring 806 is disposed between the rearward blade guard 154 and the forward blade guard 152. The middle spacer 808 is disposed between the rearward blade guard 154. This spacer is smaller in diameter than the torsion spring 806, therefore the torsion spring does not contact the middle spacer (they are coaxial; basically installed in "parallel" instead of "series") and the forward blade guard 152. The system 150 also comprises a bottom spacer 810. The bottom spacer 810 is disposed such that the rearward blade guard 154 is positioned between the middle spacer 808 and the bottom spacer 810. The bottom spacer 810 includes an annular protrusion 811 for providing a radial bearing surface 812 for the blade guards 152, 154. In certain versions, the forward blade guard 152 defines a first aperture 816, and the rearward blade guard 154 defines a second aperture 814.

In particular versions, the blade guard system 150 is attached or otherwise mounted on a hub or enclosure of a motor such as motor 105 depicted in FIGS. 36 and 37. The bottom spacer 810 allows the rearward blade guard 154 to rotate freely. The middle spacer 808 is positioned between the forward blade guard 152 and the rearward blade guard 154 so that the blade guards 152, 154 can rotate freely with one another. The torsion spring 806 has a first end protrusion 820 that engages the rearward blade guard 154 in the first aperture 814 and a second end protrusion 822 that engages the forward blade guard 152 in the second aperture 816 such that the forward and rearward blade guards 152, 154 are biased towards a closed position. The forward blade guard 152 has the top spacer 804 on an opposite side of the torsion spring 806 to provide a bearing surface between the forward blade guard 152 and the snap ring 802. The snap ring 802 secures the blade guard system 150 onto the hub or frame of the motor or other desired affixment location.

Referring further to FIG. 56, in certain versions, the forward blade guard 152 includes a radial bearing surface 830. The rearward blade guard 154 includes an axial bearing surface 832. The bottom spacer 810 also includes an axial bearing surface 834. Thus, in this version, the bottom spacer 810 includes both of an axial bearing surface 834 and a radial bearing surface 812.

Figure 57:
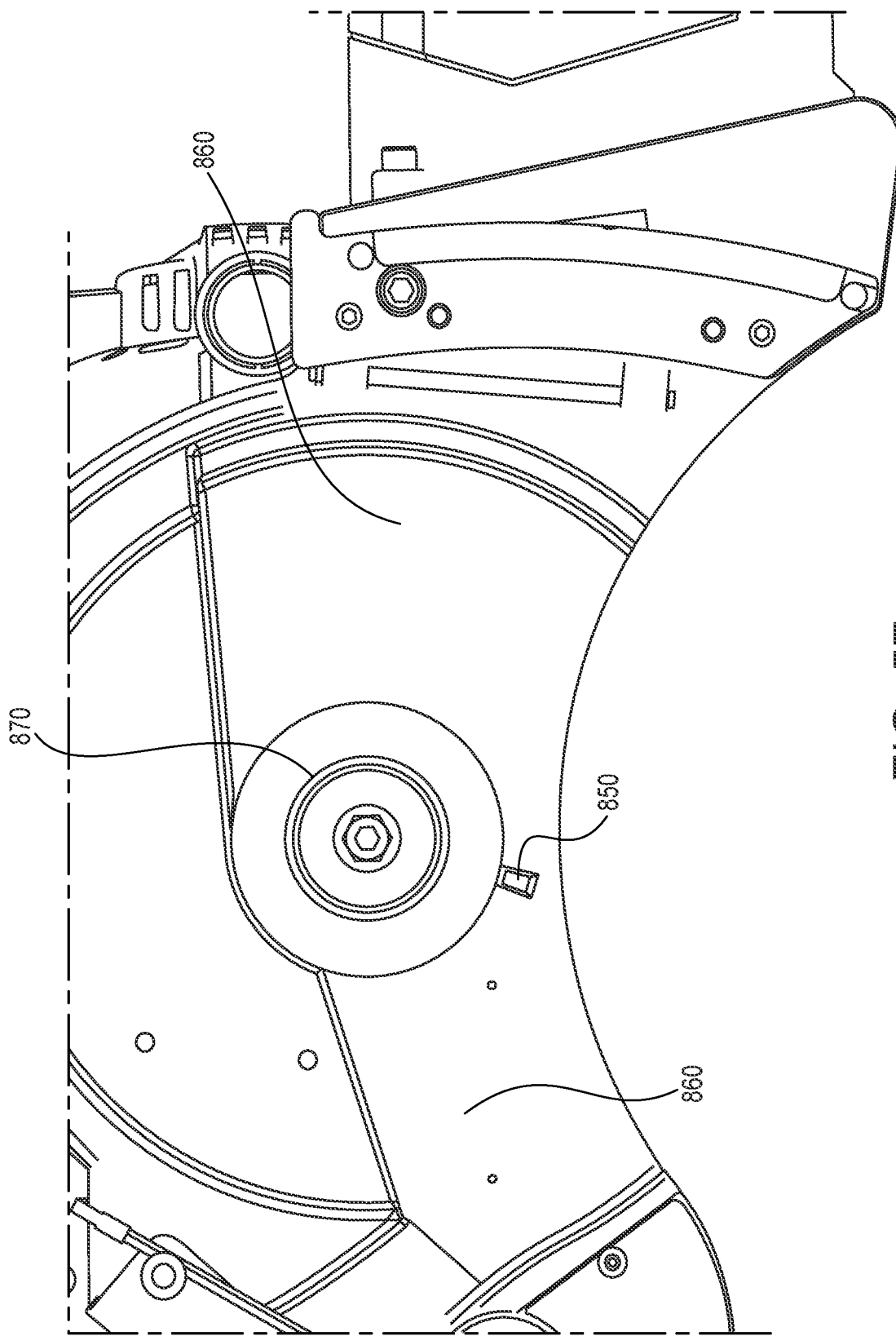
FIGS. 57-60 illustrate additional features and aspects of the blade guard system in accordance with the present subject matter.

In certain embodiments, the blade guard system 150 can include and/or be used with a protrusion or stop typically provided on a back plate or other component of the saw or device. FIG. 57 illustrates a protrusion or stop 850 on a back plate 860 of a device or saw. The protrusion or stop 850 provides a radial stop for the forward and rearward blade guards 152, 154 so that the blade guards 152, 154 align with the blade guard opener or diverter 720. The stop 850 can be integrated or formed with the backplate 860, or may be attached or secured to the backplate 860. FIG. 57 also illustrates a boss 870 which is nonrotating. The boss 870 receives for mounting, the rearward blade guard 154 followed by the forward blade guard 152.

Figure 58:
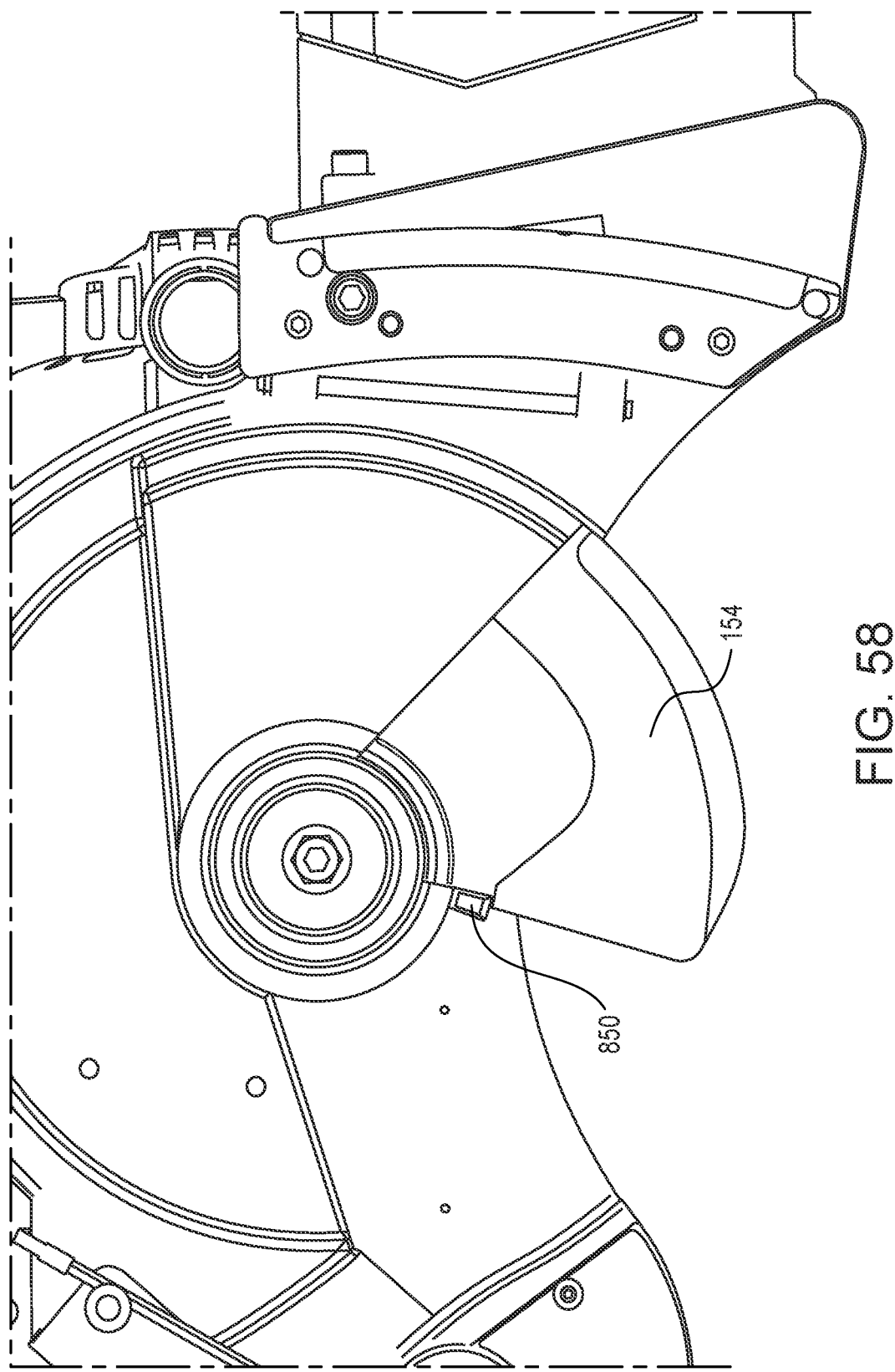
Figure 59:
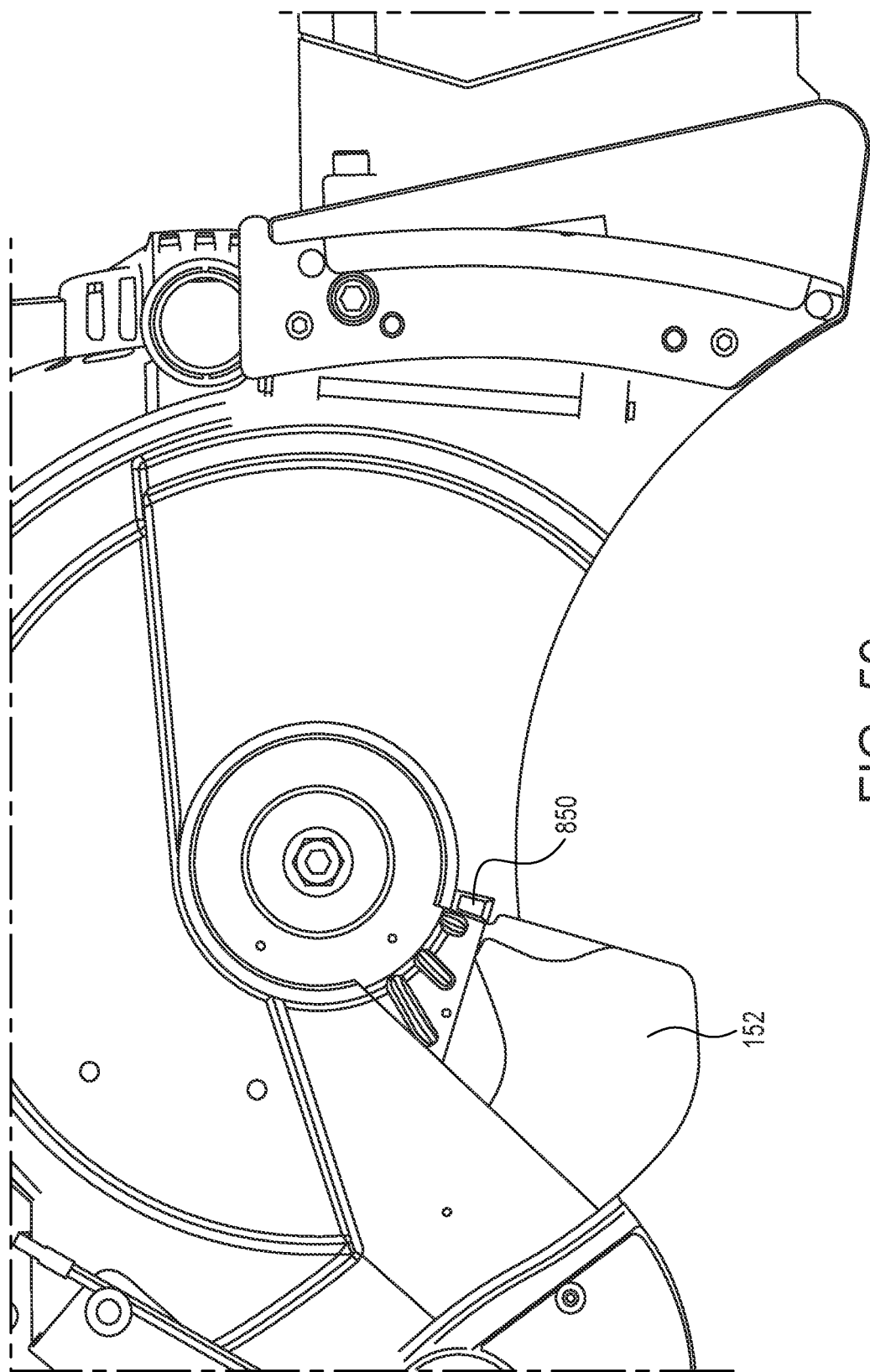
Figure 60:
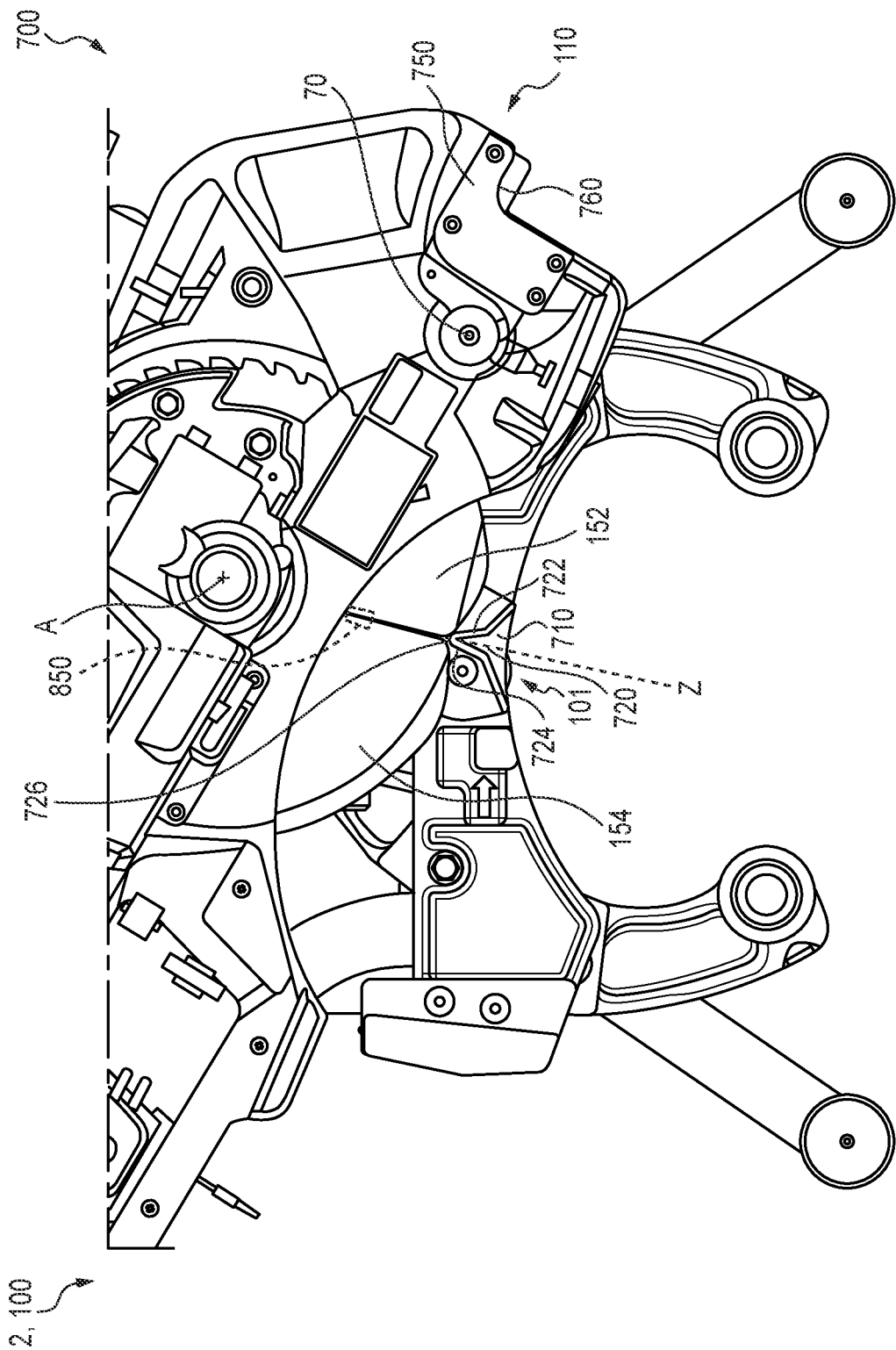

FIG. 58 illustrates the rearward blade guard 154 and engagement or contact with the stop 850. FIG. 59 illustrates the forward blade guard 152 and engagement or contact with the stop 850. FIG. 60 illustrates alignment between the stop 850 and the diverter 720, and the axis of rotation of the saw blade shown as axis A. Specifically, alignment of these aspects is depicted by dashed line Z in FIG. 60.

The present subject matter also provides a handle adjacent latch plate. Referring to FIGS. 6 and 50-52, an embodiment of a handle adjacent latch plate 750 is shown. The handle 750 is affixed or otherwise attached to the saw 100, and proximate the latch plate 110. The handle 750 defines a gripping region which is typically in the form of a recessed region 760. In certain versions, one or more protrusions are provided in the housing of the tool or device, typically adjacent the latch plate 110. The protrusion(s) can be used to disengage the tool or device and also used as a handle to hold the tool or device with one hand while another hand grips another region or component.

In some embodiments, the pipe fabrication tool is a saw using a brushed motor and connected to external mains-power via a cord. In further embodiments, the tool could be used to bevel the pipe, cut a groove in the surface of the pipe wall, clean or deburr the pipe, thread the pipe, or otherwise prep the pipe for further use. In even further embodiments, the tool could be powered by an integrated or removably battery and use a brushless motor.

In some embodiments, the pipe fabrication tool includes a motor that uses control electronics and hall sensors. In certain embodiments, the motor is a brushless DC (BLDC) motor. In some embodiments the pipe fabrication tool includes internal memory and is capable of storing functional parameters such as speed, current values, run time, number of actuations, and related data.

In one aspect, the present subject matter provides a powered cut-off tool comprising a motor, a rotary cutting blade driven by the motor, and control provisions for selectively adjusting operation of the motor. The saw also comprises at least one feature selected from the group consisting of (i) an alignment plate for use in a plunge guide assembly, (ii) a latch plate assembly for use in a quick connection assembly, (iii) an interlock system, (iv) a blade guard system, (v) a chip management system, and (vi) combinations of (i)-(v).

In another aspect, the present subject matter provides a quick release assembly for attaching a pipe fabrication tool to a clamping system. The clamping system includes a pair of pivotally moveable arms and a slideable central carriage. The quick release assembly comprises a quick connect pin extending outward from the clamping system. The pin defines a tip, a base, and a circumferential groove extending about an outer periphery of the pin.

In yet another aspect, the present subject matter provides a plunge guide assembly for use with a pipe fabrication tool having a rotary blade, and a clamping system. The plunge guide assembly comprises an alignment plate affixed to the pipe fabrication tool, and a grooved guide affixed to the clamping system. One of the grooved guide and the alignment plate includes an axially positionable pin, and the other of the grooved guide and the alignment plate includes a cylindrical bore. Upon attaching the pipe fabrication tool to the clamping system, the alignment plate is engaged with the grooved guide by axial positioning of the pin in the cylindrical bore.

In still another aspect, the present subject matter provides a latch plate assembly for use with a pipe fabrication tool having a rotary blade and a receiving aperture, and a clamping system with a quick connect pin extending outward from the clamping system. The pin defines a circumferential groove extending about an outer periphery of the pin. The latch plate assembly comprises a positionable latch plate provided on the pipe fabrication tool. The latch plate defines a concave cutout. Upon insertion of the quick connect pin in the receiving aperture, the concave cutout of the latch plate engages the quick connect pin.

In yet another aspect, the present subject matter provides an interlock system for use with a pipe fabrication tool having a rotary blade and defining a receiving aperture, and a clamping system with a quick connect pin. The interlock system comprises an electrical switch. Upon insertion of the quick connect pin in the receiving aperture, the electrical switch is closed to thereby allow operation of the pipe fabrication tool.

In another aspect, the present subject matter provides a chip management system for use with a pipe fabrication tool having a rotary blade. The chip management system comprises a blade guard positioned adjacent the rotary blade of the pipe fabrication tool. The blade guard includes an exit and at least one diverging wall extending toward the exit. The chip management system also comprises at least one primary channel defined in the pipe fabrication tool extending between the exit of the blade guard and a region in the pipe fabrication tool for dispelling chips generated during blade operation.

In another aspect, the present subject matter provides a blade guard system for use with a pipe fabrication tool having a rotary blade. The blade guard system includes a forward blade guard positionable about an axis of rotation of the blade, and a rearward blade guard also positionable about the axis of rotation of the blade.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An interlock system for a saw or a pipe-working tool defining a receiving aperture, the interlock system comprising:
    a positionable plunger positionable between an extended state in which the plunger extends into the receiving aperture, and a retracted state in which the plunger does not extend into the receiving aperture; and
    an interlock switch defining an open position when current does not flow and a closed position when current flows and including electrical contacts,
    wherein an operational state of the electrical contacts varies depending upon the position of the plunger relative to the receiving aperture.

2. The interlock system of claim 1 wherein the interlock switch further includes a displaceable lever contact positionable between a first position and a second position.

3. The interlock system of claim 2 wherein the plunger defines a plurality of regions for contact by the lever contact.

4. The interlock system of claim 3 wherein the plurality of regions for contact by the lever contact include a first region, a second region, and a third region, wherein upon extension of the plunger into the receiving aperture, the lever contact contacts the third region of the plunger.

5. The interlock system of claim 4 wherein upon retraction of the plunger from the receiving aperture, the lever contact contacts the second region of the plunger.

6. The interlock system of claim 4 wherein the first region is located between the second region and the third region.

7. The interlock system of claim 1 further comprising:
    a limit pin adjacent the plunger, the limit pin providing a stop for the plunger.

8. The interlock system of claim 1 further comprising:
    a biasing member, the biasing member urging the plunger to enter the receiving aperture.

9. The interlock system of claim 8 wherein the biasing member is a coil spring.

10. The interlock system of claim 8, wherein the saw or the pipe-working tool define a housing member, wherein the interlock system further comprises:
    a securing member threadedly engaged in the housing member, the securing member providing a seat or support for the biasing member.

11. The interlock system of claim 8 wherein when the interlock switch is in the open position the saw or the pipe-working tool cannot operate.

12. The interlock system of claim 8 wherein the saw or the pipe-working tool can only operate when the interlock switch is in the closed position.

13. The interlock system of claim 8, wherein the saw includes a rotary cutting blade.

14. The interlock system of claim 8, wherein the saw or the pipe-working tool includes an electric motor.

* * * * *